US010742820B2

(12) United States Patent
Okamoto et al.

(10) Patent No.: US 10,742,820 B2
(45) Date of Patent: *Aug. 11, 2020

(54) DEVICE CONTROLLER, COMMUNICATION TERMINAL, DEVICE CONTROL METHOD, COMPENSATION CALCULATION METHOD, AND DEVICE CONTROL SYSTEM

(71) Applicant: KDDI CORPORATION, Tokyo (JP)

(72) Inventors: Toshiyuki Okamoto, Tokyo (JP); Mitsumasa Iwanaga, Tokyo (JP); Sakiko Kurita, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,397

(22) Filed: Aug. 29, 2019

(65) Prior Publication Data
US 2019/0387103 A1 Dec. 19, 2019

Related U.S. Application Data

(63) Continuation of application No. 16/079,930, filed as application No. PCT/JP2017/006799 on Feb. 23, 2017, now Pat. No. 10,447,863.

(30) Foreign Application Priority Data

Feb. 25, 2016 (JP) .................................. 2016-034463
Feb. 25, 2016 (JP) .................................. 2016-034464
(Continued)

(51) Int. Cl.
*H04M 11/00* (2006.01)
*H04Q 9/00* (2006.01)
*H04L 12/28* (2006.01)

(52) U.S. Cl.
CPC ....... *H04M 11/007* (2013.01); *H04L 12/2807* (2013.01); *H04L 12/2818* (2013.01);
(Continued)

(58) Field of Classification Search
CPC ................. H04M 11/00; H04L 12/2803; H04L 12/2818; H04L 29/06; H04L 67/04; H04L 67/12; H04L 63/329
(Continued)

(56) References Cited

U.S. PATENT DOCUMENTS

2003/0100962 A1* 5/2003 Sumita ................ H04L 12/2803
700/65
2003/0131089 A1* 7/2003 Yamamoto .......... H04L 12/2814
709/223
(Continued)

FOREIGN PATENT DOCUMENTS

| CN | 104169659 A | 11/2014 |
|---|---|---|
| CN | 105182777 A | 12/2015 |

(Continued)

OTHER PUBLICATIONS

Office Action dated Dec. 11, 2018 in the corresponding Japanese Patent Application No. 2016-034464 with its English translation.
(Continued)

*Primary Examiner* — Melur Ramakrishnaiah
(74) *Attorney, Agent, or Firm* — Foley & Lardner LLP

(57) ABSTRACT

A device controller connected to a communication terminal and a plurality of devices via a network includes an acquisition unit configured to receive first control information for controlling a plurality of devices of predetermined type from the communication terminal, the first control information including specific information for identifying a control target device selected from the plurality of devices, a device identification unit configured to identify the control target
(Continued)

device on the basis of the specific information included in the first control information, a generation unit configured to generate second control information for causing the control target device to execute control details indicated by the first control information, the second control information being different from the first control information, and a transmission unit configured to transmit the second control information.

20 Claims, 28 Drawing Sheets

(30) Foreign Application Priority Data

| Mar. 11, 2016 | (JP) | 2016-048468 |
|---|---|---|
| Mar. 22, 2016 | (JP) | 2016-056527 |
| Mar. 22, 2016 | (JP) | 2016-056528 |

(52) U.S. Cl.
CPC ......... *H04L 12/2832* (2013.01); *H04M 11/00* (2013.01); *H04Q 9/00* (2013.01); *H04L 2012/285* (2013.01); *H04L 2012/2841* (2013.01); *H04L 2012/2849* (2013.01)

(58) Field of Classification Search
USPC ............ 379/106.01, 102.03, 102.01, 102.02; 340/12.5
See application file for complete search history.

(56) References Cited

U.S. PATENT DOCUMENTS

| 2006/0109274 | A1 | 5/2006 | Alvarez | |
| 2007/0229300 | A1* | 10/2007 | Masato | G08C 23/04 340/12.22 |
| 2013/0162412 | A1 | 6/2013 | Yu | |
| 2015/0347114 | A1* | 12/2015 | Yoon | G06F 8/61 235/375 |

FOREIGN PATENT DOCUMENTS

| CN | 105230038 A | 1/2016 |
| EP | 2950510 A1 | 12/2015 |
| JP | 2001-339773 A | 12/2001 |
| JP | 2002-057935 A | 2/2002 |
| JP | 2002-140611 A | 5/2002 |
| JP | 2003-009265 A | 1/2003 |
| JP | 2003-230182 A | 8/2003 |
| JP | 2003-230184 A | 8/2003 |
| JP | 2005-269597 A | 9/2005 |
| JP | 2008-165336 A | 7/2008 |
| JP | 2009-105882 A | 5/2009 |
| JP | 2013-090141 A | 5/2013 |
| JP | 2014-045232 A | 3/2014 |
| JP | 2014-082581 A | 5/2014 |
| JP | A-2014-087012 A | 5/2014 |
| JP | 2015-056779 A | 3/2015 |
| JP | 2016-095809 A | 5/2016 |
| WO | WO-2015/155991 A1 | 10/2015 |

OTHER PUBLICATIONS

Office Action issued in corresponding Japanese Application No. 2016-056527 dated May 14, 2019.
Office Action issued in corresponding Japanese Application No. 2016-056528 dated May 14, 2019.
Office Action issued in corresponding Japanese Application No. 2016-048468 dated May 21, 2019.
Supplementary European Search Report issued in corresponding European Patent Application No. 17756578 dated Jul. 25, 2019.
Notice of Allowance issued in corresponding Japanese Patent Application No. 2016-034463 dated Nov. 5, 2019 with English translation.
Office Action issued in corresponding Chinese Patent Application No. 201780012966.9 dated Jan. 20, 2020.

* cited by examiner

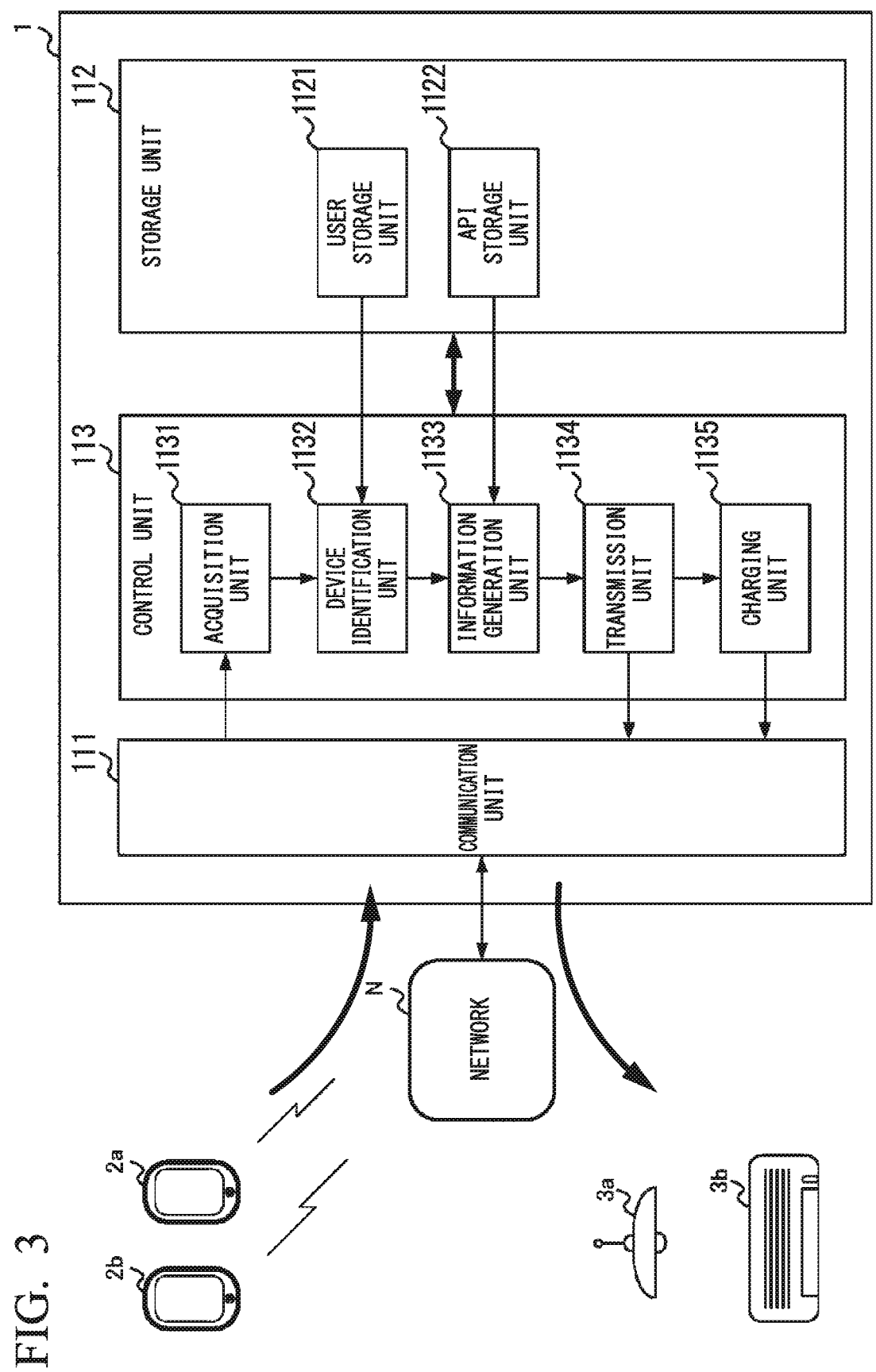

FIG. 4

| USER ID | TYPE OF DEVICE | DEVICE ID | MANUFACTURER NAME | ADDRESS |
|---|---|---|---|---|
| 0001 | AIR CONDITIONER | AA0001 | COMPANY A | 2A340··· |
|  | LIGHT | LB0002 | COMPANY B | 14234··· |
|  | LIGHT | LC0020-1 | COMPANY C | 334AE··· |
|  | LIGHT | LC0020-2 | COMPANY C | 5336F··· |
|  | VIDEO RECORDER | VD0122 | COMPANY D | DE443··· |
|  | VIDEO RECORDER | VE0021 | COMPANY E | B3486··· |
|  | ... | ... | ... | ... |
| 0002 | LIGHT | LB0002 | COMPANY B | 22553··· |
|  | LIGHT | C0030 | COMPANY C | 42367··· |
|  | VIDEO RECORDER | VE0030 | COMPANY E | A64B3··· |
|  | REFRIGERATOR | RF0045 | COMPANY F | F6444··· |
|  | ... | ... | ... | ... |
| ... | ... | ... | ... | ... |

FIG. 5

| USER ID | FIRST CONTROL INFORMATION ||| | SECOND CONTROL INFORMATION ||
|---|---|---|---|---|---|---|
| | APPLICATION ID | DEVICE IDENTIFICATION INFORMATION | CONTROL DETAILS | | TYPE OF COMMAND | CONTROL DETAILS |
| 0001 | AIR CONDITIONER APPLICATION | AA0001 | TEMPERATURE = 25° C | → | FOR AA0001 | TEMPERATURE = 25° C |
| | LIGHT APPLICATION | LC0020-2 | TURN ON | → | FOR LC0020 | BRIGHTNESS = 5 |
| | RECORDER APPLICATION | VD0122 | RECORDING RESERVATION | → | FOR VD0122 | RECORDING START = 18:30 |
| | ... | ... | ... | → | ... | ... |
| 0002 | LIGHT APPLICATION | LB0002 | TURN ON | → | FOR LB0002 | TURN ON |
| | | C0030 | TURN ON | → | FOR C0030 | BRIGHTNESS = 5 |
| | REFRIGERATOR APPLICATION | RF0045 | TEMPERATURE = 5° C | → | FOR RF0045 | TEMPERATURE = 5° C |
| | ... | ... | ... | → | ... | ... |
| ... | ... | ... | ... | | ... | ... |

T11   T12

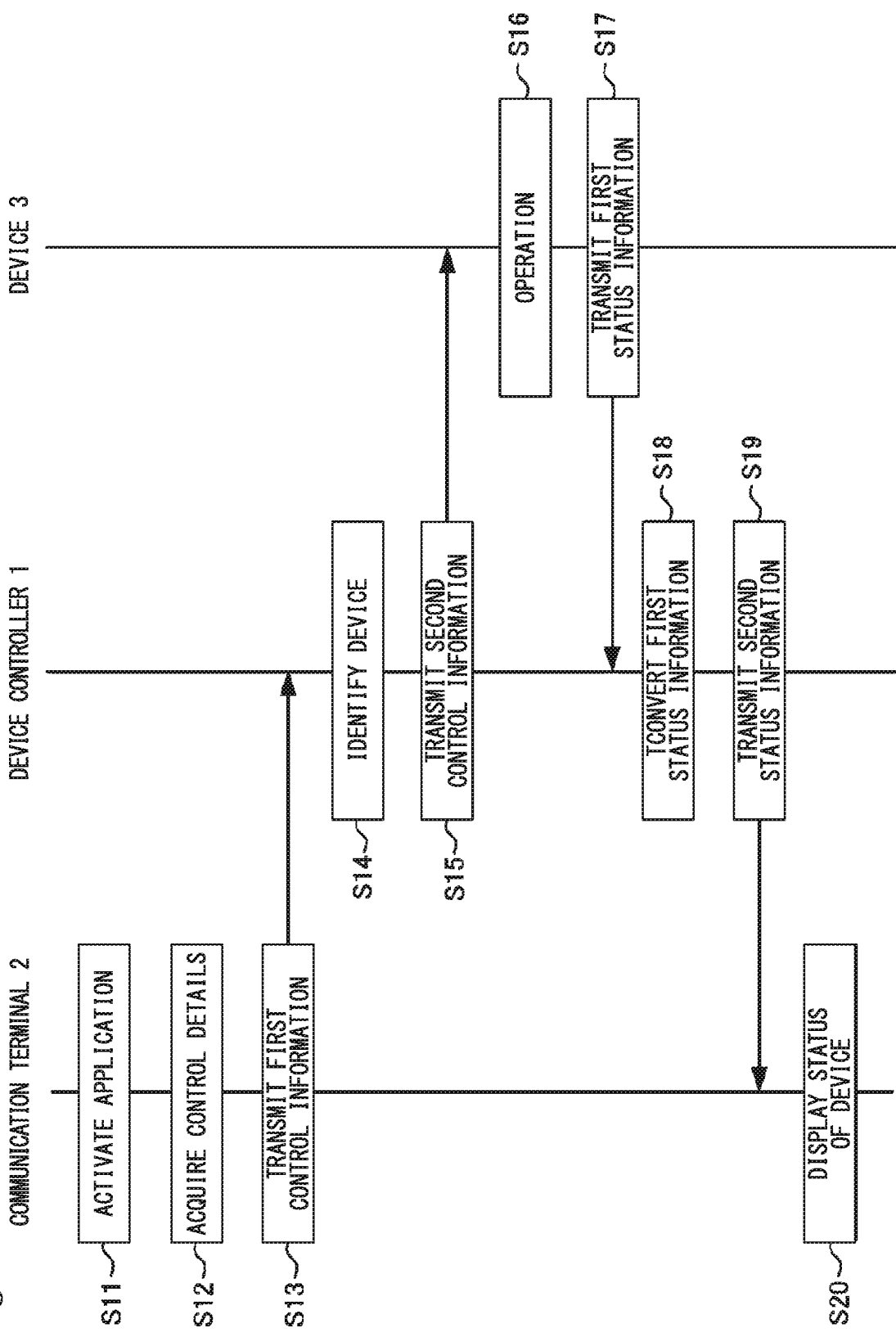

FIG. 9

| USER ID | TYPE OF DEVICE | DEVICE ID | SERIAL NUMBER | ADDRESS |
|---|---|---|---|---|
| 0001 | AIR CONDITIONER | AA0001 | 1 | 2A340··· |
|  | LIGHT | LB0002 | 1 | 14234··· |
|  | LIGHT | LC0020 | 2 | 334AE··· |
|  | LIGHT | LC0020 | 3 | 5336F··· |
|  | VIDEO RECORDER | VD0122 | 1 | DE443··· |
|  | VIDEO RECORDER | VE0021 | 2 | B3486··· |
|  | ··· | ··· | ··· | ··· |
| 0002 | LIGHT | LB0002 | 1 | 22553··· |
|  | LIGHT | C0030 | 2 | 42367··· |
|  | VIDEO RECORDER | VE0030 | 1 | A64B3··· |
|  | REFRIGERATOR | RF0045 | 1 | F6444··· |
|  | ··· | ··· | ··· | ··· |
| ··· | ··· | ··· | ··· | ··· |

FIG. 10

T21 — FIRST CONTROL INFORMATION

| USER ID | APPLICATION ID | DEVICE IDENTIFICATION INFORMATION | CONTROL DETAILS |
|---|---|---|---|
| 0001 | AIR CONDITIONER APPLICATION | 1 | TEMPERATURE = 25° C |
| | LIGHT APPLICATION | 2 | TURN ON |
| | RECORDER APPLICATION | 1 | RECORDING RESERVATION |
| | ... | ... | ... |
| 0002 | LIGHT APPLICATION | 1 | TURN ON |
| | | 2 | TURN ON |
| | REFRIGERATOR APPLICATION | 1 | TEMPERATURE = 5° C |
| | ... | ... | ... |
| ... | ... | ... | ... |

T22 — SECOND CONTROL INFORMATION

| TYPE OF COMMAND | CONTROL DETAILS |
|---|---|
| FOR AA0001 | TEMPERATURE = 25° C |
| FOR LC0020 | BRIGHTNESS = 5 |
| FOR VD0122 | RECORDING START = 18:30 |
| ... | ... |
| FOR LB0002 | TURN ON |
| FOR C0030 | BRIGHTNESS = 5 |
| FOR RF0045 | TEMPERATURE = LOW |
| ... | ... |

FIG. 14

| USER ID | TYPE OF DEVICE | DEVICE ID | MANUFACTURER NAME | STATUS OF USE | ADDRESS |
|---|---|---|---|---|---|
| 0001 | AIR CONDITIONER | AA0001 | COMPANY A | IN USE | 2A340··· |
| | LIGHT | LB0002 | COMPANY B | IN USE | 14234··· |
| | LIGHT | LC0020-1 | COMPANY C | IN USE | 334AE··· |
| | LIGHT | LC0020-2 | COMPANY C | SHIPMENT COMPLETION | 5336F··· |
| | VIDEO RECORDER | VD0122 | COMPANY D | IN USE | DE443··· |
| | VIDEO RECORDER | VE0021 | COMPANY E | IN USE | B3486··· |
| | ... | ... | ... | ... | ... |
| 0002 | LIGHT | LB0002 | COMPANY B | IN USE | 22553··· |
| | LIGHT | C0030 | COMPANY C | SHIPMENT COMPLETION | 42367··· |
| | VIDEO RECORDER | VE0030 | COMPANY E | IN USE | A64B3··· |
| | REFRIGERATOR | RF0045 | COMPANY F | IN USE | F6444··· |
| | ... | ... | ... | ... | ... |
| ... | ... | ... | ... | ... | ... |

FIG. 15

| TYPE OF SERVICE | APPLICATION | TYPE OF DEVICE | DEVICE ID | MANUFACTURER NAME |
|---|---|---|---|---|
| LIGHT CONTROL | LIGHT APPLICATION 1 | CEILING LIGHT | LA0050 | COMPANY A |
| | | CEILING LIGHT | LB0002 | COMPANY B |
| | | CEILING LIGHT | LC0020 | COMPANY C |
| | | CEILING LIGHT | LC0030 | COMPANY C |
| | | ENTRANCE LIGHT | LD0011 | COMPANY D |
| | | ENTRANCE LIGHT | LE1000 | COMPANY E |
| | | ... | ... | ... |
| | LIGHT APPLICATION 2 | CEILING LIGHT | LB0002 | COMPANY B |
| | | CEILING LIGHT | C0030 | COMPANY C |
| | | KITCHEN TABLE LIGHT | LE0100 | COMPANY E |
| | | KITCHEN TABLE LIGHT | LF1020 | COMPANY F |
| | | ... | ... | ... |
| AIR CONDITIONER CONTROL | AIR CONDITIONER APPLICATION | AIR CONDITIONER | AA0001 | COMPANY A |
| | | AIR CONDITIONER | AC0100 | COMPANY C |
| | | AIR CONDITIONER | AD0030 | COMPANY D |
| | | ... | ... | ... |
| ... | ... | ... | ... | ... |

FIG. 20

| USER ID | TYPE OF DEVICE | DEVICE ID | MANUFACTURER NAME | ADDRESS |
|---|---|---|---|---|
| 0001 | AIR CONDITIONER | AA0001 | COMPANY A | 2A340··· |
| | LIGHT | LB0002 | COMPANY B | 14234··· |
| | LIGHT | LB0002 | COMPANY B | 334AE··· |
| | MONITORING CAMERA | C0030 | COMPANY C | 5336F··· |
| | THERMO-HYGROMETER | VD0122 | COMPANY D | DE443··· |
| | ILLUMINOMETER | VE0021 | COMPANY E | B3486··· |
| | ... | ... | ... | ... |
| 0002 | LIGHT | LB0002 | COMPANY B | 22553··· |
| | LIGHT | C0030 | COMPANY C | 42367··· |
| | VIDEO RECORDER | VE0030 | COMPANY E | A64B3··· |
| | REFRIGERATOR | RF0045 | COMPANY F | F6444··· |
| | ... | ... | ... | ... |
| ... | ... | ... | ... | ... |

FIG. 21

| TYPE OF DEVICE | DEVICE ID | OPERATION DETAILS CANDIDATES | |
|---|---|---|---|
| | | OPERATION DETAILS CANDIDATE 1 | OPERATION DETAILS CANDIDATE 2 |
| AIR CONDITIONER | AA0001 | TO INCREASE ROOM TEMPERATURE | TO DECREASE ROOM TEMPERATURE |
| AIR CONDITIONER | AB002 | TO MAKE ROOM COMFORTABLE | |
| LIGHT | LB0002 | TO BRIGHTEN ROOM | TO DARKEN ROOM |
| MONITORING CAMERA | C0030 | TO SEE STATUS OF ROOM | |
| THERMO-HYGROMETER | VD0122 | TO CHECK TEMPERATURE | TO CHECK HUMIDITY |
| ILLUMINOMETER | VE0021 | TO CHECK BRIGHTNESS | |
| ... | ... | ... | ... |

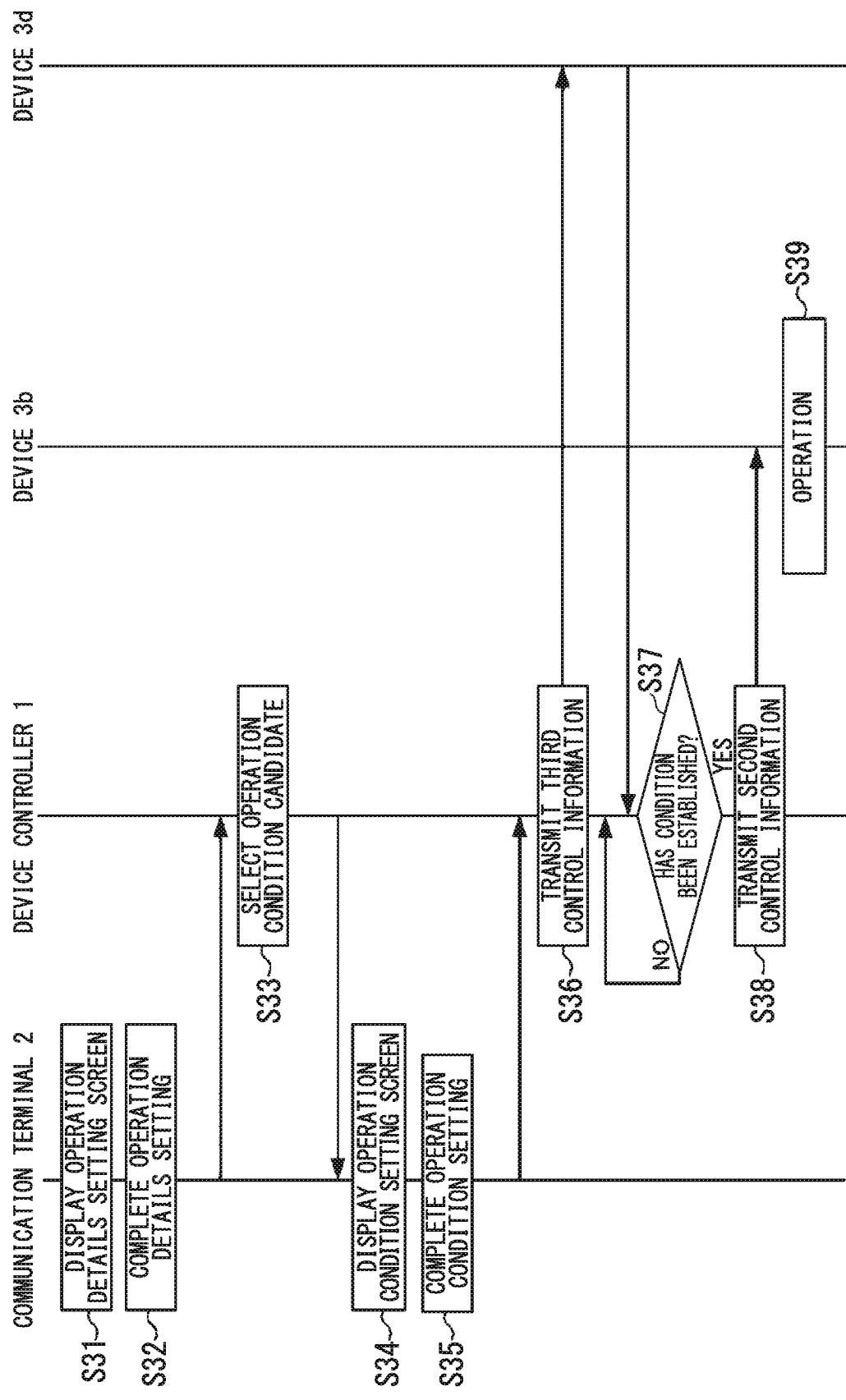

FIG. 30

| USER ID | TYPE OF DEVICE | DEVICE ID | MANUFACTURER NAME | ADDRESS | OPERATION FLAG | COMPENSATION (YEN) |
|---|---|---|---|---|---|---|
| 0001 | AIR CONDITIONER | AA0001 | COMPANY A | 2A340··· | OPERATION-ENABLED | 50 |
| | LIGHT | LB0002 | COMPANY B | 14234··· | OPERATION-ENABLED | 30 |
| | LIGHT | LC0020-1 | COMPANY C | 334AE··· | OPERATION-DISABLED | 0 |
| | LIGHT | LC0020-2 | COMPANY C | 5336F··· | OPERATION-ENABLED | 30 |
| | VIDEO RECORDER | VD0122 | COMPANY D | DE443··· | OPERATION-DISABLED | 0 |
| | VIDEO RECORDER | VE0021 | COMPANY E | B3486··· | OPERATION-ENABLED | 60 |
| | ··· | ··· | ··· | ··· | ··· | ··· |
| 0002 | LIGHT | LB0002 | COMPANY B | 22553··· | OPERATION-ENABLED | 30 |
| | LIGHT | C0030 | COMPANY C | 42367··· | OPERATION-DISABLED | 0 |
| | VIDEO RECORDER | VE0030 | COMPANY E | A64B3··· | OPERATION-ENABLED | 60 |
| | REFRIGERATOR | RF0045 | COMPANY F | F6444··· | OPERATION-DISABLED | 0 |
| | ··· | ··· | ··· | ··· | ··· | ··· |
| ··· | ··· | ··· | ··· | ··· | ··· | ··· |

DEVICE CONTROLLER, COMMUNICATION TERMINAL, DEVICE CONTROL METHOD, COMPENSATION CALCULATION METHOD, AND DEVICE CONTROL SYSTEM

This application is a continuation of U.S. patent application Ser. No. 16/079,930, filed Aug. 24, 2018, which claims priority to Japanese Patent Application Nos. 2016-034463 and 2016-034464, filed Feb. 25, 2016, Japanese Patent Application No. 2016-048468, filed Mar. 11, 2016, and Japanese Patent Application Nos. 2016-056527 and 2016-056528, filed Mar. 22, 2016, the content of which is incorporated herein by reference.

TECHNICAL FIELD

The present invention relates to a device controller, a communication terminal, a device control method, a compensation calculation method, and a device control system for controlling a device.

BACKGROUND ART

Conventionally, a method of controlling an electronic device by a communication terminal such as a smartphone via a network is known. Patent Document 1 discloses a system capable of controlling an electronic device with application software by downloading the application software for controlling the electronic device to a portable terminal.

CITATION LIST

Patent Literature

[Patent Document 1]
Japanese Unexamined Patent Application, First Publication No. 2015-056779

SUMMARY OF INVENTION

Technical Problem

Conventionally, in order to control an electronic device (a device) such as a household electrical appliance via a network, dedicated application software for the electronic device to be controlled needs to be installed in a communication terminal connectable to the network. For example, when the user controls a lighting device manufactured by company A from outside his/her house, the user needs to use a communication terminal in which application software for the lighting device manufactured by company A provided from company A is installed to control the lighting device manufactured by company A.

In this manner, if the dedicated application software for the electronic device to be controlled needs to be installed in the communication terminal, it is necessary to reinstall dedicated application software for a new electronic device when the user replaces the electronic device to be controlled. Also, user interfaces of application software of different manufacturers are generally different. Therefore, when the user has replaced a device such as an electronic device to be controlled with a new device, the user needs to learn how to use application software for the new device.

Therefore, the present invention has been made in view of such circumstances, and an objective of the present invention is to provide a device controller, a communication terminal, a device control method, a compensation calculation method, and a device control system capable of controlling various types of devices with a single piece of application software.

Solution to Problem

According to a first aspect of the present invention, there is provided a device controller connected to a communication terminal and a plurality of devices via a network, the device controller including: an acquisition unit configured to receive first control information for controlling a plurality of devices of predetermined type from the communication terminal, the first control information including specific information for identifying a control target device selected from the plurality of devices; a device identification unit configured to identify the control target device on the basis of the specific information included in the first control information; a generation unit configured to generate second control information for causing the control target device to execute control details indicated by the first control information, the second control information being different from the first control information; and a transmission unit configured to transmit the second control information.

In the device controller according to the first aspect of the present invention, the first control information includes the control details for the control target device in a format common among the plurality of devices of the predetermined type, and the second control information includes the control details in a format corresponding to the control target device.

The device controller according to the first aspect of the present invention further includes: a storage unit configured to store a programming interface for controlling the control target device, wherein the generation unit is configured to generate the second control information in which control details indicated by the first control information are written in accordance with the programming interface, and wherein the transmission unit is configured to transmit the second control information to the control target device.

The device controller according to the first aspect of the present invention includes: a storage unit configured to store user identification information identifying a user of each of a plurality of communication terminals and device identification information for identifying a device to be controlled by each user in association with each other, wherein the first control information further includes the user identification information, and wherein the device identification unit is configured to identify a device indicated by the device identification information stored in the storage unit in association with the user identification information included in the first control information as the control target device.

In the device controller according to the first aspect of the present invention, the storage unit is configured to store first user identification information and second user identification information in association with each other, and the device identification unit is configured to identify the device indicated by the device identification information stored in the storage unit in association with the second user identification information as the control target device if the second user identification information is stored in the storage unit in association with the first user identification information included in the first control information.

The device controller according to the first aspect of the present invention further includes: a charging unit configured to perform charging in accordance with reception of the first control information including the first user identification information with respect to the second user identification information.

In the device controller according to the first aspect of the present invention, the generation unit is configured to identify a format of the first control information on the basis of information indicating a type of first control information included in the first control information and generate the second control information.

In the device controller according to the first aspect of the present invention, the generation unit is configured to generate the second control information for causing a device server for controlling the control target device to control the control target device as the control details, and the transmission unit is configured to transmit the second control information to the device server.

According to a second aspect of the present invention, there is provided a device control method of causing a device selected from a plurality of devices to be controlled by a communication terminal, the device control method including: receiving first control information for controlling a plurality of devices of predetermined type from the communication terminal, the first control information including specific information for identifying a control target device selected from the plurality of devices; identifying the control target device on the basis of the specific information included in the first control information; generating second control information for causing the control target device to execute control details indicated by the first control information, the second control information being different from the first control information; and transmitting the second control information.

According to a third aspect of the present invention, there is provided a device control system including a communication terminal and a device controller connected to the communication terminal and a plurality of devices via a network, wherein the communication terminal transmits first control information for controlling a plurality of devices of predetermined type to the device controller, the first control information including specific information for identifying a control target device selected from the plurality of devices, and wherein the device controller includes an acquisition unit configured to receive the first control information from the communication terminal; a device identification unit configured to identify the control target device on the basis of the specific information included in the first control information; a generation unit configured to generate second control information for causing the control target device to execute control details indicated by the first control information, the second control information being different from the first control information; and a transmission unit configured to transmit the second control information.

In the device controller according to the first aspect of the present invention, the acquisition unit is further configured to acquire a type of service indicating a type of device to be controlled in a service for controlling the device via the network with the communication terminal, wherein the device controller further comprises: an extraction unit configured to extract one or more pieces of application software for providing a service of the acquired type of service and one or more devices to be controlled by each of the one or more pieces of application software; a presentation unit configured to transmit information for identifying the extracted one or more pieces of application software and the extracted one or more devices to the communication terminal; and a setting unit configured to set application software selected from the one or more pieces of application software as a target to be used by the communication terminal, and wherein the generation unit is configured to generate the second control information on the basis of the first control information received from the communication terminal for executing the selected application software.

In the device controller according to the first aspect of the present invention, the presentation unit presents the one or more devices to be controlled by the application software in association with each of the one or more pieces of application software.

In the device controller according to the first aspect of the present invention, the presentation unit presents, in different forms, a first type of device required to be controlled in the type of service and a second type of device to be controlled in a service other than the type of service among the one or more devices to be controlled by the application software.

The device controller according to the first aspect of the present invention further includes: a storage unit configured to store user identification information for identifying a user of the communication terminal and device identification information for identifying a device to be controlled by the communication terminal in association with each other, wherein the presentation unit presents the device indicated by the device identification information stored in the storage unit in association with the user identification information belonging to a predetermined user group with a priority which is higher than that of another device.

In the device controller according to the first aspect of the present invention, the setting unit is configured to store information for identifying the selected application software in association with identification information of the communication terminal.

In the device controller according to the first aspect of the present invention, the presentation unit is configured to transmit selected application software to the communication terminal and executes a process related to shipment of a selected device in accordance with acquisition of information for requesting a purchase of application software and a device selected from among the one or more pieces of application software and the one or more devices.

The device controller according to the first aspect of the present invention further includes: a storage unit configured to store user identification information for identifying a user of the communication terminal and device identification information for identifying a device to be controlled by the communication terminal in association with each other, wherein the presentation unit causes the storage unit to store the device identification information of the selected device and the user identification information of the user who purchases the selected device in association with each other.

In the device controller according to the first aspect of the present invention, the acquisition unit is further configured to acquire device identification information for identifying the device to be used by a user of the communication terminal, and the presentation unit presents information for identifying the one or more pieces of application software for which the device corresponding to the device identification information serves as a control target in accordance with acquisition of the device identification information by the acquisition unit.

According to a fourth aspect of the present invention, there is provided a device controller connected to a communication terminal and a plurality of devices via a network, the device controller including: a storage unit configured to store user device identification information for identifying a user device possessed by a user from among the plurality of devices in association with user identification information for identifying the user of the communication terminal; a first transmission unit configured to transmit data for an operation screen for specifying operation details from among candidates of operation details for the user device of the user device identification information stored in the storage unit in relation to the user identification information to the communication terminal in accordance with acquisition of the user identification information from the communication terminal; an acquisition unit configured to acquire first control information including the operation details specified in the operation screen from the communication terminal; a generation unit configured to generate second control information for causing the user device to execute the operation details included in the first control information; and a second transmission unit configured to transmit the second control information.

In the device controller according to the fourth aspect of the present invention, the first transmission unit is configured to transmit the data of the operation screen including the candidates of operation details selected on the basis of a type of user device.

In the device controller according to the fourth aspect of the present invention, the storage unit is configured to store a plurality of pieces of user device identification information in association with the user identification information, the first transmission unit further transmits data for an operation screen for specifying an operation condition from among candidates of operation condition for causing the user device to execute the operation details, the acquisition unit is further configured to acquire the first control information including the operation condition specified in the operation screen, and the second transmission unit is configured to transmit the second control information if the operation condition has been satisfied.

In the device controller according to the fourth aspect of the present invention, the first transmission unit is configured to transmit the data of the operation screen including the candidates of operation condition selected on the basis of types of the plurality of user devices.

In the device controller according to the fourth aspect of the present invention, the first transmission unit is configured to transmit the data of the operation screen including the candidates of operation condition determined on the basis of the operation details acquired by the acquisition unit.

In the device controller according to the fourth aspect of the present invention, the second transmission unit is configured to transmit third control information for issuing an instruction for acquiring monitoring information indicating a monitoring result in a monitoring device configured to monitor whether or not the operation condition is satisfied among the plurality of user devices to the monitoring device and transmit the second control information if the monitoring information which has been received satisfies the operation condition.

In the device controller according to the fourth aspect of the present invention, the second transmission unit is configured to retransmit the third control information if the monitoring information does not satisfy the operation condition.

In the device controller according to the fourth aspect of the present invention, the second transmission unit is configured to stop the transmission of the third control information if the monitoring information satisfies the operation condition.

In the device controller according to the fourth aspect of the present invention, the first transmission unit is configured to transmit, to the communication terminal, data of a screen for selecting the user device to be operated from the plurality of user devices in accordance with the acquisition of the operation condition by the acquisition unit.

In the device controller according to the fourth aspect of the present invention, the generation unit is configured to generate the second control information for causing a device server for controlling the user device to control the user device as the operation details, and the second transmission unit is configured to transmit the second control information to the device server.

According to a fifth aspect of the present invention, there is provided a communication terminal connected to a device controller configured to control a plurality of devices via a network, the communication terminal including: an operation reception unit configured to receive an input operation of user identification information for identifying a user of the communication terminal; a transmission unit configured to transmit the received user identification information to the device controller; and a display control unit configured to cause a display unit to display an operation screen for specifying operation details from among candidates of operation details for a user device associated with the user identification information among the plurality of devices, wherein the transmission unit is configured to transmit first control information including the operation details specified in the operation screen to the device controller.

According to a sixth aspect of the present invention, there is provided a device control method in which a device controller controls a plurality of devices connected via a network by a communication terminal, the device control method including: displaying an operation screen for specifying operation details from among candidates of operation details for a user device possessed by a user of the communication terminal among the plurality of devices to the communication terminal; transmitting, by the communication terminal, first control information including the operation details specified in the operation screen to the device controller; generating, by the device controller, second control information for causing the user device to execute the operation details included in the first control information; transmitting, by the device controller, the second control information to the user device; and performing, by the user device, an operation on the basis of the second control information.

According to a seventh aspect of the present invention, there is provided a device control system including a communication terminal and a device controller connected to the communication terminal and a plurality of devices via a network, wherein the device controller includes a storage unit configured to store user device identification information for identifying a user device possessed by a user from among the plurality of devices in association with user identification information for identifying the user of the communication terminal; a first transmission unit configured to transmit, to the communication terminal, data for an operation screen for specifying operation details from among candidates of operation details for the user device of the user device identification information stored in the storage unit in relation to the user identification information in accordance with acquisition of the user identification information from the communication terminal; an acquisition unit configured to acquire first control information including the operation details specified in the operation screen from the communication terminal; a generation unit configured to generate second control information for causing the user device to execute the operation details included in the first control information; and a second transmission unit configured to transmit the second control information.

According to an eighth aspect of the present invention, there is provided a device controller connected to a communication terminal and a plurality of devices via a network, the device controller including: an acquisition unit configured to receive first control information for controlling a plurality of devices of predetermined type from the communication terminal capable of controlling at least some devices of the plurality of devices, the first control information including specific information for identifying a control target device selected from the plurality of devices; a device identification unit configured to identify the control target device on the basis of the specific information included in the first control information; an information generation unit configured to generate second control information for causing the control target device to execute control details indicated by the first control information, the second control information being different from the first control information; a transmission unit configured to transmit the second control information; and a compensation output unit configured to output compensation according to the number of generations of the second control information.

In the device controller according to the eighth aspect of the present invention, the compensation output unit is configured to output predetermined first basic compensation as the compensation until the number of generations reaches a first reference value.

In the device controller according to the eighth aspect of the present invention, the compensation output unit is configured to calculate the number of generations on the basis of a rule determined for each piece of application software to be used in control of the control target device by the communication terminal transmitting the first control information.

In the device controller according to the eighth aspect of the present invention, the compensation output unit is configured to output the compensation obtained by multiplying a unit price determined for each type of first control information by the number of generations.

In the device controller according to the eighth aspect of the present invention, the compensation output unit is configured to output the compensation obtained by multiplying a unit price determined on the basis of the number of types of second control information generated on the basis of the first control information in the information generation unit by the number of generations.

In the device controller according to the eighth aspect of the present invention, the first control information includes control details of the control target device and the compensation output unit is configured to output the compensation obtained by multiplying a unit price determined for each of the control details included in the first control information by the number of generations.

In the device controller according to the eighth aspect of the present invention, the compensation output unit is configured to output the compensation obtained by multiplying a unit price determined for each type of control target device to be controlled on the basis of the second control information by the number of generations.

In the device controller according to the eighth aspect of the present invention, the transmission unit is configured to transmit the second control information to a device server for controlling the control target device, and the compensation output unit is configured to output the compensation calculated on the basis of information received from the device server receiving the second control information.

According to a ninth aspect of the present invention, there is provided a compensation calculation method in which a computer is configured to calculate compensation for a service in which a device selected from among a plurality of devices is controlled by a communication terminal, the compensation calculation method including: receiving first control information for controlling a plurality of devices of predetermined type from the communication terminal capable of controlling at least some devices of the plurality of devices, the first control information including specific information for identifying a control target device selected from the plurality of devices; identifying the control target device on the basis of the specific information included in the first control information; generating second control information for causing the control target device to execute control details indicated by the first control information, the second control information being different from the first control information; transmitting the second control information; and outputting compensation according to the number of generations of the second control information.

According to a tenth aspect of the present invention, there is provided a device control system including a communication terminal and a device controller connected to the communication terminal and a plurality of devices via a network, wherein the communication terminal transmits first control information for controlling a plurality of devices of predetermined type to the device controller, the first control information including specific information for identifying a control target device among the plurality of devices, and wherein the device controller includes an acquisition unit configured to receive the first control information from the communication terminal capable of controlling at least some devices of the plurality of devices; a device identification unit configured to identify the control target device on the basis of the specific information included in the first control information; an information generation unit configured to generate second control information for causing the control target device to execute control details indicated by the first control information, the second control information being different from the first control information; a transmission unit configured to transmit the second control information; and a compensation output unit configured to output compensation according to the number of generations of the second control information.

According to an eleventh aspect of the present invention, there is provided a device controller connected to a communication terminal and a plurality of devices via a network, the device controller including: a storage unit configured to store the number of controllable devices to be controlled by the communication terminal among the plurality of devices in association with identification information of the communication terminal; an acquisition unit configured to receive first control information for controlling a plurality of devices of predetermined type from the communication terminal, the first control information including specific information for identifying a control target device selected from the controllable device; a device identification unit configured to identify the control target device on the basis of the specific information included in the first control information; a generation unit configured to generate second control information for causing the control target device to execute control details indicated by the first control information, the second control information being different from the first control information; a transmission unit configured to transmit the second control information; and a compensation output unit configured to output compensation according to the number of controllable devices stored by the storage unit.

In the device controller according to the eleventh aspect of the present invention, the acquisition unit is further configured to acquire a registration request for requesting registration of the controllable device, and the compensation output unit is configured to output the compensation in accordance with the acquisition of the registration request by the acquisition unit.

In the device controller according to the eleventh aspect of the present invention, the storage unit is further configured to store types of controllable devices and device-specific compensations associated with the types of controllable devices, and the compensation output unit is configured to output the compensation obtained by summing the device-specific compensations of the controllable devices stored in the storage unit in association with the identification information of the communication terminal.

In the device controller according to the eleventh aspect of the present invention, the compensation output unit is configured to output predetermined second basic compensation as the compensation until the number of controllable devices stored in the storage unit in association with the identification information of the communication terminal reaches a second reference value.

In the device controller according to the eleventh aspect of the present invention, the compensation output unit is configured to output the compensation obtained by summing third basic compensation determined on the basis of the number of controllable devices and additional compensation based on the number of controls in which the communication terminal has controlled the control target device.

In the device controller according to the eleventh aspect of the present invention, the number of controls is the number of times the acquisition unit has received the first control information.

In the device controller according to the eleventh aspect of the present invention, the number of controls is the number of times the generation unit has generated the second control information.

In the device controller according to the eighth or eleventh aspect of the present invention, the compensation output unit is configured to output the compensation in association with application software to be used in control of the control target device by the communication terminal.

In the device controller according to the eighth or eleventh aspect of the present invention, the compensation output unit is configured to output the compensation in association with a user of the communication terminal.

In the device controller according to the eighth or eleventh aspect of the present invention, the transmission unit is configured to transmit the second control information to a device server for controlling the control target device, and the compensation output unit is configured to output the compensation in association with the device server.

According to a twelfth aspect of the present invention, there is provided a compensation calculation method in which a computer is configured to calculate compensation for a service in which a device selected from a plurality of devices is controlled by a communication terminal, the compensation calculation method including: acquiring first control information for controlling a plurality of devices of predetermined type from the communication terminal, the first control information including specific information for identifying a control target device selected from a controllable device to be controlled by the communication terminal; identifying the control target device on the basis of the specific information included in the first control information; generating second control information for causing the control target device to execute control details indicated by the first control information, the second control information being different from the first control information; transmitting the second control information; and outputting compensation according to the number of controllable devices of the communication terminal.

According to a thirteenth aspect of the present invention, there is provided a device control system including a communication terminal and a device controller connected to the communication terminal and a plurality of devices via a network, wherein the communication terminal transmits first control information for controlling a plurality of devices of predetermined type to the device controller, the first control information including specific information for identifying a control target device selected from controllable devices to be controlled by the communication terminal among the plurality of devices, and wherein the device controller includes an acquisition unit configured to receive the first control information; a device identification unit configured to identify the control target device on the basis of the specific information included in the first control information; a generation unit configured to generate second control information for causing the control target device to execute control details indicated by the first control information, the second control information being different from the first control information; a transmission unit configured to transmit the second control information; and a compensation output unit configured to output compensation according to the number of controllable devices of the communication terminal.

Advantageous Effects of Invention

According to the present invention, it is possible to control various types of devices with a single piece of application software.

BRIEF DESCRIPTION OF DRAWINGS

FIG. 3 is a diagram showing a configuration of a device controller according to the first embodiment.

FIG. 4 is a diagram showing an example of a user information DB stored by a user storage unit in the first embodiment.

FIG. 5 is a diagram showing control information according to the first embodiment.

FIG. 8 is a diagram showing an operation sequence when the device controller of the first embodiment controls a device.

FIG. 9 is a diagram showing an example of a user information DB in a modified example 1.

FIG. 10 is a diagram showing an example of first control information transmitted from a communication terminal in the modified example 1.

FIG. 14 is a diagram showing an example of a user information DB stored by a user storage unit in the fourth embodiment.

FIG. 15 is a diagram showing an example of an application/device DB according to the fourth embodiment.

FIG. 20 is a diagram showing an example of a user information DB stored by a user storage unit in the seventh embodiment.

FIG. 21 is a diagram showing an example of an operation details DB stored by an operation details storage unit in the seventh embodiment.

FIG. 25 is a diagram showing an operation sequence when a device controller according to the eighth embodiment controls a device.

FIG. 30 is a diagram showing an example of a user information DB according to the thirteenth embodiment.

DESCRIPTION OF EMBODIMENTS

First Embodiment

[Outline of Device Control System S]

Figure 1:
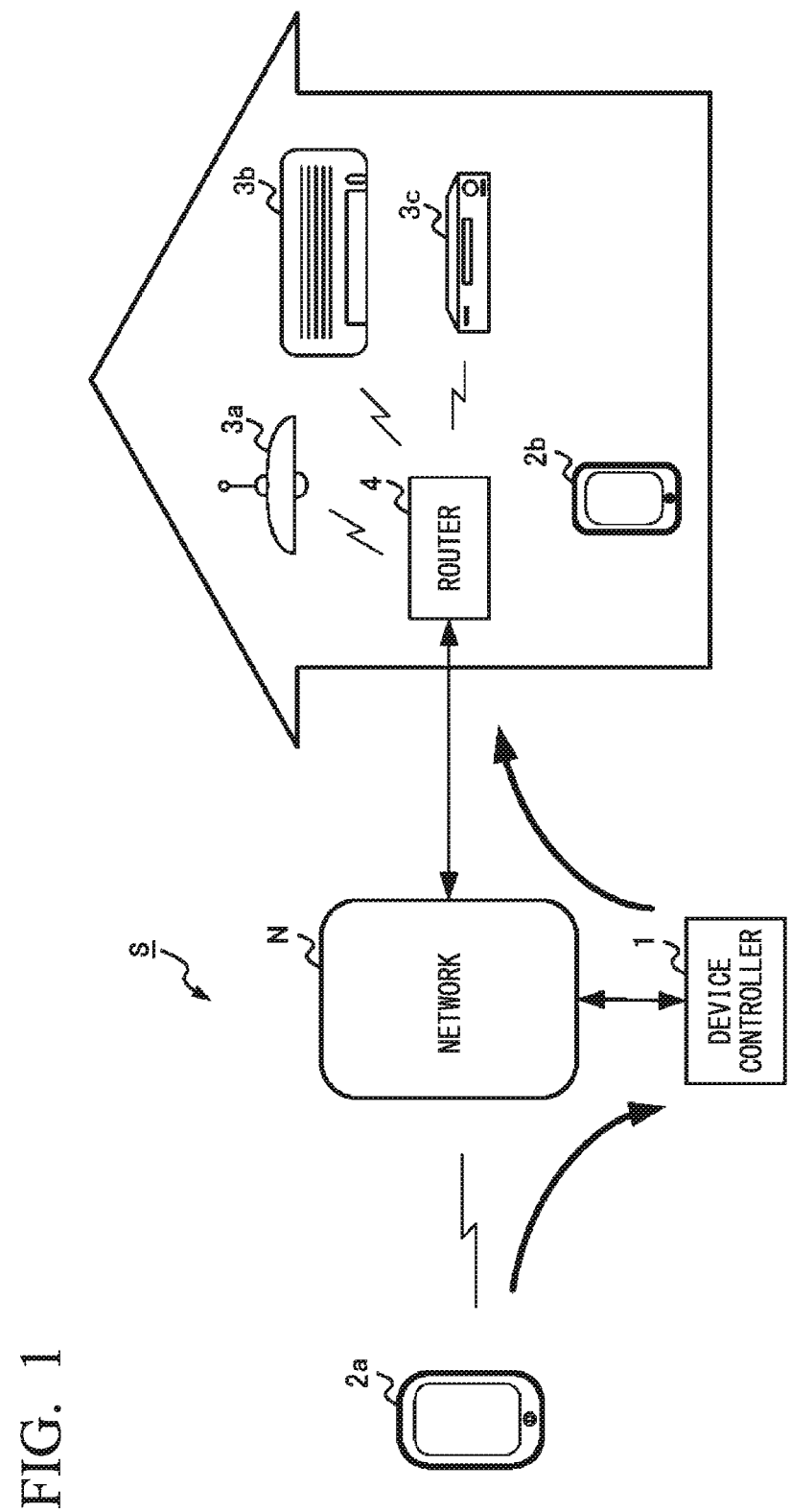
FIG. 1 is a diagram showing an outline of a device control system according to a first embodiment.

FIG. 1 is a diagram showing an outline of a device control system S according to a first embodiment. The device control system S includes a device controller 1, communication terminals 2 (2a and 2b), devices 3 (3a, 3b, and 3c), and a router 4. The device controller 1, the communication terminals 2, and the router 4 are connected to a network N via a wired communication line or a wireless communication line.

The network N includes the Internet, a portable phone network, a Wi-Fi (registered trademark) line, and the like. Although two communication terminals 2 and three devices 3 are shown in FIG. 1, the device controller 1 can transmit and receive data to and from more communication terminals 2 and more devices 3.

The device controller 1 is, for example, a computer having a central processing unit (CPU) and a storage medium. The device controller 1 can communicate with the communication terminals 2 and the devices 3 via the network N.

The communication terminal 2 is, for example, a portable terminal having a wireless communication function. The communication terminal 2 is, for example, a smartphone, a tablet, a phablet, a notebook personal computer (PC), a desktop PC, or the like. The communication terminal 2 transmits first control information for controlling the device 3 to the device controller 1 by executing application software. In FIG. 1, the communication terminal 2a is located outside a user's house where the device 3 is installed, and the communication terminal 2b is located inside the house where the device 3 is installed. The communication terminal 2 can communicate with the device controller 1 via the network N regardless of a place.

The device 3 is a device having a communication function, and is, for example, an electrical device installed in the user's house of the communication terminal 2. In an example shown in FIG. 1, the device 3a is a lighting device (hereinafter referred to as a light), the device 3b is an air conditioner, and the device 3c is a video recorder. Each device 3 includes any device capable of receiving data from the device controller 1. The router 4 is connected to the network N, and transfers the data received from the device controller 1 to any one of the device 3a, the device 3b, and the device 3c.

The device controller 1 receives first control information for controlling the device 3 from the communication terminal 2 configured to execute application software. On the basis of details of the received first control information, the device controller 1 selects the device 3 to be controlled from among the plurality of devices 3, and generates second control information for controlling the selected device 3.

The first control information are information generated by the application software on the basis of an application programming interface (API) of a general-purpose format that does not depend on the devices 3. The second control information are information written in accordance with the API which is a format dedicated for a device controlling the specific device 3. The second control information are, for example, information in a format differing according to each manufacturer and type name of the devices 3.

The application software is general-purpose software for controlling a devices 3 of specific type (for example, a light). The application software can transmit the first control information for controlling devices 3 of the same type irrespective of the manufacturer or the type name to the device controller 1. Because the first control information output by the communication terminal 2 configured to execute the application software has a format different from that of the second control information, the communication terminal 2 cannot directly control the device 3 according to the first control information. In the device control system S of the present embodiment, the device controller 1 generates the second control information on the basis of the first control information and transmits the second control information to the target device 3 to be controlled by the user of the communication terminal 2. Therefore, the user can control devices 3 of various types with the communication terminal 2 in which general-purpose application software is installed.

Figure 2A:
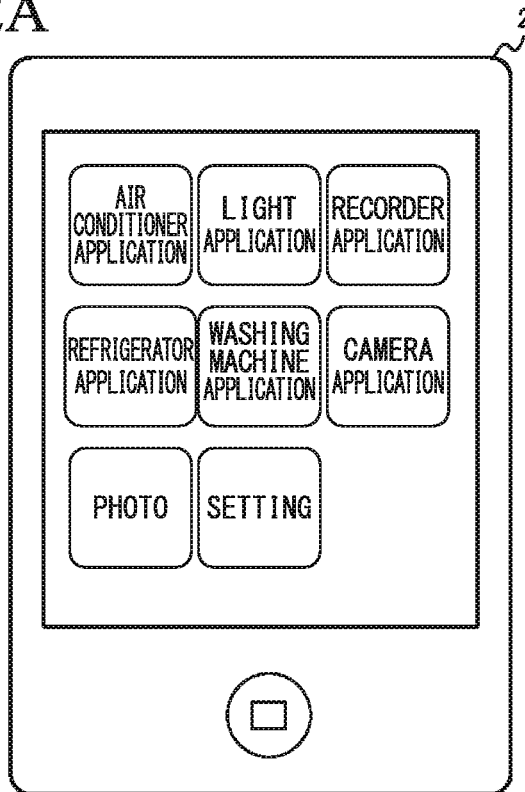
FIG. 2A is an example of a screen of a communication terminal according to the first embodiment.
Figure 2B:
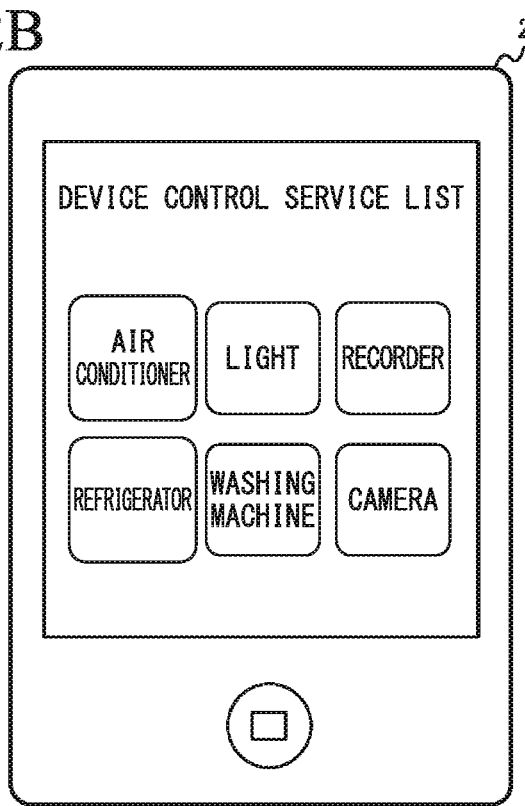
FIG. 2B is another example of the screen of the communication terminal according to the first embodiment.

FIG. 2A is an example of the screen of the communication terminal 2 in the first embodiment. FIG. 2B is another example of the screen of the communication terminal 2 in the first embodiment. In the communication terminal 2, various types of application software for controlling devices 3 of various types are installed. According to FIG. 2A, an air conditioner application for controlling an air conditioner, a light application for controlling a light, a recorder application for controlling a video recorder, a camera application for controlling a monitoring camera, a refrigerator application for controlling a refrigerator, and a washing machine application for controlling a washing machine are installed. On the screen shown in FIG. 2A, icons corresponding to pieces of application software are displayed.

For example, when the user desires to control one of the devices 3 installed in his/her house, the user activates the application software corresponding to the device 3 to be controlled. Thereby, the user can control the desired device 3 in a place away from his/her house. A screen of FIG. 2A shows an example in which application software is installed for each type of device 3. On the other hand, as shown in a screen of FIG. 2B, a list of devices 3 capable of being controlled by a single piece of application software is displayed, and the device 3 may be controlled by the communication terminal 2 when the user selects the device 3 to be controlled. In this case, the communication terminal 2 executes a single piece of application software, thereby outputting, for example, first control information for the light and first control information for the air conditioner.

Also, in the communication terminal 2, an integrated application capable of displaying a list of devices 3 capable of being controlled by the user may be installed. The user activates the integrated application to perform a predetermined operation and therefore the screen shown in FIG. 2A or 2B for activating the application software for controlling each device may be displayed.

[Configuration of Device Controller 1]

FIG. 3 is a diagram showing a configuration of the device controller 1 according to the first embodiment. The device controller 1 includes a communication unit 111, a storage unit 112, and a control unit 113.

The communication unit 111 has, for example, a local area network (LAN) controller. The communication unit 111 transmits and receives data to and from the communication terminal 2 and the device 3 via the network N.

The storage unit 112 includes a storage medium such as a read only memory (ROM), a random access memory (RAM), or a hard disk. The storage unit 112 stores a program to be executed by the control unit 113. Also, the storage unit 112 stores data to be used when the control unit 113 operates and data generated by the control unit 113.

The storage unit 112 includes a user storage unit 1121 and an API storage unit 1122 as areas for storing data used by the control unit 113. The user storage unit 1121 stores identification information of the device 3 (hereinafter referred to as a device ID) pre-registered as a device to be controlled by the user in association with the identification information of the user of the communication terminal 2 (hereinafter referred to as a user ID). Also, the API storage unit 1122 stores information to be used by the control unit 113 to generate the second control information on the basis of details of the first control information transmitted from the communication terminal 2. The information to be used for generating the second control information is about, for example, an API determined for each manufacturer or each type name of the device.

FIG. 4 is a diagram showing an example of a user information database (hereinafter referred to as a user information DB) stored by the user storage unit 1121 in the first embodiment. In the user information DB, a type, a device ID, a manufacturer name and an address of the device 3 capable of being controlled by the user are associated with a user ID.

The user ID is identification information unique to the user. The user ID is, for example, information associated with information of a contract with a communication company for providing a communication line used by the communication terminal 2 of the user.

The type of device is information indicating a type of function provided in the device 3. The type of device is used to identify a type of light, air conditioner, recorder, monitoring camera, clock, or the like. Application software installed in the communication terminal 2 and configured to control the device 3 is created for each type of device.

The device ID is identification information assigned to the device 3 capable of being controlled by the user, and includes, for example, the type name of a product. In the example shown in FIG. 4, when a user with a user ID "0001" possesses a plurality of devices 3 of the same type name such as a light of company C, the device ID is information in which a serial number is added to the type name (for example, LC0020-1 or LC0020-2).

The manufacturer name is a manufacturer name of each device 3. The device 3 is identified according to a combination of the device ID and the manufacturer name.

The address is information indicating a destination to which the second control information are transmitted to the device 3 and is information unique to the device 3 such as a global Internet protocol (IP) address or a media access control (MAC) address. When the global IP address is assigned to the router 4 and the device controller 1 stores the address of the router 4 in association with the user, the address included in the first control information may be a local IP address.

Details of the control unit 113 will be described with reference to FIG. 3 again. The control unit 113 is, for example, a CPU. The control unit 113 functions as an acquisition unit 1131, a device identification unit 1132, an information generation unit 1133, a transmission unit 1134, and a charging unit 1135 by executing the program stored in the storage unit 112.

The acquisition unit 1131 acquires the first control information for controlling the device 3 pre-registered in the device controller 1 from the communication terminal 2 of the user who can receive the provision of the service. The first control information are information for the user to control a type of controllable device 3 with the application software installed in the communication terminal 2.

FIG. 5 is a diagram showing control information according to the first embodiment. A table T11 of FIG. 5 shows information included in the first control information transmitted from the communication terminal 2 to the device controller 1. A table T12 of FIG. 5 shows information included in the second control information transmitted from the device controller 1 to the device 3.

Figure 6:
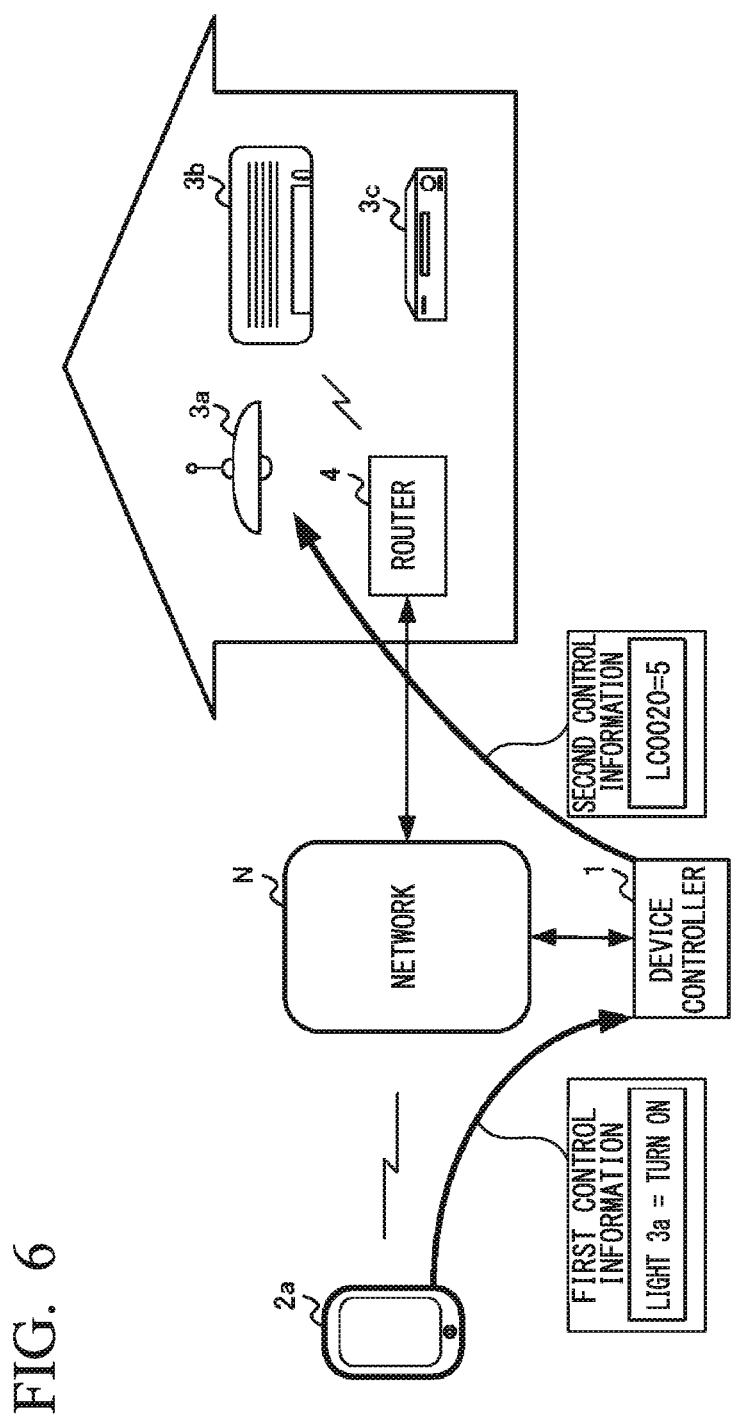
FIG. 6 is a diagram showing a flow of data when a device is controlled by a communication terminal in the first embodiment.

FIG. 6 is a diagram showing the flow of data when the device 3*a* is controlled by the communication terminal 2 in the first embodiment. The communication terminal 2*a* transmits the first control information including information of control details such as "turn on", "turn off", "automatic answering mode setting", "timer setting" and the like written in a format conforming to the API for light control ("turn on" in the example of FIG. 6). When the first control information are received, the device controller 1 generates second control information written using the API for controlling the device 3*a* and transmits the second control information to the device 3*a* via the network N and the router 4.

As shown in the table T11 of FIG. 5, the first control information acquired by the acquisition unit 1131 includes an application ID, device identification information, and control details information. The application ID is information indicating the type of the first control information and is used for identifying a type of device 3 to be controlled. The application ID is, for example, information for identifying whether application software used by the user is for air conditioner control or light control.

The device identification information is information including a device ID included in the user information DB shown in FIG. 4.

The control details information is information indicating how to control the device 3 identified by the device ID. That is, the control details information is information indicating control details for the device 3 to be controlled. For example, according to the table T11 of FIG. 5, as control details of the first control information of the user ID "0001", the application ID "air conditioner application", and the device ID "AA0001", control details indicating that the temperature of the air conditioner is set to 25° C. are shown. Regardless of the type name of the device 3, the control details information has a format determined for each type of device. In other words, the first control information include control details having a format common to a plurality of devices of a predetermined type. Therefore, a developer of application software can develop the application software with a common API without being conscious of the type name of the device 3.

The units ranging from the device identification unit 1132 to the charging unit 1135 will be described with reference to FIG. 3 again.

The device identification unit 1132 identifies a control target device on the basis of the first control information. The device identification unit 1132 refers to the user information DB (FIG. 4) of the user corresponding to the user ID included in the first control information. The device identification unit 1132 refers to this user information DB and identifies the device 3 having the device ID corresponding to the device identification information included in the first control information as the control target device. The device identification unit 1132 may identify the control target device from a device of the device ID stored in association with the user ID included in the first control information. The device identification unit 1132 notifies the information generation unit 1133 of the type name of the identified device 3 and notifies the transmission unit 1134 of the address of the identified device 3.

The information generation unit 1133 identifies the format of the first control information on the basis of the application ID included in the first control information, thereby generating the second control information for causing the control target device to execute the control details included in the first control information. For example, the information generation unit 1133 generates the second control information on the basis of the API for the control target device stored in the storage unit 112. Specifically, the information generation unit 1133 generates the second control information by specifying the control details included in the first control information in the API corresponding to the type name of the device 3 identified by the device identification unit 1132. The information generation unit 1133 can convert the first control information into the second control information having a format differing according to each manufacturer or type name of the device 3 as shown in a table T12 of FIG. 5.

In the second control information for LC0020 in the table T12 of FIG. 5, even though the control details are "turn on" in the first control information, "brightness=5" in the second control information. Depending on the manufacturer or the type name of the light, the API corresponds to the specification of brightness without corresponding to the specification of "turn on" or "turn off". According to the light to be controlled, the light may not be controlled unless the control information are the second control information created according to the API that specifies the brightness. The information generation unit 1133 generates the second control information by describing the control details included in the first control information in the format of a dedicated API of the device 3. That is, the second control information include control details with a format corresponding to the device 3 to be controlled. Thereby, the developer of the application software can develop the application software without being conscious of the dedicated API differing according to each device 3. Also, the user can control the devices 3 of different type names with a single piece of application software.

The transmission unit 1134 transmits second control information for causing the control details indicated by the first control information to be executed to the address of the control target device obtained through a notification provided from the device identification unit 1132.

In accordance with the control of the device 3 by the user using the communication terminal 2, the charging unit 1135 is configured to calculate the amount of charge for the user. The charging unit 1135 stores the calculated amount of charge in the storage unit 112 in association with the user ID. The charging unit 1135 may transmit the amount of charge to a server of a communication company that manages a usage fee of the communication terminal 2. Thereby, it is possible to make a billing process more efficient because it is possible to charge a service usage fee to the user by adding the service usage fee to the usage fee of the communication terminal 2.

Also, when the user controls the device 3 with the application software installed in the communication terminal 2, the charging unit 1135 may charge a fee to a business entity for providing the application software. For example, the charging unit 1135 may charge an amount of money corresponding to the number of times the information generation unit 1133 has generated the second control information to the business entity for providing the application software on the basis of the first control information transmitted from the communication terminal 2 with the application software.

[Procedure of Registering Control Target Device]

Figure 7A:
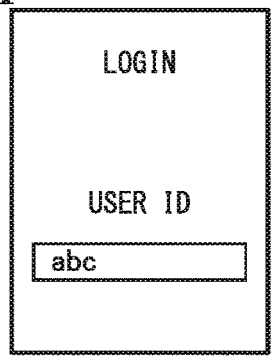
FIG. 7A is a diagram showing a login screen for using the device control service when a target device to be controlled is newly registered with a communication terminal in the first embodiment.

FIGS. 7A to 7D are diagrams showing a procedure when the user newly registers the control target device 3 with the communication terminal 2 in the first embodiment. FIG. 7A is a diagram showing a login screen for using a device control service when registering the device 3 to be controlled. By inputting a preset user ID, the user can add a new control target device or change setting details.

Figure 7B:
FIG. 7B is a diagram showing a screen after login.

FIG. 7B is a diagram showing a screen after login. In FIG. 7B, the user has already registered the air conditioner. By touching an icon of "additional registration", the user can display a screen for registering a new control target device.

Figure 7C:
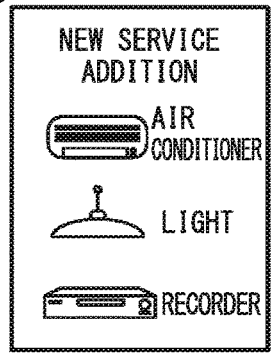
FIG. 7C is a diagram showing a screen for registering a new control target device.

FIG. 7C is a diagram showing a screen for registering a new control target device. When the user touches an icon corresponding to a type of device 3 to be registered among icons displayed on the screen of FIG. 7C, the communication terminal 2 searches for the device 3 to be registered. Specifically, for example, the communication terminal 2 searches for devices 3 capable of performing communication using a wireless communication scheme such as Bluetooth (registered trademark). The communication terminal 2 displays a screen for registering the device 3 when a type of device 3 selected by the user is found. At this point in time, the communication terminal 2 stores type name information, a manufacturer name, and a MAC address acquired from each device 3 in a memory.

Figure 7D:
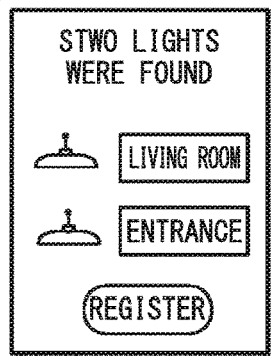
FIG. 7D is a diagram showing a screen for registering devices found through a search.

FIG. 7D is a diagram showing a screen for registering the device 3 found through the search. The user can register the device 3 by inputting a name (for example, an installation place such as a "living room", an "entrance", or the like) to the device 3 to be registered and touching a registration button. The communication terminal 2 generates a device ID including the type name information acquired from the device 3, and stores the device ID in an internal memory in association with the name input by the user. Also, the communication terminal 2 transmits the user ID, the device ID, the manufacturer name, and the MAC address of the user who uses the communication terminal 2 to the device controller 1. Thereby, the user can register the control target device in the device controller 1.

[Operation Sequence when Device 3 is Controlled]

FIG. 8 is a diagram showing an operation sequence when the device controller 1 of the first embodiment controls the device 3. First, when the user activates the application software for controlling the control target device in the communication terminal 2 (S11), the communication terminal 2 acquires the control details input by the user (S12). The communication terminal 2 generates the first control information including the acquired control details and transmits the first control information to the device controller 1 via the network N (S13).

When the device controller 1 receives the first control information, the device identification unit 1132 of the device controller 1 identifies the device 3 to be controlled on the basis of the received first control information (S14). Subsequently, the information generation unit 1133 generates second control information corresponding to the device 3 to be controlled, and the transmission unit 1134 transmits the second control information to the device 3 to be controlled (S15).

When the second control information are received, the device 3 executes an operation according to the control details included in the second control information (S16). When the operation is executed, the device 3 transmits first status information indicating the status of the device 3 itself to the device controller 1 (S17). When the device 3 is a light and the control details are "Turn on", the device 3 transmits the first status information indicating that the turn on of the light is completed. Also, if the device 3 is an air conditioner and the control details are "To set temperature to 25° C.", the device 3 periodically measures a room temperature until the temperature reaches a temperature indicated by the control details after reception of the second control information. Then, the device 3 transmits the first status information indicating the measured room temperature to the device controller 1. Here, the first status information is information created in accordance with a format differing according to each device 3.

When the acquisition unit 1131 of the device controller 1 acquires the first status information, the information generation unit 1133 converts the first status information into the second status information having a format common to the devices 3 of the same type capable of being recognized by the application software of the communication terminal 2 (S18). The transmission unit 1134 transmits the second status information generated through the conversion performed by the information generation unit 1133 to the communication terminal 2 via the network N (S19). When the second status information is received, the communication terminal 2 displays the status of the device 3 indicated by the second status information on the screen (S20).

According to the above procedure, the user can control the desired device 3 and check the status of the device 3 by operating the communication terminal 2.

Modified Example 1

Although an example in which the device ID is used as the device identification information included in the first control information have been described with reference to FIG. 5, the present invention is not limited thereto. For example, in the user information DB (FIG. 4), for each device type possessed by the user, a serial number which is a sequential number of a device 3 among the devices 3 of the same type possessed by the user is associated with the type name of the device 3. In this case, the device identification information included in the first control information may be a serial number. For example, the serial number is a number associated with information indicating an installation place of the device 3 such as a "living room", an "entrance", or the like shown in FIG. 7D and is a number assigned to an order registered in the device controller 1.

FIG. 9 is a diagram showing an example of the user information DB in the modified example 1. FIG. 10 is a diagram showing an example of the first control information transmitted from the communication terminal 2 in the modified example 1. A table T21 of FIG. 10 shows an example of the first control information, and a table T22 thereof shows an example of the second control information. In the user information DB shown in FIG. 9, the device ID indicates the type name of the device, and the device ID is the same (for example, "LC0020") when the user possesses a plurality of devices 3 of the same type name. On the basis of the application ID and the serial number (device identification information) included in the first control information of the table T21, the device identification unit 1132 can identify the transmission target device 3 of the second control information among devices 3 having the same type name. If the device identification information includes information unique to the device 3 such as a MAC address, the first control information may not include the user ID.

Modified Example 2

Although a case in which one communication terminal 2 controls the device 3 has been described in the above description, a plurality of communication terminals 2 may be configured to control the common device 3. For example, if the communication terminal 2b is a communication terminal 2 of a family of a payment target by summing a communication fee with that of the communication terminal 2a, the device control system S may be configured to control the device 3 registered in the communication terminal 2a with the communication terminal 2b.

In order to allow the plurality of communication terminals 2 to control the common device 3, the storage unit 112 stores each of user IDs of each of a plurality of users in association with each other. For example, the acquisition unit 1131 acquires, from a server managed in a communication company, a plurality of user IDs of a payment target by summing communication fees and causes the storage unit 112 to store the plurality of acquired user IDs.

A case in which a first user ID is included in the first control information acquired by the acquisition unit 1131 will be exemplified. In this case, the device identification unit 1132 acquires a second user ID stored in the storage unit 112 in association with the first user ID and checks whether or not the device ID is stored in association with the second user ID in the user information DB. If the device ID is stored in association with the second user ID, the device identification unit 1132 identifies the control target device by identifying the device ID associated with the second user ID. The device identification unit 1132 may identify the control target device from the device ID stored in association with the second user ID in the user information DB.

In this manner, if the common device 3 is controllable by the plurality of communication terminals 2, the charging unit 1135 may perform charging for the user (for example, the user of the second user ID) registered as a representative among the plurality of users. That is, the charging unit 1135 may charge costs for the transmission of the first control information from the communication terminal 2 of the first user ID, to the user corresponding to the second user ID. In accordance with reception of the first control information including the identification information of the first user ID, the charging unit 1135 charges the second user ID a fee. Thereby, because the user of the second user ID who pays a communication fee also can pay a usage fee of the device control service together with the communication fee, time and effort of other users for paying the service usage fee individually is not needed.

[Effects of Device Control System S of First Embodiment]

As described in the first embodiment, the device control system S uses application software which is installed in the communication terminal 2 and can control a plurality of devices of the same type with different type names. The user operates the application software and therefore the first control information with a format common to the devices of the same type are transmitted to the device controller 1. On the basis of the received first control information, the device controller 1 generates the second control information using the dedicated API for the device and transmits the second control information to the device 3 specified in the first control information.

Thereby, the user can control various types of devices 3 with a single piece of application software without installing application software differing according to each device in the communication terminal 2. Thus, when the user replaces the device 3 with a new device 3, it is unnecessary for the user to replace the application software in the communication terminal 2. Also, the manufacturer of the device 3 does not need to provide the application software every time a sale of the new device 3 is started and only needs to release the API. Thus, the manufacturer of the device 3 can minimize the development costs.

Further, the device controller 1 enables, for example, a common device 3 to be controlled by a plurality of users who pay money by summing communication fees. Thereby, one of family members registers the control target device 3, so that another user (family) can control the device 3. As a result, the time and effort when other users register the device 3 can be saved.

Furthermore, the costs when a plurality of users who pay money by summing the communication fees use the service are summed and charged. Thus, the time and effort of each user for individually paying the service usage fee is not needed.

Second Embodiment

Figure 11:
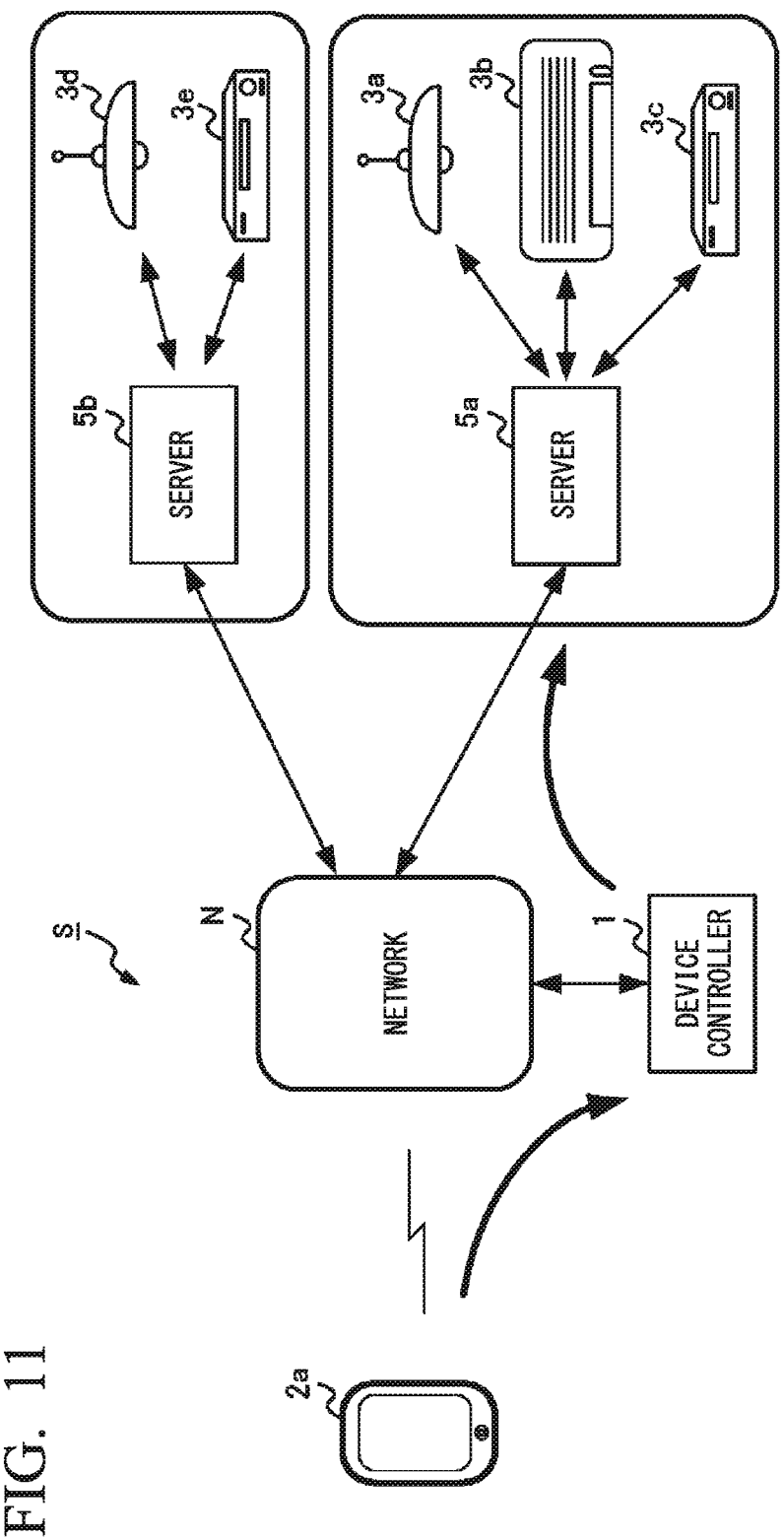
FIG. 11 is a diagram showing a device control system according to a second embodiment.

FIG. 11 is a diagram showing a device control system S according to a second embodiment. The second embodiment is different from the first embodiment in that the device 3 is controlled via servers of other service providers such as a server 5a and a server 5b (hereinafter also referred to as a server 5). For example, the server 5a and the server 5b are device servers that provide services for controlling devices 3 of their own companies for manufacturers of the devices 3. The server 5a and the server 5b transmit control signals based on second control information to a control target device 3. In this case, when first control information are received from a communication terminal 2, an information generation unit 1133 generates the second control information for causing the server 5 to control the control target device 3 on the basis of control details included in the first control information. Then, the transmission unit 1134 transmits the second control information generated by the information generation unit 1133 to the server 5 which is a device server.

A storage unit 112 of the present embodiment stores an API of the server 5 of each service provider in association with a service provider for controlling the device 3. For example, the information generation unit 1133 generates the second control information on the basis of the API of the server 5 stored in the storage unit 112. Specifically, the information generation unit 1133 converts the control details included in the first control information into the second control information in a format different from that of the first control information. The second control information include a user ID and device identification information included in the first control information.

A user ID is commonly shared in advance between a company for providing a service using the device control system S and a company for providing a service using the server 5*a* or the server 5*b*. The server 5*a* or the server 5*b* can control the device 3 according to an operation in the communication terminal 2 on the basis of the user ID, the device identification information, and the like included in the second control information.

Also, as shown in FIG. 11, if there are a plurality of servers 5 for providing a service for controlling the device 3, the user storage unit 1121 of the device controller 1 stores usage service information indicating a service to be used by the user. According to the example of FIG. 11, the user storage unit 1121 stores usage service information indicating a service which is being used by the user among services using the server 5*a* or services using the server 5*b*. The information generation unit 1133 refers to the usage service information and generates second control information corresponding to the API corresponding to the service that is being used by the user.

If the user ID is not shared by a company for providing a service using the device control system S, a company for providing a service using the server 5*a* and a company for providing a service using the server 5*b*, the device controller 1 may convert the user ID. In this case, the storage unit 112 stores a user DB (not shown) configured to store a user ID of the device control system S and user IDs of a service using the server 5*a* and the server 5*b* in association with each other. The information generation unit 1133 may refer to the user DB on the basis of the usage service information and convert the user ID.

The server 5 receives the second control information from the device controller 1 connected via the network. When the received second control information include an operation instruction to the control target device 3, the server 5 transmits information (a signal) indicating an operation instruction for the device 3 to the device 3. On the other hand, if the received second control information includes a request for data acquired by the device 3, the server 5 transmits operation data, collected data, or the like of the device 3 pre-acquired from the device 3 to the device controller 1. Also, the server 5 does not pre-acquire operation data, collected data, or the like of the device 3, and the operation data, the collected data, or the like may be stored within the device 3. In this case, the server 5 may request operation data, collected data, or the like from the device 3 on the basis of the received second control information and transmit the acquired data to the device controller 1.

[Effects of Device Control System S of Second Embodiment]

As described in the second embodiment, the device controller 1 generates second control information corresponding to the API of another server 5 that controls the device 3. Thereby, even when the user has already received a service for controlling the device 3 via the server 5, it is possible to control the device 3 with any application software installed in the communication terminal 2.

Third Embodiment

Figure 12:
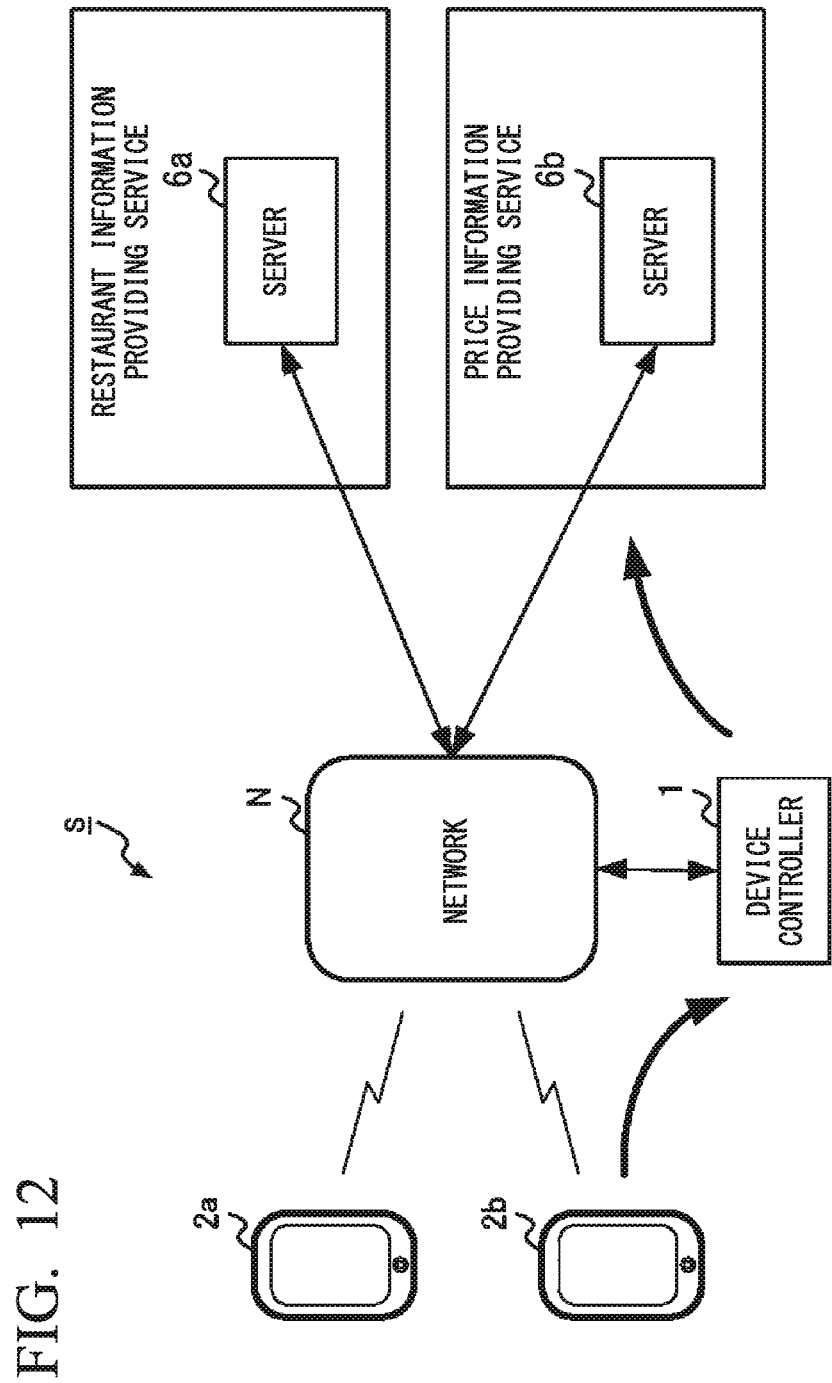
FIG. 12 is a diagram showing a device control system according to a third embodiment.

FIG. 12 is a diagram showing a device control system S according to a third embodiment. The third embodiment is different from the first embodiment in that a control target device 3 is servers 6*a* and 6*b* (hereinafter also referred to as a server 6) configured to distribute information in a company or the like instead of an electrical device located in a house of a user.

The server 6*a* is a server used in a service for providing information about a restaurant posted by a user. The server 6*b* is a server used in a service for providing price information of various products posted by a user. Using the application software installed in the communication terminal 2, the user can upload information desired to be delivered to other people to the server 6.

The server 6 has interfaces of different formats as interfaces for receiving information. Therefore, in order to upload information to the server 6, it is necessary to process the information in a format suitable for each server 6 and transmit the processed information. When the user provides information to a site of each service, it is necessary to use dedicated application software for each of the server 6*a* and the server 6*b* and there is inconvenience.

Therefore, according to a device controller 1 according to the present embodiment, application software for uploading information to the server 6 of various information providing services is installed in the communication terminal 2. In the application software, an icon of a target service for providing information is displayed. When the user touches (selects) an icon of a service for which information is desired to be provided and inputs information, the communication terminal 2 transmits first control information including input information and information for identifying the service selected by the user to the device controller 1.

On the basis of the first control information, the device identification unit 1132 of the device controller 1 identifies the server 6 to which information (content) included in the first control information is transmitted. For example, the device identification unit 1132 identifies the server 6 on the basis of information for identifying the service included in the first control information. The device identification unit 1132 may identify the server 6 to which the content is to be transmitted on the basis of a keyword included in the content created by the user. Then, the information generation unit 1133 generates second control information with a format corresponding to the identified server 6 and the transmission unit 1134 transmits the generated second control information to the server 6.

Also, the charging unit 1135 according to the present embodiment may determine an amount of charge on the basis of the number of times the user has accessed the server 6 using the communication terminal 2 or an amount of data transmitted and received to and from the server 6. In this case, the charging unit 1135 may calculate a part of the determined amount of charge as an amount of money payable to a company for operating the server 6 or the like.

[Effects of Device Control System S of Third Embodiment]

On the basis of the first control information, the device control system S according to the present embodiment identifies the server 6 that is a transmission destination of the content included in the first control information and transmits the second control information in a format corresponding to the server 6 to the server 6. Thereby, a company for operating the server 6 or the like does not need to widely disclose an interface for accessing the server 6 to the public, and it is only necessary to disclose the interface only to an operator of the device controller 1. As a result, the time and effort of a company for operating the server 6 for disclosing the interface is not needed.

Also, the device control system S can return a part of the amount of charge for the user calculated by the charging unit 1135 to the company for operating the server 6 or the like. Thereby, a fee for the user using the server 6 can be charged by an operator of a communication carrier for operating the device controller 1 or the like instead of a company for operating the server 6 or the like in an integrated manner. Thereby, it is possible to save the time and effort of the user, the company for operating the server 6, and the like.

Fourth Embodiment

[Outline of Device Control System S]

An outline of the device control system S according to a fourth embodiment is similar to that of the device control system S according to the first embodiment described with reference to FIG. 1.

Also, controlling a device 3 includes causing the device 3 to be operated and causing any data to be output from the device 3.

[Configuration of Device Controller 1]

Figure 13:
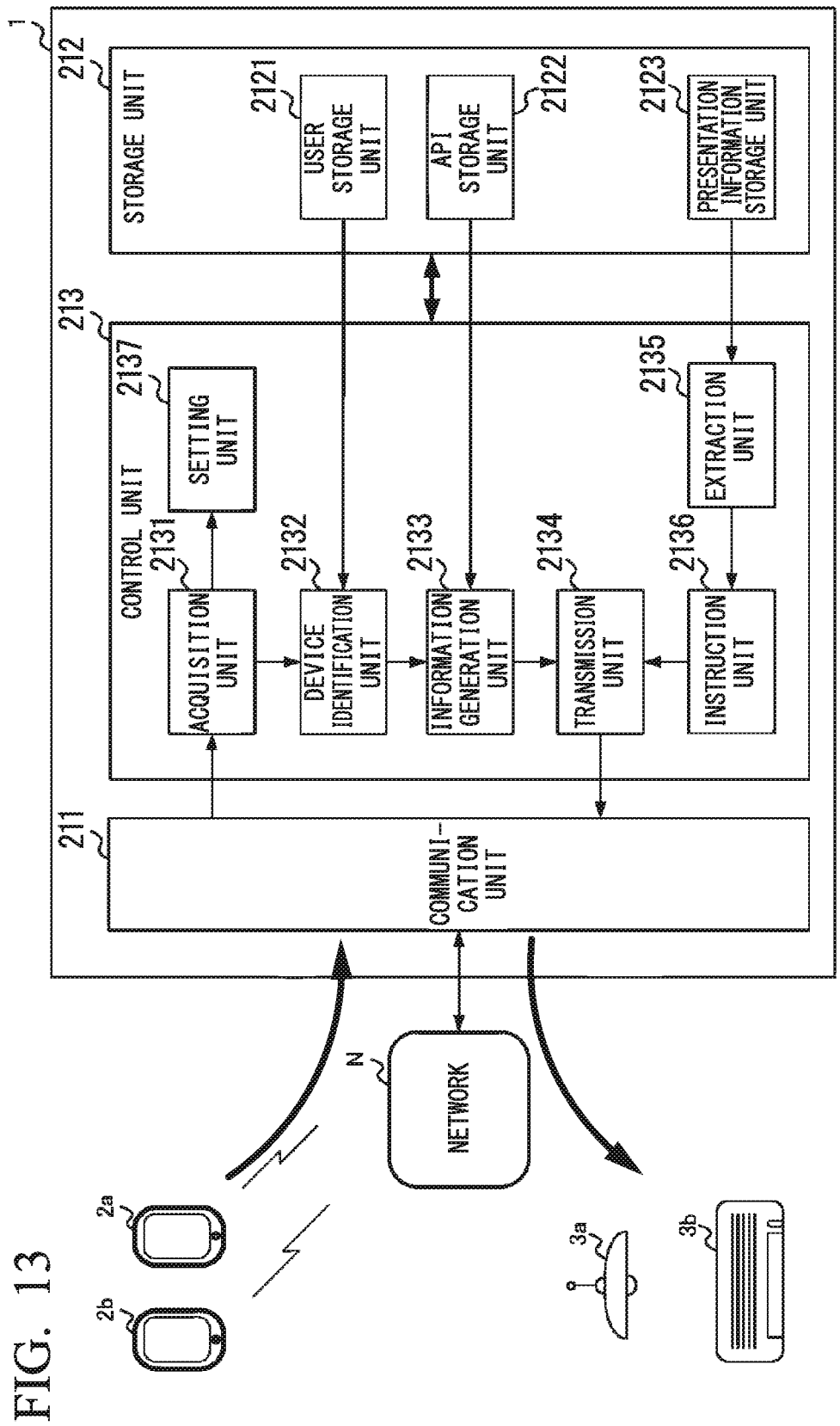
FIG. 13 is a diagram showing a configuration of a device controller according to a fourth embodiment.

FIG. 13 is a diagram showing a configuration of the device controller 1 according to the fourth embodiment. The device controller 1 according to the fourth embodiment includes a communication unit 211, a storage unit 212, and a control unit 213.

The communication unit 211 has, for example, a LAN controller. The communication unit 211 transmits and receives data to and from the communication terminal 2 and the device 3 via a network N.

The storage unit 212 includes a storage medium such as a ROM, a RAM, or a hard disk. The storage unit 212 stores a program to be executed by the control unit 213. Also, the storage unit 212 stores data to be used when the control unit 213 operates and data generated by the control unit 213.

The storage unit 212 has a user storage unit 2121, an API storage unit 2122, and a presentation information storage unit 2123 as areas for storing data to be used by the control unit 213. The user storage unit 2121 and the API storage unit 2122 are similar to the user storage unit 1121 and the API storage unit 1122 in the first embodiment.

FIG. 14 is a diagram showing an example of a user information DB stored by the user storage unit 2121 in the fourth embodiment. In the user information DB in the fourth embodiment, a type (a type of device), a device ID, a manufacturer name, a used status, and an address of the device 3 capable of being controlled by the user are associated with a user ID. The user ID, the type of device, the device ID, the manufacturer name, and the address are as described in the first embodiment.

The used status is information indicating a state in which each device 3 is used by the user. The used status indicates, for example, a state in which each device 3 has already been used by the user or a state in which the device 3 purchased by the user has already been shipped but use by the user has not been started.

Also, the user storage unit 2121 may store an application ID for identifying application software capable of being used by the user in association with a user ID. After the user newly installs the application software in the communication terminal 2, the application ID is registered in association with the user ID by performing a registration process for starting use of the installed application software. The device controller 1 transmits, to the device 3, the second control information from the communication terminal 2 configured to execute the application software for which the application ID is registered in the user storage unit 2121 on condition that the first control information are received.

The presentation information storage unit 2123 stores an application/device database (hereinafter referred to as an "application/device DB") indicating a combination of available application software and the device 3. The application/device DB includes information to be used by the presentation unit 2136 to be described below and is used to present, to the user desiring to control the device 3 with the communication terminal 2, a combination of an application suitable for the type of service desired to be used by the user and the device 3. The type of service represents a type of control target device in the device control service that is provided using the device controller 1 and for enabling the communication terminal 2 to control the device 3.

FIG. 15 is a diagram showing an example of the application/device DB in the fourth embodiment. In the application/device DB, an application name, a type of device capable of being controlled using each application, a device ID, and a manufacturer name are associated with the type of service. The application/device DB is provided and therefore the device controller 1 can present information for allowing the user to use appropriate application software and an appropriate device 3 when the user desires to newly receive the provision of the device control service. Also, when the user purchases a new device 3, when the user desires to control a new device 3 with application software possessed by the user, and the like, it is possible to present information for allowing the user to use appropriate application software and an appropriate device 3.

Details of the control unit 213 will be described with reference to FIG. 13 again. The control unit 213 is, for example, a CPU. By executing the program stored in the storage unit 212, the control unit 213 functions as an acquisition unit 2131, a device identification unit 2132, an information generation unit 2133, a transmission unit 2134, an extraction unit 2135, a presentation unit 2136, and a setting unit 2137.

When the user desires to receive the provision of a service for controlling the device 3 with the communication terminal 2, the acquisition unit 2131 acquires a type of service indicating a type of device desired to be controlled by the user. The type of service indicates a type of device to be controlled in the service. For example, although the acquisition unit 2131 acquires the type of service input by the user in the communication terminal 2, the present invention is not limited thereto, and the type of service input by the user can be acquired in any terminal.

Also, after the provision of a type of service selected by the user is started, the acquisition unit 2131 acquires the first control information for controlling the device 3 pre-registered in the device controller 1 from the communication terminal 2 of the user who can receive the provision of the service. An example of the first control information and the second control information are as described with reference to FIG. 5 in the first embodiment. Also, the flow of data when the device 3 is controlled by the communication terminal 2 is as described with reference to FIG. 6 in the first embodiment.

The processes of the device identification unit 2132 and the information generation unit 2133 are similar to those of the device identification unit 1132 and the information generation unit 1133 in the first embodiment.

The transmission unit 2134 transmits second control information for causing the control details indicated by the first control information to be executed to the address of the control target device provided through a notification from the device identification unit 2132. Also, on the basis of an instruction of the presentation unit 2136, the transmission unit 2134 transmits information for identifying one or more pieces of application software and one or more devices extracted by the extraction unit 2135 to the communication terminal 2.

The extraction unit 2135 extracts one or more pieces of application software available for a service of the type of service acquired by the acquisition unit 2131 and one or more devices 3 available in a provided service capable of being received with each of the one or more pieces of application software. That is, the extraction unit 2135 extracts one or more pieces of application software for providing a service of a type of service and one or more devices to be controlled by each of the one or more pieces of application software. The extraction unit 2135 inputs information for identifying the one or more pieces of application software and the one or more devices 3 which have been extracted to the presentation unit 2136.

The presentation unit 2136 performs presentation by transmitting a list of one or more pieces of application software and a list of one or more devices 3 extracted by the extraction unit 2135 to a terminal to which the user has input the type of service via the transmission unit 2134 (for example, the communication terminal 2). The presentation unit 2136 presents a list of one or more pieces of application software and presents a list of one or more devices 3 available with each of the extracted one or more pieces of application software in association with each of the one or more pieces of application software. For example, the presentation unit 2136 presents presentation information indicating the application software and the device 3 by transmitting the presentation information to the terminal to which the user has input the type of service.

Figure 16A:
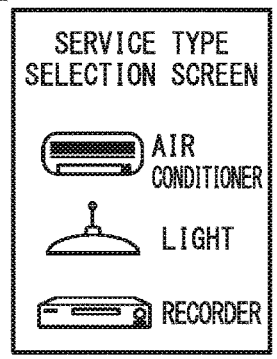
FIG. 16A is a diagram showing a service type selection screen when a presentation unit presents presentation information to a communication terminal in the fourth embodiment.

FIGS. 16A to 16D are diagrams showing a procedure when the presentation unit 2136 presents presentation information to the communication terminal 2 in the fourth embodiment. FIG. 16A is a diagram showing a service type selection screen when the presentation unit 2136 presents the presentation information to the communication terminal 2. When the user of the communication terminal 2 selects a mode for displaying the presentation information, the service type selection screen shown in FIG. 16A is displayed. On the service type selection screen, a list of available types of services in the service using the device controller 1 is displayed. Although an air conditioner, a light, and a recorder are displayed as information indicating the type of service in FIG. 16A, another type of device is displayed when the user scrolls the screen.

Figure 16B:
FIG. 16B is a diagram showing a screen for displaying search states of application software and devices available in the selected type of service.

FIG. 16B is a diagram showing a screen for displaying a search status of application software and a device available in the selected type of service. When the user selects one device from the devices displayed in FIG. 16A, the screen transitions to the screen shown in FIG. 16B. FIG. 16B shows an example in which the user selects a light in FIG. 16A and the extraction unit 2135 is searching for the application software and the device 3 available in a service for controlling the light with reference to the application/device DB (FIG. 15).

Figure 16C:
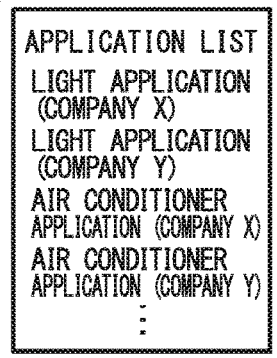
FIG. 16C is a diagram showing a screen for displaying a list of application software available in the selected type of service.
Figure 16D:
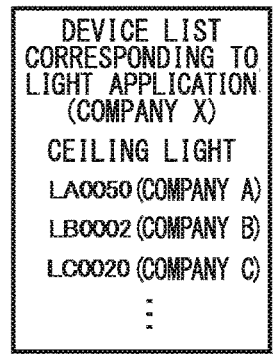
FIG. 16D is a diagram showing a screen for displaying a list of devices capable of being controlled by the selected application software.

FIG. 16C is a diagram showing a screen for displaying a list of application software available in the selected type of service. When the extraction unit 2135 completes the search, the screen transitions to the screen of FIG. 16C. In FIG. 16C, a list of application software available in the type of service selected by the user in FIG. 16A is displayed. FIG. 16D is a diagram showing a screen for displaying a list of devices capable of being controlled by the selected application software. When the user selects one piece of application software from pieces of application software displayed in FIG. 16C, the screen transitions to the screen of FIG. 16D and a list of devices 3 capable of being controlled by the selected application software is displayed.

Also, the presentation unit 2136 may present a first type of device 3 and a second type of device 3 in different forms (for example, different colors) in association with the application software selected by the user from the one or more pieces of application software that have been presented. The first type of device 3 is a device 3 required to be used (serving as a control target) in the type of service acquired by the acquisition unit 2131. The second type of device 3 is a device 3 to be used (serving as a control target) in a service other than the type of service acquired by the acquisition unit 2131. When a single application can control devices 3 corresponding to a plurality of types of services, devices 3 serving as a target of a type of service other than the type of service selected by the user is displayed. In this case, because unnecessary information is displayed for the user, there is inconvenience. Therefore, it is preferable to display the first type of device 3 and the second type of device 3 in different forms when a single application can cope with a plurality of types of services.

Also, the presentation unit 2136 may preferentially present a device 3 that satisfies a predetermined condition. For example, the presentation unit 2136 presents a device 3 in which a device ID is stored in association with a user ID of the user belonging to a predetermined user group according to a priority higher than those of the other devices 3. The user belonging to the predetermined user group is, for example, a user who uses a device control service using the device controller 1. When a communication carrier for providing a communication service using the communication terminal 2 provides a device control service using the device controller 1, the user belonging to the predetermined user group may be a user having a user ID assigned from the communication carrier. The device 3 to be used by the user having the user ID assigned from the communication carrier is assumed to have a use result. Therefore, the presentation unit 2136 can increase the probability that the user will be satisfied by preferentially presenting the device 3 possessed by the user.

At this time, the presentation unit 2136 may present the devices 3 according to an order of priority based on an order of number used in the device control service using the device controller 1. Also, the presentation unit 2136 may present the devices 3 in a descending order of the number of users to be controlled with the application software selected by the user.

The presentation unit 2136 also executes a process in which the user purchases application software and a device 3 selected by the user in FIGS. 16C and 16D. That is, after the presentation unit 2136 presents one or more pieces of application software and one or more devices 3, the acquisition unit 2131 acquires information for requesting a purchase of application software and a device 3 selected by the user of the communication terminal 2. When the information for requesting the purchase is acquired, the presentation unit 2136 transmits the application software selected by the user to the communication terminal 2. Alternatively, the presentation unit 2136 may instruct another device to perform a process of transmitting the selected application software to the communication terminal 2. Also, the presentation unit 2136 executes a process related to the shipment of the device 3 selected by the user. The process related to the shipment is, for example, an instruction for inputting a delivery destination for the user and the transmission of an order form to a seller of the device 3.

In the above-described purchase process, the presentation unit 2136 may transmit a purchase price of the application software and the device 3 to the server of the communication carrier for managing a communication fee of the communication terminal 2 in association with the user ID of the communication terminal 2. Thereby, it is possible to use a payment means of the communication carrier that pays the communication fee without providing a new payment means for the service of the device controller 1. Thereby, the present invention is suitable for a user and a company for providing a service.

When the user purchases the device 3, the presentation unit 2136 registers the device ID of the device 3 to be shipped and the user ID of the user who purchases the device 3 in the user information DB stored in the user storage unit 2121 in association with each other (FIG. 14). Then, the presentation unit 2136 sets information indicating a used status of the purchased device 3 in the user information DB to "shipment completion". At this time, the presentation unit 2136 registers an address in association with the device 3 to be shipped to the user in the user information DB.

The setting unit 2137 sets application software selected by the user among the one or more pieces of application software presented by the presentation unit 2136 as application software available in the communication terminal 2. That is, the setting unit 2137 sets the selected application software among the one or more pieces of application software that have been presented as a target to be used by the communication terminal 2. For example, the setting unit 2137 transmits application software in which information of the address of the device 3 has been written to the communication terminal 2 and instructs a seller of the device 3 to write the same address to the device 3. In this manner, by registering the device ID and the user ID in association with each other in the user information DB, the setting unit 2137 simplifies an initial setting operation of the user installing the device 3. Furthermore, the application software and the device 3 are provided to the user in a state in which they are associated according to the same address, so that the user can start the use of the device 3 promptly when the device 3 arrives without requiring a setting operation.

The setting unit 2137 may set application software so that the application software is available according to the following procedure. When the user activates the application software, the communication terminal 2 causes an image "start" for executing a registration process for starting use to be displayed on a screen of the communication terminal 2. When the user touches the image "start", the communication terminal 2 transmits a start request message to the device controller 1. For example, when the start request message is received from the communication terminal 2 via the acquisition unit 2131, the setting unit 2137 causes the user storage unit 2121 to store the application ID included in the received start request message in association with the user ID of the communication terminal 2.

In this manner, the setting unit 2137 stores the application ID in association with the user ID in the user storage unit 2121, thereby setting the application software to an available state. The setting unit 2137 may store the application ID in the user storage unit 2121 in association with the identification information of the communication terminal 2. After the setting unit 2137 sets application software so that the application software is available, the device controller 1 generates the second control information corresponding to the first control information when the first control information are received from the communication terminal 2 that executes the application software and makes the device 3 available.

[Procedure when Control Target Device is Registered]

A procedure when the user registers the control target device 3 with the communication terminal 2 is as described with reference to FIGS. 7A to 7D in the first embodiment.

[Operation Sequence when Device 3 is Controlled]

The operation sequence when the device controller 1 controls the device 3 is as described with reference to FIG. 8 in the first embodiment.

Modified Example 1

In the above-described fourth embodiment, the device identification information may be a serial number in the same manner as in the modified example 1 of the first embodiment described with reference to FIGS. 9 and 10. Thereby, in the fourth embodiment, an effect similar to the above-described effect in the modified example 1 of the first embodiment is obtained.

Modified Example 2

In the above-described fourth embodiment, as in the modified example 2 of the first embodiment, a plurality of communication terminals 2 may control the common device 3. Thereby, in the fourth embodiment, an effect similar to the above-described effect in the modified example 2 of the first embodiment is obtained.

Modified Example 3

In FIG. 16, an example in which a device 3 available with application software selected by the user is presented after the presentation unit 2136 presents available application software is shown. However, a method of presenting the application software and the device 3 are not limited thereto. The presentation unit 2136 may present a list of application software available for controlling the device 3 selected by the user after a list of devices 3 available for a type of service selected by the user is presented. Also, the presentation unit 2136 may also present a list of combinations of application software and devices 3 available for the type of service selected by the user.

[Effects of Device Control System S of Fourth Embodiment]

As described in the fourth embodiment, in the device control system S, when the user inputs a type of service desired to be used, the presentation unit 2136 presents one or more pieces of application software available for a service of a type of service and one or more devices 3 available in a service provided using each of one or more pieces of application software. Thereby, when the user desires to control the device 3 with the communication terminal 2, it is easy to ascertain a type of application software and a device 3 to be purchased, so that the user can easily use the service. If a plurality of devices 3 with different type names can be used with a single piece of application software or if a single device 3 can be used by a plurality of pieces of application software, the number of combination of pieces of application software and devices 3 increases. Even if there are many such combinations according to the fourth embodiment, when the user desires to receive the provision of a service for controlling the device 3 with the communication terminal 2, it is possible to easily determine application software and devices 3 required to be acquired.

Also, the presentation unit 2136 may present the first type of device required to be used in the type of service selected by the user and the second type of device to be used in the service other than the type of service selected by the user in different forms. Thereby, when the application software selected by the user can control the device 3 to be used in a type of service except for the type of service selected by the user, the device 3 unnecessary for the user is not displayed. Thus, it is possible to prevent the user from purchasing an inappropriate device 3. Also, it becomes possible to motivate the user to use a type of service and a device 3 which is not expected by the user with the application software by displaying the device 3 to be used in a type of service other than the type of service selected by the user.

Also, the presentation unit 2136 presents a device 3, a device ID of which is stored in association with the user ID of the user belonging to a predetermined user group according to a priority higher than those of the other devices 3. Thereby, the probability that the user having an attribute similar to that of a target user will select a device 3 with a use result may increase. Thus, it is possible to increase a degree of satisfaction of the user.

Also, the presentation unit 2136 transmits the application software selected by the user to the communication terminal 2 and executes a process related to the shipment of the device 3 selected by the user. At this time, the presentation unit 2136 causes the storage unit 212 to store the device ID of the device 3 to be shipped and the user ID of the user who purchases the device 3 in association with each other. In this manner, the presentation unit 2136 registers the device ID and the user ID in association with each other in the user information DB, so that the initial setting operation of the user installing the device 3 is simplified. Furthermore, the application software and the device 3 are provided to the user in a state in which the application software and the device 3 are associated with the same address and therefore the user can start the use of the device promptly when the device 3 arrives without requiring a setting operation.

Fifth Embodiment

Also, in the above-described fourth embodiment, as in the second embodiment described with reference to FIG. 11, the device controller 1 may generate the second control information corresponding to an API of the server 5 for controlling the device 3. Thereby, in a fifth embodiment, an effect similar to the effect described in the second embodiment is obtained.

Sixth Embodiment

Also, in the above-described fourth embodiment, as in the third embodiment described with reference to FIG. 12, the control target device 3 may be the server 6 for distributing information in a company or the like. On the basis of first control information, a device controller 1 according to a sixth embodiment identifies a server 6 which is a transmission destination of content included in first control information and transmits second control information with a format corresponding to the server 6 to the server 6. Thereby, in the sixth embodiment, an effect similar to the effect described in the third embodiment is obtained.

In the sixth embodiment, a presentation unit 2136 may present application software and the server 6 serving as a device (or a type of information providing service) on the basis of a type of service desired to be used by a user. On the basis of presented information, the user can execute registration for an information providing service and the purchase of application software.

At this time, if a request for using the information providing service has been received from the user, the presentation unit 2136 may provide information necessary for the registration of the user for the information providing service and notify a payment means of a communication carrier for paying a communication fee of the costs for using the information providing service. Thereby, because the user does not have to perform a separate procedure for a business entity of the information providing service or pay costs, convenience is enhanced.

Seventh Embodiment

[Outline of Device Control System S]

Figure 17:
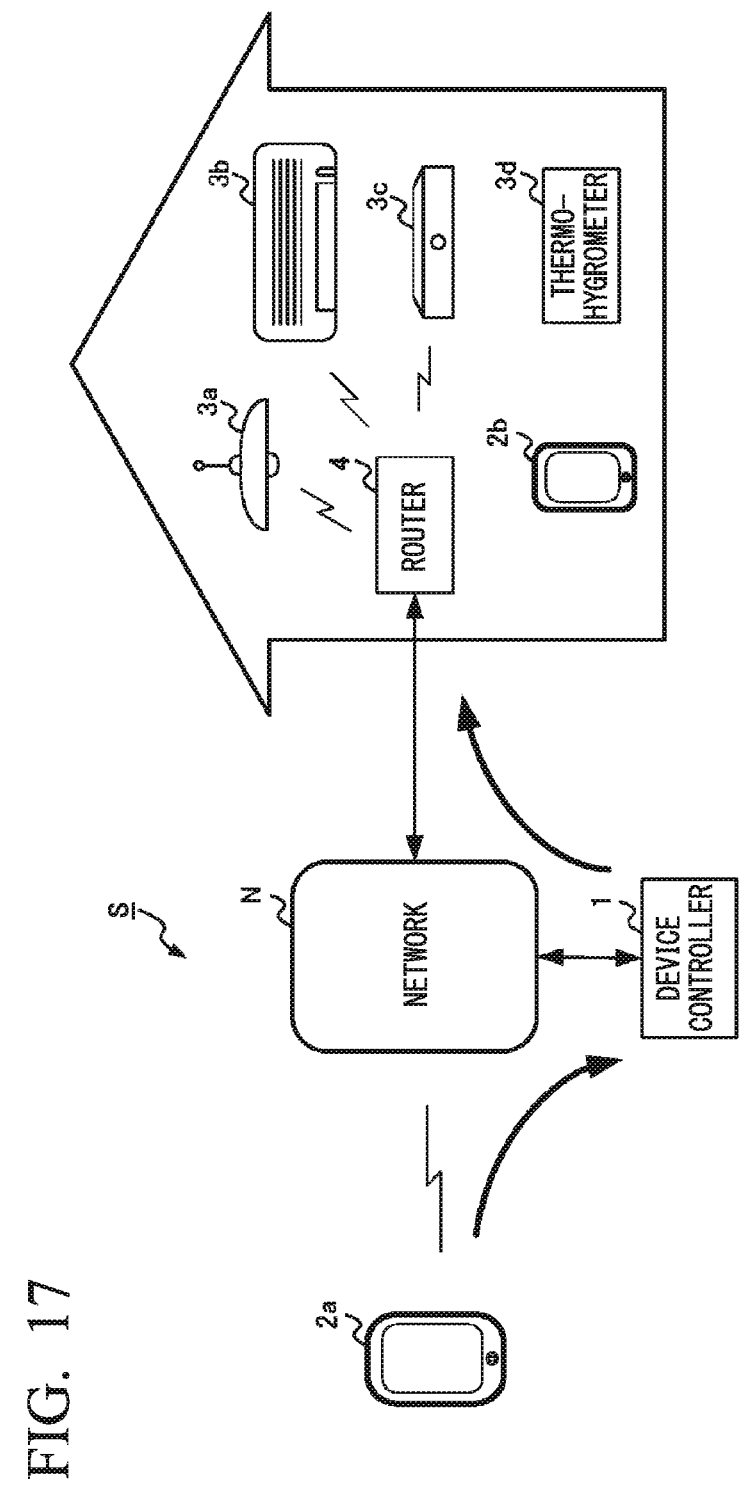
FIG. 17 is a diagram showing an outline of a device control system according to a seventh embodiment.

FIG. 17 is a diagram showing an outline of a device control system S according to a seventh embodiment. The device control system S includes a device controller 1, communication terminals 2 (2a and 2b), devices 3 (3a, 3b, 3c, and 3d), and a router 4. That is, the device control system S shown in FIG. 17 further includes the device 3d with respect to the device control system S shown in FIG. 1. The device controller 1, the communication terminals 2 and the router 4 are connected to a network N via a wired communication line or a wireless communication line.

The network N includes the Internet, a cellular phone network, a Wi-Fi (registered trademark) network, and the like. Although two communication terminals 2 and four devices 3 are shown in FIG. 17, the device controller 1 can transmit and receive data to and from more communication terminals 2 and more devices 3.

The device controller 1 and the communication terminal 2 are as described with reference to FIG. 1 in the first embodiment.

The device 3 is a device having a communication function, and is, for example, an electrical device installed in a house of a user of the communication terminal 2. In the example shown in FIG. 17, the device 3a is a light, the device 3b is an air conditioner, the device 3c is a monitoring camera, and the device 3d is a thermo-hygrometer configured to measure temperature and humidity. Each device 3 includes any device capable of receiving data from the device controller 1.

The device 3 is roughly classified into an operation execution device and a monitoring device. The operation execution device is a device configured to perform an operation when a predetermined condition is satisfied (for example, the device 3a, 3b, or 3c). The monitoring device is a device configured to output information for determining whether or not a predetermined condition is satisfied (for example, the device 3c or 3d). For example, the monitoring device outputs information indicating a surrounding situation where the monitoring device is installed, such as temperature, humidity, illuminance, presence/absence of a person, vibration, or air quality. The device 3c, which is a monitoring camera, has both a function of the operation execution device and a function of the monitoring device.

The router 4 is connected to the network N and transfers the data received from the device controller 1 to any one of the device 3a, the device 3b, the device 3c, and the device 3d.

As described above in the first embodiment, the device controller 1 receives first control information for controlling the device 3 from the communication terminal 2 configured to execute application software. On the basis of details of the received first control information, the device controller 1 selects a device 3 to be controlled among a plurality of devices 3 and generates second control information for controlling the selected device 3. The first control information are information generated by the application software on the basis of an API of a general-purpose format independent of the device 3. The second control information are information having a format dedicated for a device controlling a specific device 3 and written in accordance with the API. For example, the second control information are information having a format differing according to each manufacturer and type name of the device 3.

The device controller 1 according to the seventh embodiment receives the first control information including operation details set by the user using the application software. In accordance with reception of the first control information, the device controller 1 transmits the second control information for operating a device 3 suitable for implementing the set operation details among devices 3 possessed by the user.

Figure 18A:
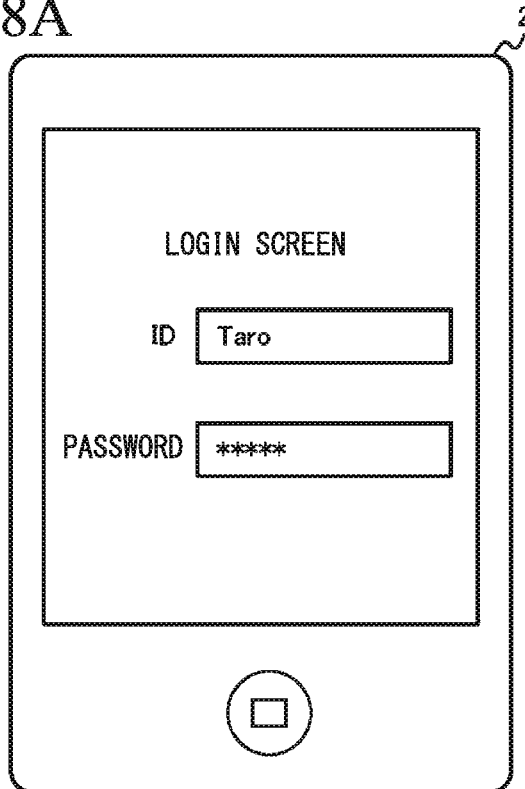
FIG. 18A is a first diagram showing an example of a screen of a communication terminal according to the seventh embodiment.
Figure 18B:
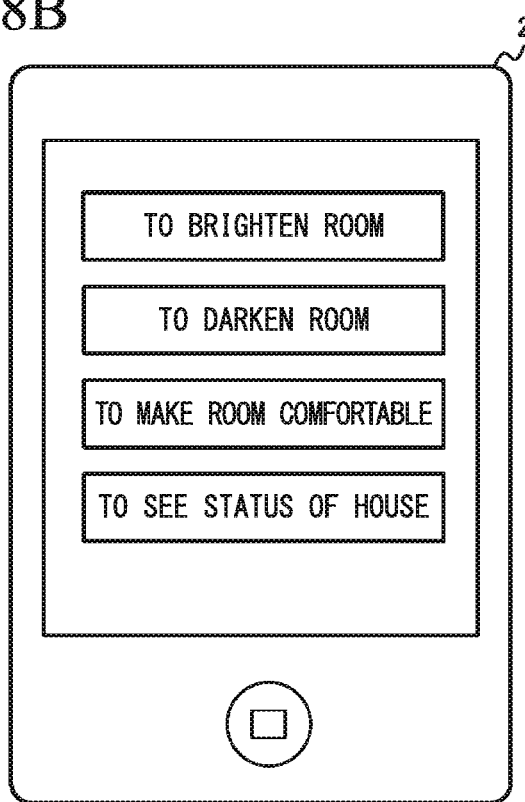
FIG. 18B is a second diagram showing an example of a screen of the communication terminal according to the seventh embodiment.

FIGS. 18A and 18B are diagrams showing an example of a screen of the communication terminal 2. FIG. 18A is a first diagram showing an example of the screen of the communication terminal 2. In the communication terminal 2, application software for setting operation details is installed. When the application software is activated, a login screen shown in FIG. 18A is displayed. When the user inputs login information (for example, user identification information), the login information is transmitted to the device controller 1. FIG. 18B is a second diagram showing an example of the screen of the communication terminal 2. When the login information is received, the device controller 1 causes the communication terminal 2 to display the screen shown in FIG. 18B. The device controller 1 causes the communication terminal 2 to display a screen for selecting operation details of the user's device 3 selected in accordance with a type of device 3 (user device) possessed by the user identified on the basis of the login information.

In the present embodiment, the user has a light, an air conditioner, a monitoring camera, or a thermo-hygrometer as the device 3. Therefore, the device controller 1 selects an operation details candidate related to the adjustment of brightness of a room in which the light is executable, the adjustment of temperature/humidity in which the air conditioner is executable, or the monitoring of a status of a house in which the monitoring camera is executable among candidates of a large number of operation details which are pre-stored and causes the communication terminal 2 to display the selected candidate.

When the user selects any operation details candidate from among the operation details candidates, the communication terminal 2 transmits the first control information including information for identifying the selected operation details candidate to the device controller 1. The device controller 1 transmits the second control information to the device 3 capable of executing an operation related to the operation details candidate selected by the user indicated by the received first control information. Thereby, the user can cause an appropriate device 3 to execute a desired operation by selecting an operation capable of being executed using the device 3 possessed by the user.

Also, when there are a plurality of devices 3 capable of executing the operation details selected by the user, the device controller 1 may transmit screen data for selecting a device 3 to be operated to the communication terminal 2. When the device 3 to be operated is selected, the device controller 1 transmits the second control information for operating the selected device 3 to the device 3.

Hereinafter, a configuration of the device controller 1 will be described in detail.

[Configuration of Device Controller 1]

Figure 19:
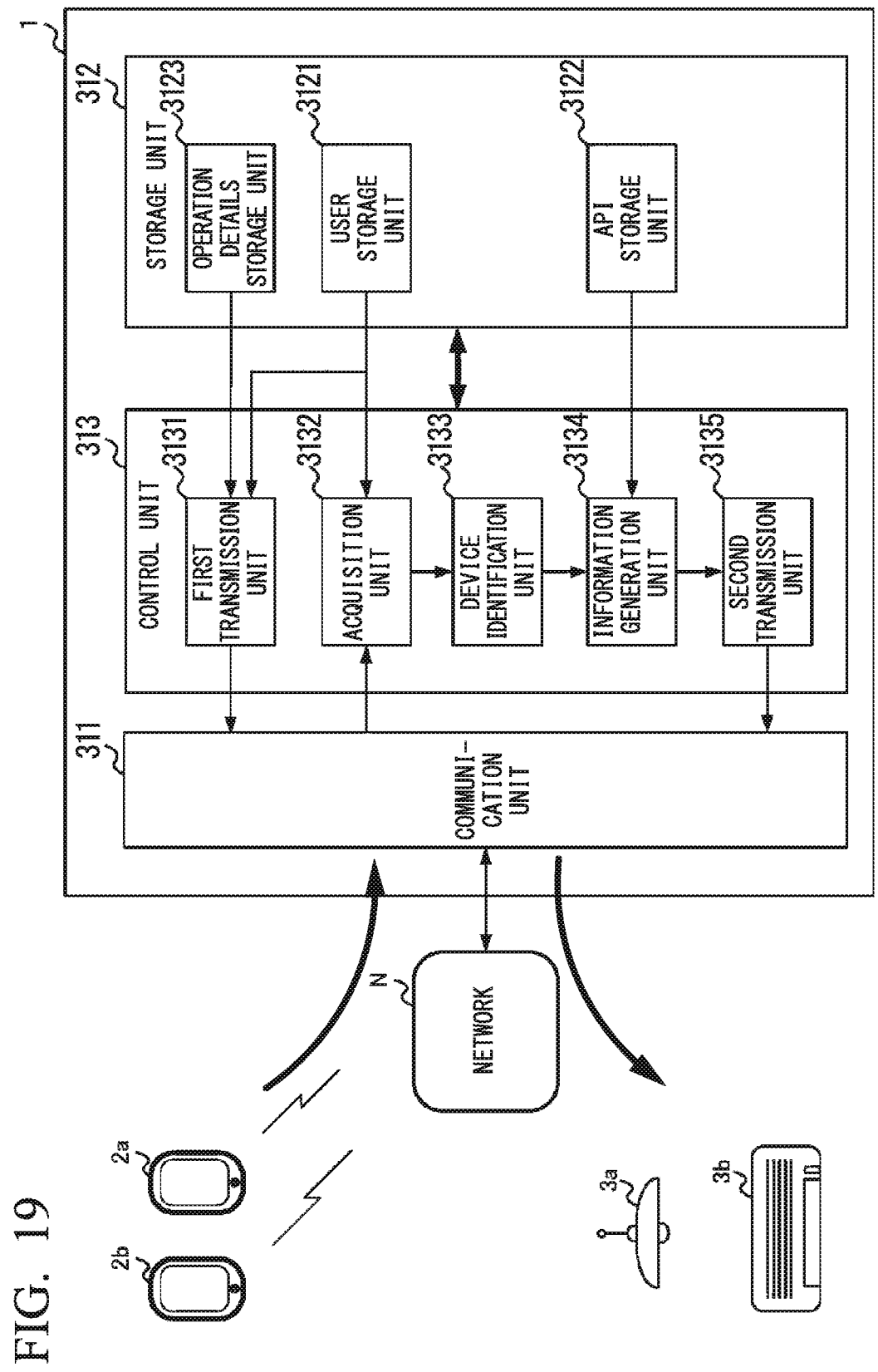
FIG. 19 is a diagram showing a configuration of a device controller according to the seventh embodiment.

FIG. 19 is a diagram showing a configuration of the device controller 1 according to the seventh embodiment. The device controller 1 according to the seventh embodiment includes a communication unit 311, a storage unit 312, and a control unit 313.

The communication unit 311 has, for example, a LAN controller. The communication unit 311 transmits and receives data to and from the communication terminal 2 and the device 3 via the network N.

The storage unit 312 includes a storage medium such as a ROM, a RAM, or a hard disk. The storage unit 312 stores a program to be executed by the control unit 313. Also, the storage unit 312 stores data to be used when the control unit 313 operates and data generated by the control unit 313.

The storage unit 312 has a user storage unit 3121, an API storage unit 3122, and an operation details storage unit 3123 as areas for storing data used by the control unit 313. The user storage unit 3121 and the API storage unit 3122 are similar to a user storage unit 1121 and an API storage unit 1122 in the first embodiment.

FIG. 20 is a diagram showing an example of the user information DB stored by the user storage unit 3121 in the seventh embodiment. As in the first embodiment, in the user information DB according to the seventh embodiment, a type (a type of device), a device ID, a manufacturer name, and an address of the device 3 capable of being controlled by the user are associated with a user ID.

The user ID, the type of device, the device ID, the manufacturer name, and the address are as described in the first embodiment. The type of device is information indicating a type of function provided in the device 3 and is used for identifying a type of light, air conditioner, monitoring camera, thermo-hygrometer, or the like.

FIG. 21 is a diagram showing an example of an operation details database (hereinafter referred to as an operation details DB) stored in the operation details storage unit 3123. In the operation details DB, the type of device, the device ID, and the operation details candidate are associated with each other. The operation details storage unit 3123 stores a plurality of operation details candidates for a single device 3. Also, because an operable range differs depending on the type name of the device 3 in the same type of device, the operation details storage unit 3123 stores an operation details candidate differing according to each device ID.

Details of the control unit 313 will be described with reference to FIG. 19 again. The control unit 313 is, for example, a CPU. By executing the program stored in the storage unit 312, the control unit 313 functions as a first transmission unit 3131, an acquisition unit 3132, a device identification unit 3133, an information generation unit 3134, and a second transmission unit 3135.

In accordance with acquisition of the identification information of the logged-in user from the communication terminal 2, the first transmission unit 3131 transmits data of an operation screen for specifying operation details of the device 3 of the user corresponding to the acquired identification information to the communication terminal 2. For example, the first transmission unit 3131 transmits data of an operation screen including one or more operation details candidates selected from a plurality of operation details candidates on the basis of the type of device 3 possessed by the user, to the communication terminal 2. For example, the first transmission unit 3131 identifies the type of device 3 possessed by the user stored in the user storage unit 3121. Then, the first transmission unit 3131 selects the operation details candidate stored in the operation details storage unit 3123 associated with the identified type of device 3, and transmits data of an operation screen including information of the selected operation details candidate.

Also, the first transmission unit 3131 may transmit information of the type of device 3 possessed by the user or information of one or more selected operation details candidates, to the communication terminal 2. The communication terminal 2 generates data of the operation screen on the basis of the information of the type of device 3 or the information of the operation details candidate.

The acquisition unit 3132 acquires first control information for controlling the device 3 pre-registered in the device controller 1 from the communication terminal 2 of the user who can receive the provision of the service. The first control information are information for controlling a type of device 3 capable of being controlled with the application software installed in the communication terminal 2 used by the user and includes operation details candidates selected by the user.

Figure 22:
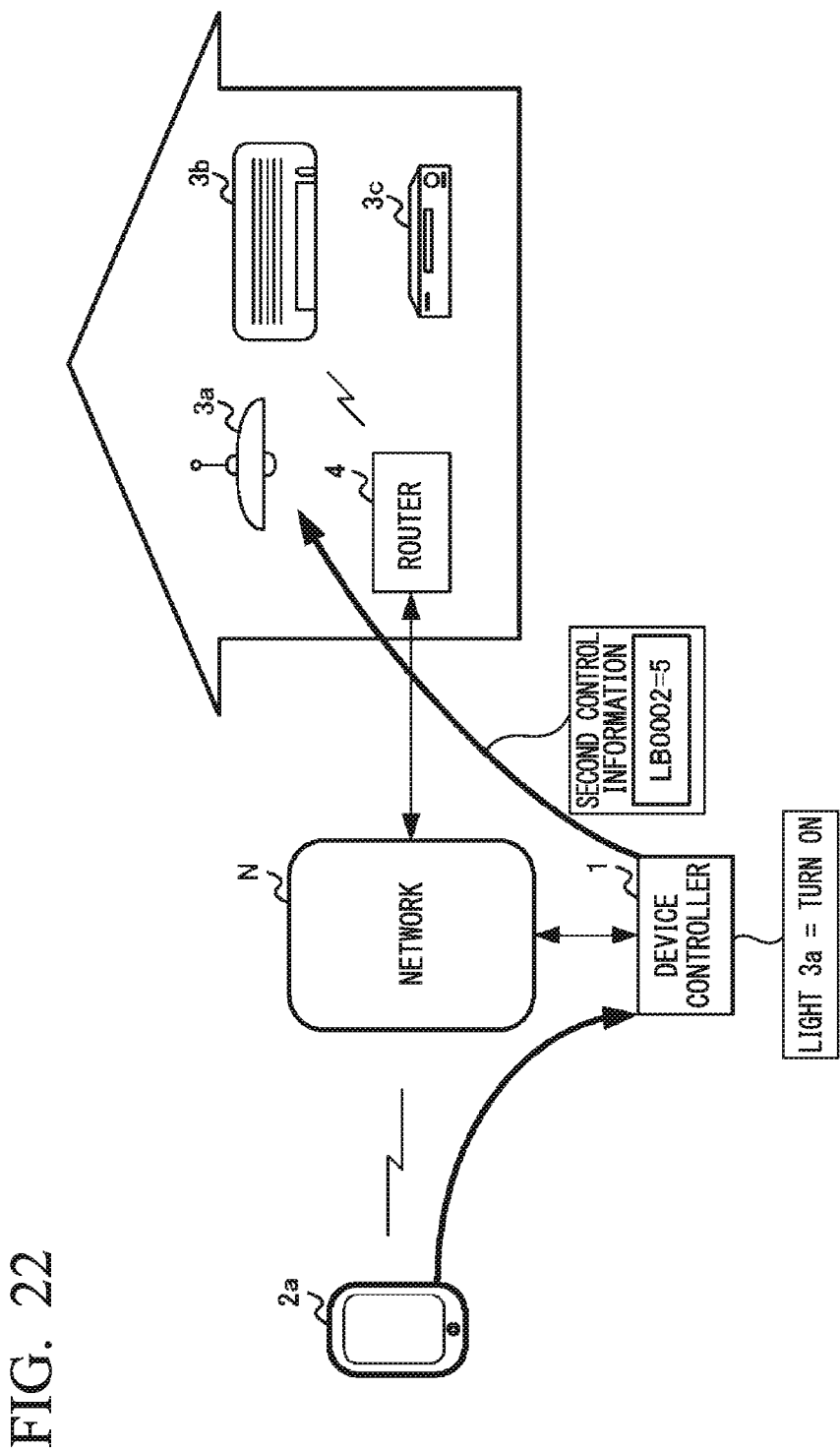
FIG. 22 is a diagram showing a flow of data when a device is controlled by a communication terminal in the seventh embodiment.

FIG. 22 is a diagram showing a flow of data when the communication terminal 2a controls the device 3a in the seventh embodiment. The communication terminal 2a transmits first control information including operation details written in a format conforming to a predetermined API for controlling the device 3. For example, if the user has selected the operation details "To brighten room" among the operation details candidates shown in FIG. 18B displayed on the communication terminal 2a, the communication terminal 2a transmits first control information including an operation details ID for identifying the operation details "To brighten room" to the device controller 1. When the first control information are received, the device controller 1 selects the device 3a stored in the operation details storage unit 3123 associated with the operation details ID indicating the operation details included in the first control information. Then, the device controller 1 generates the second control information written using the API for controlling the selected device 3a and transmits the generated second control information to the device 3a via the network N and the router 4.

The device identification unit 3133 identifies the control target device on the basis of the first control information. The device identification unit 3133 refers to the user information DB (FIG. 20) of the user corresponding to the user ID included in the first control information and the operation details DB (FIG. 21) stored in the action details storage unit 3123. Then, the device identification unit 3133 refers to the user information DB and the operation details DB and identifies the device 3 corresponding to the operation details ID included in the first control information as the control target device. The device identification unit 3133 notifies the information generation unit 3134 of the identified type name of the device 3 and notifies the second transmission unit 3135 of the address of the identified device 3.

For example, the information generation unit 3134 generates the second control information on the basis of the API for the control target device stored in the storage unit 312. Specifically, the information generation unit 3134 generates the second control information by specifying operation details for issuing an instruction to the device 3 identified on the basis of an operation details ID included in the first control information in an API corresponding to the type name of the device 3 identified by the device identification unit 3133. For example, when the operation details indicated by the first control information are "To brighten room", the information generation unit 3134 identifies that the device 3a serves as a control target and uses the API for the device 3a (the light) to generate the second control information for turning on the light.

The information generation unit 3134 can convert the first control information into the second control information whose a format is different depending on each manufacturer or type name of the device 3. The information generation unit 3134 generates the second control information by writing the operation details to be included in the first control information in accordance with the format of the dedicated API for the device 3. Thereby, the developer of the application software can develop the application software without being conscious of the dedicated API differing according to each device 3. Also, the user can control the device 3 of a different type name with a single piece of application software.

The second transmission unit 3135 transmits second control information for issuing an instruction for executing the operation details indicated by the first control information to the address of the control target device provided through a notification from the device identification unit 3133.

[Operation Sequence when Device 3 is Controlled]

Figure 23:
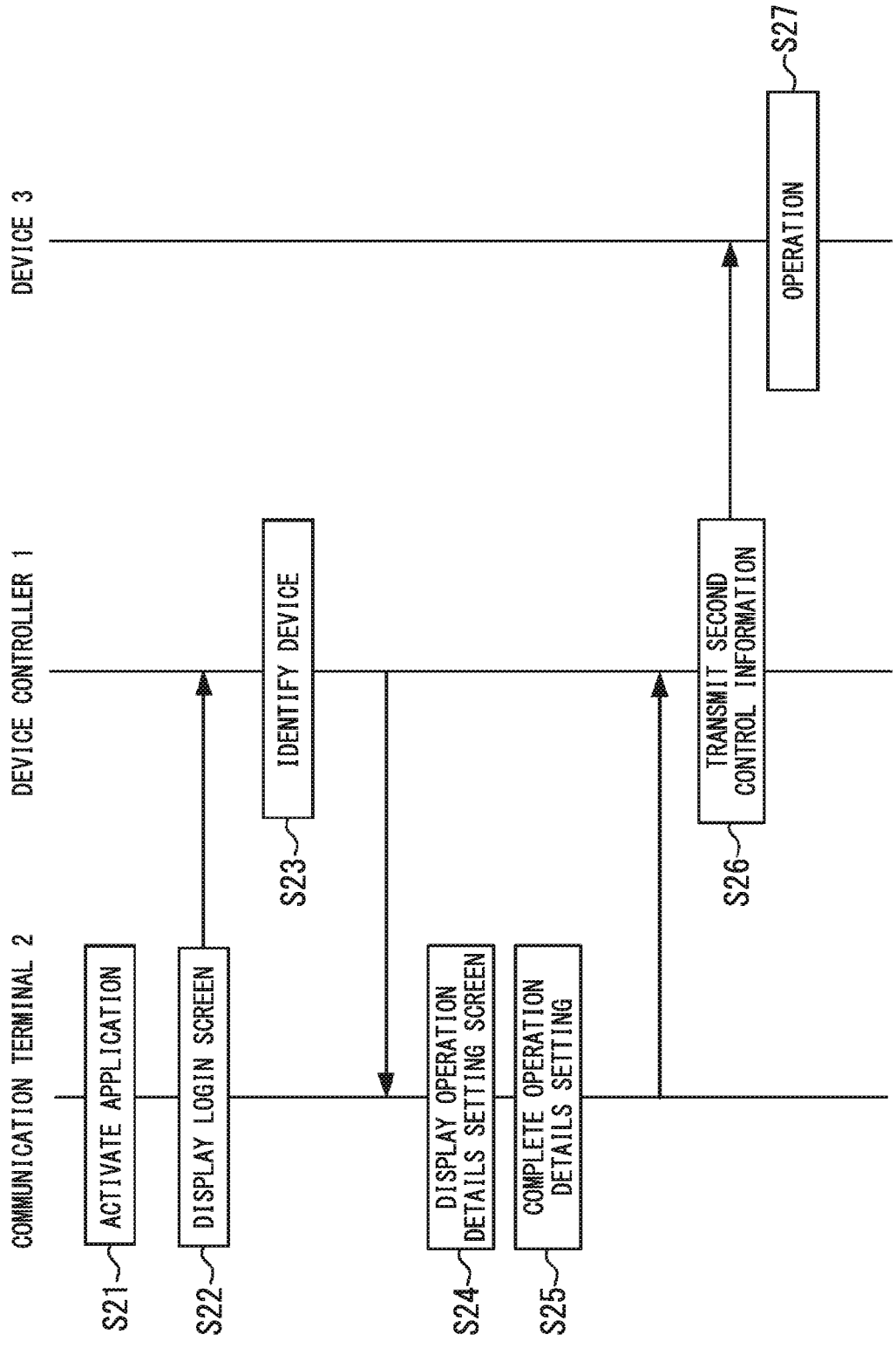
FIG. 23 is a diagram showing an operation sequence when the device controller of the seventh embodiment controls a device.

FIG. 23 is a diagram showing an operation sequence when the device controller 1 according to the seventh embodiment controls the device 3. First, when the user activates the application software for controlling the control target device in the communication terminal 2 (S21), the communication terminal 2 displays a login screen (S22). The communication terminal 2 transmits, to the device controller 1, login information including identification information of the user input by the user.

When the device controller 1 receives the login information, the first transmission unit 3131 of the device controller 1 refers to the user information DB to identify the device 3 associated with the identification information of the user included in the login information (S23). The first transmission unit 3131 selects an operation details candidate corresponding to the identified device 3 and transmits operation details setting screen data including the operation details candidate to the communication terminal 2.

When operation details setting screen data is received, the communication terminal 2 displays a screen for setting operation details (for example, the operation details setting screen shown in FIG. 18B) (S24). When the user selects (sets) the operation details on the operation details setting screen (S25), the communication terminal 2 transmits first control information including the operation details candidate (the set operation detail) to the device controller 1.

When the device controller 1 receives the first control information, the information generation unit 3134 generates the second control information, and the second transmission unit 3135 transmits the second control information to the device 3 corresponding to the operation details candidate (S26). When the second control information are received, the device 3 executes an operation identified by the second control information (S27).

[Effects of Device Control System S of Seventh Embodiment]

When the user logs in, the device controller 1 according to the seventh embodiment transmits an operation screen for selecting operation details capable of being implemented with the device 3 possessed by the user to the communication terminal 2. When the user selects the operation details, the communication terminal 2 transmits the first control information including an operation details ID to the device controller 1 and the device controller 1 generates the second control information for controlling the device 3 on the basis of the first control information and transmits the generated second control information to the device 3. Thereby, the user can change the status of a space in which the device 3 is installed according to his/her desire, without activating the dedicated application software for controlling the device 3 with consciousness of the device 3.

According to the device controller 1 of the seventh embodiment, the user can control the device 3 corresponding to the operation details by selecting the operation detail. That is, the user does not need to perform a series of complex procedures of determining how the environment (temperature, humidity, brightness, or the like) can be changed, identifying the device 3 suitable for the environmental change, and activating application software for controlling the identified device 3.

Also, when an operation screen for selecting operation details is transmitted to the communication terminal 2, the device controller 1 transmits operation details candidates suitable for the device 3 possessed by the user from among a large number of operation details candidates. Thus, the operation details candidates unnecessary for the user are not displayed on the communication terminal 2. Therefore, the user can easily set the operation details.

Eighth Embodiment

In the seventh embodiment, when the user selects the operation details candidate in the communication terminal 2, the device controller 1 transmits the second control information to cause the device 3 to execute the operation details corresponding to the selected operation details candidate. In contrast to the seventh embodiment, a device controller 1 according to the eighth embodiment causes a device 3 to execute an operation when an operation condition set by the user is satisfied. Specifically, a device controller 1 according to an eighth embodiment determines whether or not an operation condition is satisfied on the basis of information acquired from a device 3 configured to monitor whether or not the operation condition set by the user is satisfied. When it is determined that the operation condition is satisfied, the device controller 1 transmits the second control information to operate the device 3 for executing the operation.

The operation details storage unit 3123 of the present embodiment stores an operation condition candidate indicating the condition under which the operation details indicated by the operation details candidate are executed in association with the operation details candidate. For example, when the operation details are related to the operation of an air conditioner, the operating condition is temperature or humidity. For example, when the operation details are related to the operation of a light, the operation condition is the brightness of a room.

Also, the first transmission unit 3131 transmits data of an operation screen for designating a selected operation condition on the basis of types of a plurality of devices 3 possessed by the user. For example, in accordance with the acquisition of the operation details candidate selected by the user by the acquisition unit 3132 in the communication terminal 2, the first transmission unit 3131 transmits data of an operation screen for specifying an operation condition determined on the basis of the operation details indicated by the operation details candidate acquired by the acquisition unit 3132.

At this time, the first transmission unit 3131 refers to the operation details storage unit 3123. Then, the first transmission unit 3131 may transmit data of an operation screen for specifying operation details candidates for at least any one of the plurality of devices 3 possessed by the user and operation conditions for causing a user device to perform an operation corresponding to an operation details candidate to the communication terminal 2 so that the user specifies the operation details candidates and the operation conditions. The communication terminal 2 receiving the data of the operation screen first displays, for example, an operation screen for selecting one or more operation details candidates from operation details candidates. Thereafter, when the user selects an operation details candidate, the communication terminal 2 displays an operation condition candidate suitable for the selected operation details candidate. Thereby, the user easily inputs operation conditions suitable for the operation details with the communication terminal 2. When the operation condition is input, the communication terminal 2 transmits the first control information including the operation condition to the device controller 1.

When the acquisition unit 3132 receives the first control information including the operation condition, the second transmission unit 3135 transmits third control information for issuing an instruction for acquiring monitoring information, which is a monitoring result of the monitoring device, to the device 3. The monitoring device is a device configured to monitor whether or not the operation condition included in the first control information acquired by the acquisition unit 3132, among a plurality of devices 3 possessed by the user is satisfied.

The third control information are information written in accordance with an API which is a dedicated format dedicated for a device controlling a specific device 3 having a monitoring function. For example, the third control information for controlling the device 3*d* which is the thermo-hygrometer (FIG. 17) is the following control information. For example, the control information are control information for outputting information indicating a measured temperature, control information for outputting information indicating a measured humidity, control information for specifying a measured timing, control information for specifying a timing for outputting a measurement result, or the like. In accordance with reception of the third control information, the device 3*d* transmits monitoring information including monitoring results (measurement results) of the measured temperature and humidity to the device controller 1.

Also, although information for controlling the device 3 having the monitoring function is referred to as the third control information in the description of the present embodiment, the third control information are not essentially different from the second control information. The device controller 1 may acquire monitoring information from the device 3 having the monitoring function with the second control information for operating the device 3.

The acquisition unit 3132 acquires the monitoring information transmitted from the device 3 receiving the third control information. The second transmission unit 3135 determines whether or not a monitoring result indicated by the monitoring information acquired by the acquisition unit 3132 satisfies the operation condition included in the first control information. When the monitoring result satisfies the operation condition, the second transmission unit 3135 transmits the second control information to the device 3 for executing the operation.

The second transmission unit 3135 is configured to stop the transmission of the third control information if the monitoring result satisfies the operation condition. Also, if the monitoring result does not satisfy the operation condition and new monitoring information is not scheduled to be transmitted from the device 3 transmitting the third control information, the second transmission unit 3135 is configured to retransmit the third control information.

Figure 24A:
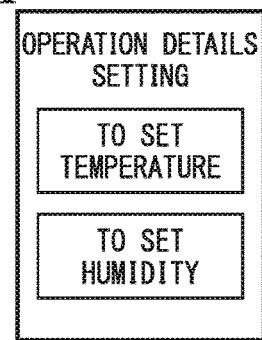
FIG. 24A is a diagram showing an example of an operation details setting screen according to an eighth embodiment.

FIG. 24A is a diagram showing an example of an operation details setting screen in the eighth embodiment. FIG. 24A assumes the operation details setting screen displayed after the user selects the operation details "To make room comfortable" in FIG. 18B. However, the device controller 1 may cause the communication terminal 2 to display the operation details setting screen shown in FIG. 24A at a point in time when the device 3 possessed by the user is identified to be the air conditioner on the basis of login information.

Figure 24B:
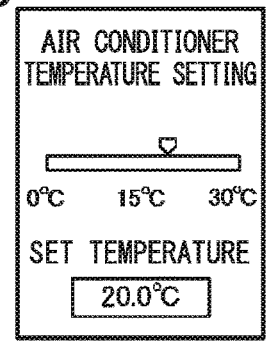
FIG. 24B is a diagram showing an example of a screen displayed after selection of operation details.

FIG. 24B is a diagram showing an example of a screen displayed after selection of operation details. FIG. 24B is an example of an air conditioner temperature setting screen displayed when the user selects the operation details "To set temperature" in FIG. 24A. The user sets the temperature of the air conditioner to a desired temperature with a user interface on the air conditioner temperature setting screen.

Figure 24C:
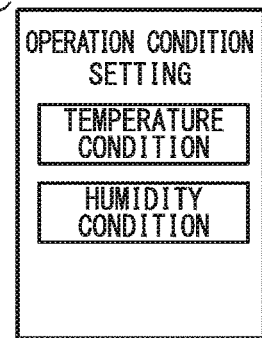
FIG. 24C is a diagram showing an example of an operation condition setting screen.
Figure 24D:
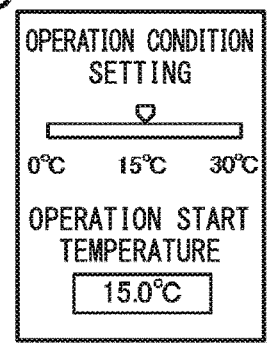
FIG. 24D is a diagram showing an example of a screen displayed after selection of operation condition candidates.

FIG. 24C is a diagram showing an example of an operation condition setting screen. When the set temperature of the air conditioner is input, the communication terminal 2 transmits first control information including the set temperature of the air conditioner to the device controller 1. When the acquisition unit 3132 acquires the first control information, the first transmission unit 3131 selects an operation condition candidate related to the temperature setting of the air conditioner and transmits data of the operation condition setting screen shown in FIG. 24C to the communication terminal 2. FIG. 24D is a diagram showing an example of a screen displayed after selection of the operation condition candidate. When the operation condition candidate "temperature condition" is selected on the operation condition setting screen of FIG. 24C, the communication terminal 2 displays a screen for setting a condition of a room temperature (an operation condition) at which the operation of the air conditioner starts as shown in FIG. 24D. When the operation condition is set, the communication terminal 2 transmits the first control information including the set operation condition to the device controller 1.

FIG. 25 is a diagram showing an operation sequence when the device controller 1 according to the eighth embodiment controls the device 3. The operation sequence diagram shown in FIG. 25 starts from step S31 corresponding to step S24 for displaying the operation details setting screen in FIG. 23. Step S31 is an operation of displaying the operation details setting screen as shown in FIG. 24A in the communication terminal 2.

When the setting of the operation details in the communication terminal 2 is completed (S32), the communication terminal 2 transmits first control information including the operation details to the device controller 1. When the acquisition unit 3132 of the device controller 1 acquires the first control information, the first transmission unit 3131 selects the operation condition candidate corresponding to the operation details from a plurality of operation condition candidates stored in the operation details storage unit 3123 (S33). Also, the first transmission unit 3131 transmits data of the operation condition setting screen including the information of the selected operation condition candidate to the communication terminal 2.

When the data of the operation condition setting screen is received, the communication terminal 2 displays an operation condition setting screen as shown in FIG. 24C (S34). When the setting of the operation condition by the user is completed (S35), the communication terminal 2 transmits the first control information including the operation condition set by the user to the device controller 1.

When the device controller 1 receives the first control information, the device identification unit 3133 identifies the device 3 having the monitoring function corresponding to the operation condition included in the first control information. Then, the second transmission unit 3135 transmits the third control information for controlling the identified device 3 (S36). In the example of FIG. 25, the second transmission unit 3135 transmits the third control information including an instruction for monitoring the temperature to the device 3d having the temperature measuring function.

Thereafter, the second transmission unit 3135 determines whether or not monitoring information including a temperature measurement value transmitted from the device 3d satisfies a condition for operating the device 3b (an operation condition) (S37). If the operation condition is satisfied (YES in S37), the second transmission unit 3135 transmits the second control information including an instruction for operating the device 3b to the device 3b (S38). The device 3b executes an operation on the basis of the second control information (S39).

On the other hand, if the monitoring information including the temperature measurement value transmitted from the device 3d does not satisfy the condition for operating the device 3b (NO in S37), the second transmission unit 3135 waits until the monitoring information satisfies the condition. If the monitoring information does not satisfy the condition for operating the device 3b (NO in S37), the second transmission unit 3135 may return to step S36 and retransmit the third control information.

Modified Example

In the description of the eighth embodiment described above, the first transmission unit 3131 transmits screen data for setting the operation condition corresponding to the operation details to the communication terminal 2 in accordance with acquisition of the first control information including the operation details by the acquisition unit 3132. However, an order of setting operation details and operation conditions is arbitrary. In accordance with acquisition of the first control information including the operation condition by the acquisition unit 3132, the first transmission unit 3131 may transmit screen data for selecting an operation target device 3 from among a plurality of devices 3 possessed by the user or screen data for setting the operation details to the communication terminal 2.

[Effects of Device Control System S of Eighth Embodiment]

In accordance with the fact that the user has set the operation details in the communication terminal 2, the device controller 1 of the eighth embodiment transmits screen data for setting operating conditions for operating the device 3 to the communication terminal 2. Thereby, if the user does not desire to immediately operate the device 3, it is possible to operate the device 3 at a point in time when a user-desired condition is satisfied according to an easy operation.

Ninth Embodiment

Figure 26:
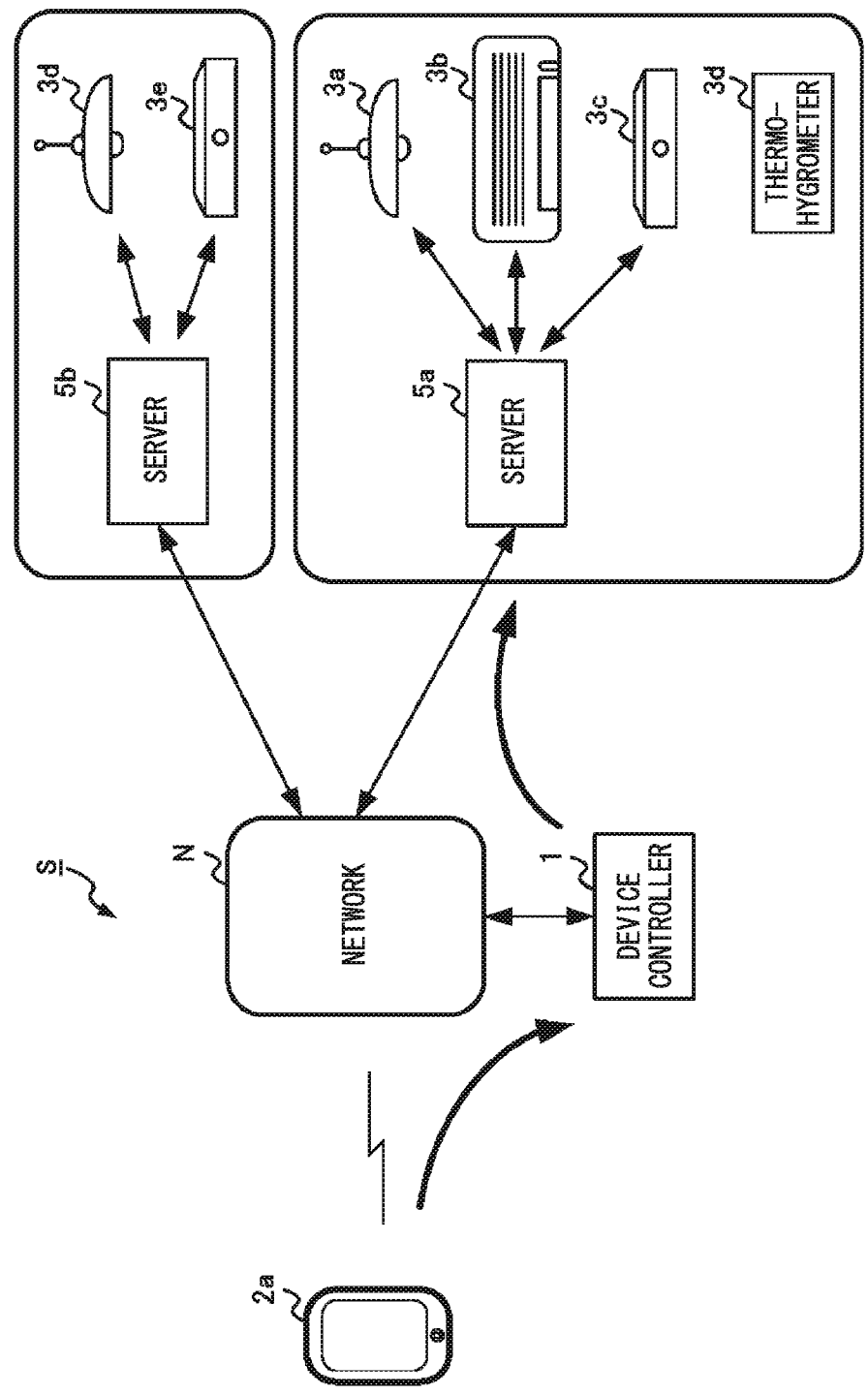
FIG. 26 is a diagram showing a device control system according to a ninth embodiment.

FIG. 26 is a diagram showing a device control system S according to a ninth embodiment. As in the second embodiment described above, the ninth embodiment is different from the seventh embodiment and the eighth embodiment in that the device 3 is controlled via a server of another service provider such as a server 5. As described above, the server 5 is, for example, a device server configured to provide a service for a manufacturer of a device 3 to control its own device 3 and transmits a control signal based on second control information to a control target device 3. When the first control information are received from a communication terminal 2, an information generation unit 3134 in the ninth embodiment generates second control information for instructing the server 5 to operate a control target device or acquire monitoring information from a monitoring device on the basis of operation details included in first control information. Then, a second transmission unit 3135 transmits the second control information generated by the information generation unit 3134 to the server 5 serving as the device server.

For example, as in the second embodiment, the information generation unit 3134 generates the second control information on the basis of an API of the server 5 stored in a storage unit 312. Specifically, the information generation unit 3134 converts operation details included in the first control information into the second control information with a format different from that of the first control information.

A server 5a or a server 5b can control the device 3 according to the operation in the communication terminal 2 on the basis of a user ID, device identification information, and the like included in the second control information.

[Effects of Device Control System S of Ninth Embodiment]

As described in the ninth embodiment, a device controller 1 generates second control information corresponding to an API of another server 5 that controls the device 3. Thereby, even when the user has already received a service for controlling the device 3 via the server 5, it is possible to control the device 3 with any application software installed in the communication terminal 2.

Tenth Embodiment

[Outline of Device Control System S]

An outline of a device control system S according to a tenth embodiment is similar to the outline of the device control system S according to the first embodiment described with reference to FIG. 1.

[Configuration of Device Controller 1]

Figure 27:
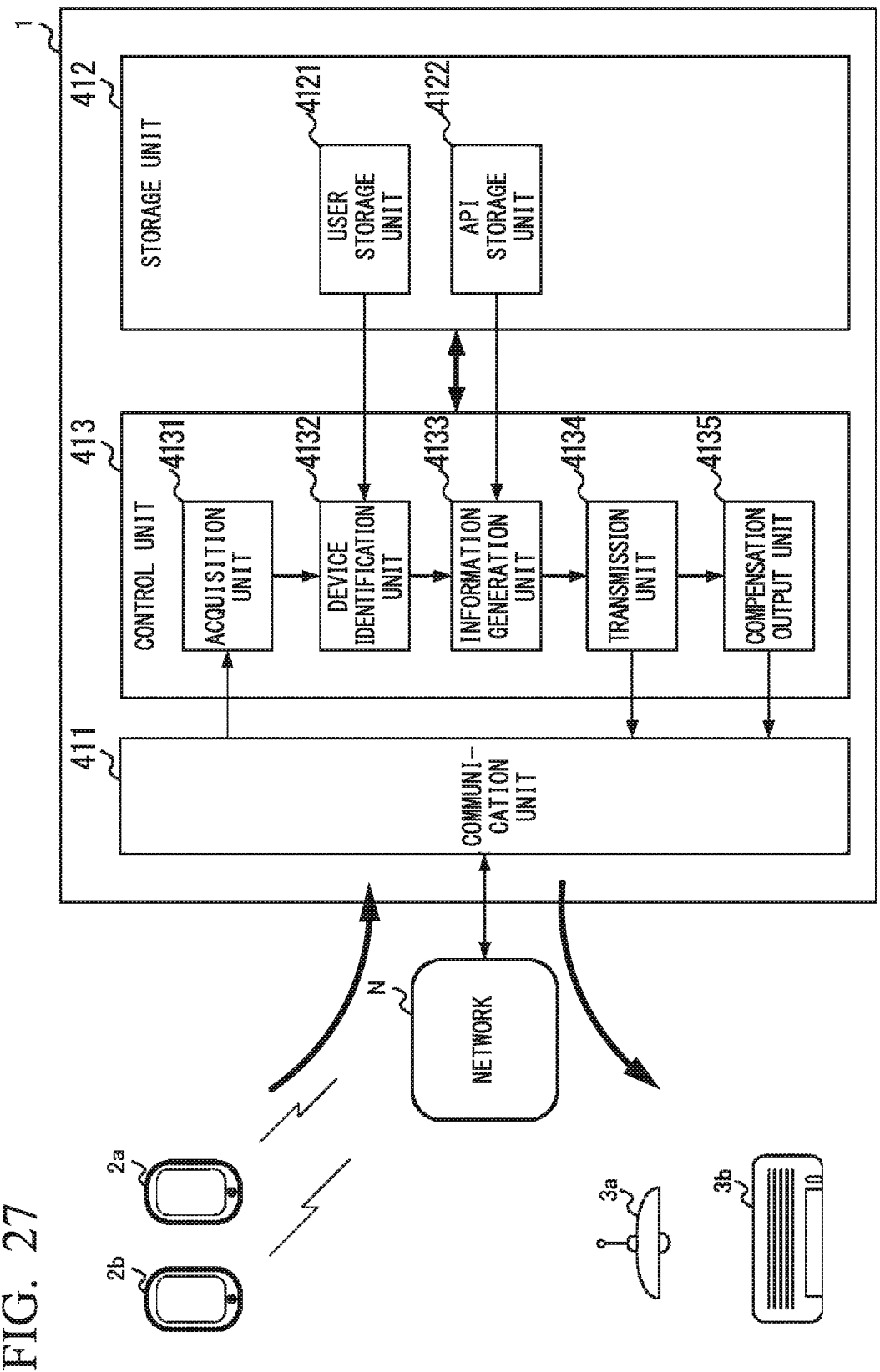
FIG. 27 is a diagram showing a configuration of a device controller according to the tenth embodiment.

FIG. 27 is a diagram showing a configuration of a device controller 1 in the tenth embodiment. The device controller 1 according to the tenth embodiment includes a communication unit 411, a storage unit 412, and a control unit 413.

The communication unit 411 has, for example, a LAN controller. The communication unit 411 transmits and receives data to and from a communication terminal 2 and a device 3 via a network N.

The storage unit 412 includes a storage medium such as a ROM, a RAM, or a hard disk. The storage unit 412 stores a program to be executed by the control unit 413. Also, the storage unit 412 stores data to be used when the control unit 413 operates and data generated by the control unit 413.

The storage unit 412 has a user storage unit 4121 and an API storage unit 4122 as areas for storing data to be used by the control unit 413. The user storage unit 4121 and the API storage unit 4122 are similar to the user storage unit 1121 and the API storage unit 1122 in the first embodiment.

An example of a user information DB stored by the user storage unit 4121 is as described with reference to FIG. 4 in the first embodiment.

The control unit 413 is, for example, a CPU. By executing a program stored in the storage unit 412, the control unit 413 functions as an acquisition unit 4131, a device identification unit 4132, an information generation unit 4133, a transmission unit 4134, and a compensation output unit 4135. Processes of the acquisition unit 4131, the device identification unit 4132, the information generation unit 4133, and the transmission unit 4134 are similar to those of the acquisition unit 1131, the device identification unit 1132, the information generation unit 1133, and the transmission unit 1134 in the first embodiment. An example of first control information and second control information are similar to that described with reference to FIG. 5 in the first embodiment. Also, a flow of data when the device 3 is controlled by the communication terminal 2 is as described with reference to FIG. 6 in the first embodiment.

A compensation output unit 4135 outputs compensation according to the number of times the information generation unit 4133 has generated the second control information on the basis of the first control information. For example, the compensation output unit 4135 outputs information obtained by totaling the compensation to a printer, a computer, or the like via the communication unit 411. The compensation is, for example, a value indicating an amount of money to be charged or returned for a business entity for providing application software installed in the communication terminal 2, a user of the communication terminal 2, or a business entity for providing the device 3. The number of times the second control information has been generated on the basis of the first control information can be identified by another number such as the number of pieces of the second control information transmitted by the transmission unit 4134 or the number of responses received from the device 3 in accordance with the transmission of the second control information by the transmission unit 4134.

For example, the following service model is conceivable as a service model for charging or returning an amount of money of compensation corresponding to the number of times the second control information has been generated on the basis of the first control information. A company for developing application software (hereinafter referred to as an application development company) earns profit by selling the developed application software to users. Therefore, the compensation output unit 4135 outputs compensation to be requested for the application development company capable of earning profit by selling application software using the device control system S. In other words, the compensation output unit 4135 charges an amount of money based on compensation for the application development company. The compensation output unit 4135 may return a part of the compensation to a company for providing the device 3.

When a plurality of pieces of second control information are generated and transmitted on the basis of one piece of first control information, the compensation output unit 4135 sets the number of times the second control information has been generated to a number of two or more. For example, if the first control information includes the control details "To set temperature to 20° C. after power supply of air conditioner is turned on", second control information for issuing an instruction of "To turn on power supply" and second control information for issuing an instruction of "To set temperature to 20° C." are necessary as second control information for the air conditioner. In this case, the number of times the second control information has been generated is two. However, details of a compensation calculation rule used to calculate the compensation are arbitrary and the compensation output unit 4135 may set the number of times the second control information has been generated to one when a plurality of pieces of second control information are generated and transmitted on the basis of one piece of first control information.

The compensation output unit 4135 may determine such a compensation calculation rule for each piece of application software to be executed by the communication terminal 2 transmitting the first control information to control the control target device 3. Thereby, the compensation output unit 4135 can calculate compensation in accordance with a profit model of an application development company such as a profit model in which the application development company charges a fixed amount of money to a user or a profit model in which the application development company charges money according to a used amount. Thus, the application development company can easily develop application software using the device control system S.

Also, the compensation output unit 4135 may calculate the compensation by multiplying a predetermined unit price by the number of times the second control information has been generated on the basis of the first control information. The unit price may be determined for each type of first control information or may be determined for each type of control target device 3 to be controlled on the basis of the second control information. For example, the compensation output unit 4135 may calculate compensation on the basis of a different unit price and a different compensation calculation rule in each of a first type of device 3, a second type of device 3, and a third type of device 3. The first type of device 3 is a device 3 that is constantly activated like a monitoring camera. The second type of device 3 is a device 3 that is used by performing activation at a fixed timing. The third type of device 3 is a device 3 that performs one operation every time a user operates the communication terminal 2.

In the case of the first type of device 3, the transmission unit 4134 transmits one piece of the second control information and therefore the device 3 operates for a long time. Thus, the value of one piece of the second control information are high. In contrast, in the case of the third type of device 3, the transmission unit 4134 transmits one piece of the second control information every time the user operates using the communication terminal 2. Thus, the number of operation details to be executed by the third type of device 3 on the basis of one piece of the second control information are smaller than the number of operation details to be executed by the first type of device 3 that is constantly activated. Therefore, the value of one piece of the second control information for the third type of device 3 is considered to be lower than the value of one piece of the second control information for the first type of device 3.

Therefore, for example, the compensation output unit 4135 calculates compensation by weighting a unit price for controlling the first type of device 3 greater than unit prices for controlling the second and third types of devices 3. Also, the compensation output unit 4135 calculates compensation by weighting a unit price for controlling the third type of device 3 less than unit prices for controlling the first and second types of devices 3.

Also, the compensation output unit 4135 may calculate compensation by multiplying the unit price determined for each of control details included in the first control information by the number of times the second control information has been generated on the basis of the first control information. At this time, the compensation output unit 4135 may calculate the compensation by performing weighting in accordance with a degree of importance of the second control information. For example, the compensation output unit 4135 makes unit prices of control details with a high degree of importance as in control for activating the monitoring camera affecting security higher than unit prices of other control details. In other words, the compensation output unit 4135 increases the weight for the second control information for controlling the device 3 having a high degree of importance related to correct control such as the monitoring camera affecting security. On the other hand, the compensation output unit 4135 decreases a weight for the second control information that is unlikely to cause a serious problem even when the second control information cannot be transmitted, such as control of the air conditioner.

Alternatively, for example, the compensation output unit 4135 outputs predetermined basic compensation as compensation until the number of generations of the second control information based on the first control information reaches a predetermined upper limit number. If the number of generations of the second control information exceeds the predetermined upper limit number, the compensation output unit 4135 calculates additional compensation obtained by multiplying a unit price of a process of generating the second control information by the number of generations of the second control information exceeding the upper limit number. Then, the compensation output unit 4135 outputs the compensation obtained by summing the additional compensation and the basic compensation. Also, the compensation output unit 4135 may output only the compensation obtained by multiplying the unit price by the number of generations of the second control information without using the basic compensation.

The unit price may be determined on the basis of the number of types of second control information generated by the information generation unit 4133 on the basis of the first control information. For example, a service capable of controlling more types of devices 3 with one piece of the first control information is highly valuable. Therefore, the compensation output unit 4135 may increase the unit price as the number of types of devices 3 or the number of devices 3 capable of being controlled using one piece of the first control information increases.

For example, the compensation output unit 4135 outputs compensation in association with application software to be executed by the communication terminal 2 to control the control target device 3. Thereby, a business entity for providing a service by using the device controller 1 can request the application development company to pay compensation calculated in association with the application software.

A timing at which the compensation output unit 4135 calculates the compensation is, for example, a timing after the second control information are transmitted. The compensation output unit 4135 may transmit the second control information and calculate the compensation at a timing when there is a response from the device 3 that is a destination of the second control information. The compensation output unit 4135 determines an amount of money to be paid by causing the storage unit 412 to store calculated compensations and summing the compensations within a predetermined period at a point in time when the predetermined period is reached (for example, an end of the month).

Also, although a model in which the application development company is requested to pay compensation output by the compensation output unit 4135 has been described in the above-described description, a user using the communication terminal 2 may be requested to pay compensation. Therefore, the compensation output unit 4135 may output the compensation in association with the user of the communication terminal 2. In this case, the compensation output unit 4135 transmits information indicating the calculated compensation to the server for managing a usage fee of the communication line by the communication terminal 2 and the server may determine an amount of money to be paid by summing a communication fee and a fee for compensation.

Also, in order to increase the number of types of devices 3 to which the device controller 1 can transmit the second control information, an amount of money of a part of compensation to be paid by the application development company or the user of the communication terminal 2 may be returned to a business entity for manufacturing and selling the device 3. Thus, the compensation output unit 4135 can output the compensation in association with a device ID. Thereby, a business entity for providing a service using the device controller 1 can motivate the business entity for manufacturing and selling the device 3 to disclose an API for controlling the device 3.

[Procedure when Control Target Device is Registered]

In the tenth embodiment, a procedure when the user registers the control target device 3 with the communication terminal 2 is as described with reference to FIGS. 7A to 7D in the first embodiment.

[Operation Sequence when Device 3 is Controlled]

Figure 28:
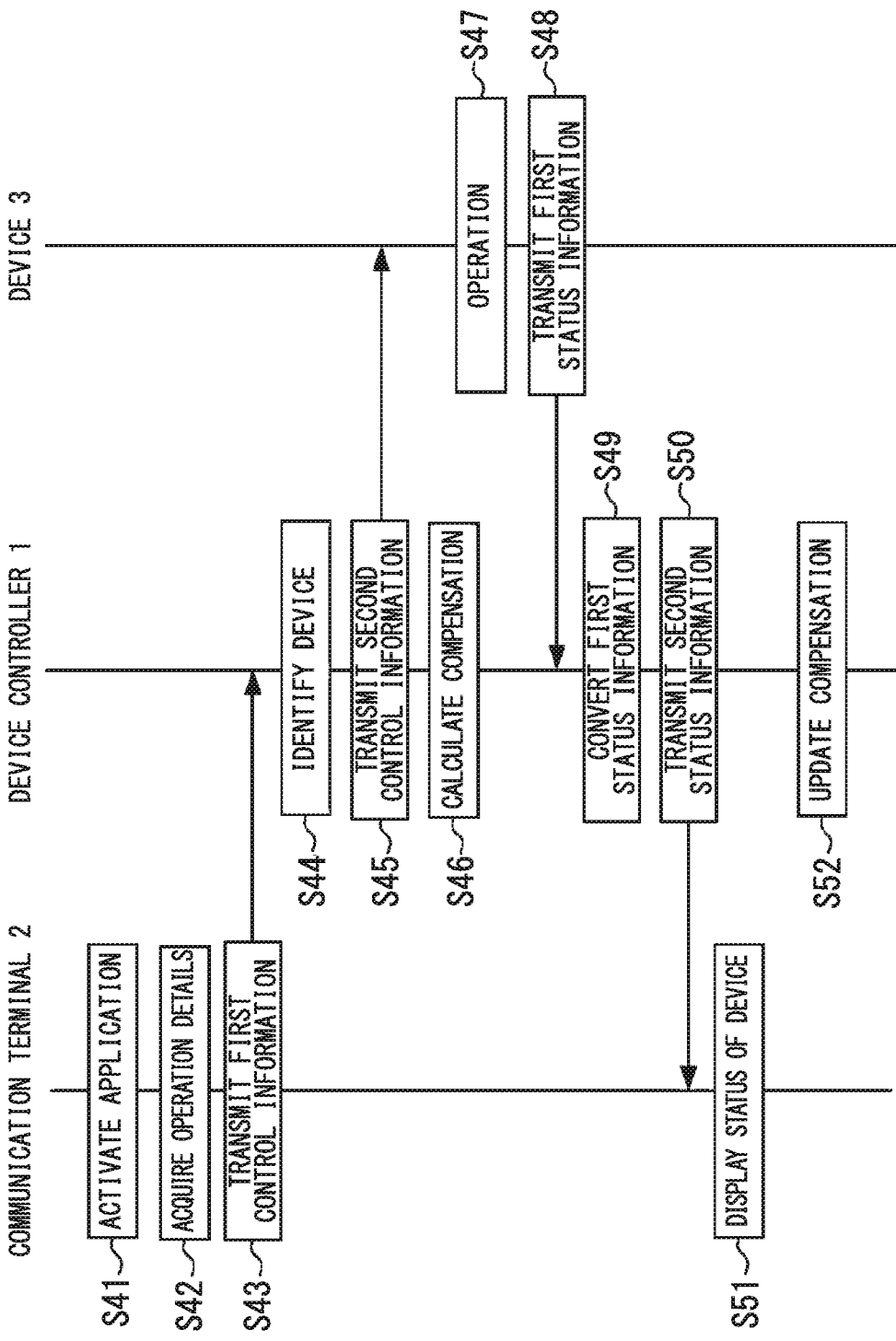
FIG. 28 is a diagram showing an operation sequence when the device controller according to the tenth embodiment controls a device.

FIG. 28 is a diagram showing an operation sequence when the device controller 1 of the tenth embodiment controls the device 3. First, when the user activates the application software for controlling the control target device in the communication terminal 2 (S41), the communication terminal 2 acquires control details input by the user (S42). The communication terminal 2 generates first control information including the acquired control details and transmits the first control information to the device controller 1 via the network N (S43).

When the device controller 1 receives the first control information, the device identification unit 4132 of the device controller 1 identifies the control target device 3 on the basis of the received first control information (S44). Subsequently, the information generation unit 4133 generates second control information corresponding to the control target device 3 and the transmission unit 4134 transmits the second control information to the control target device 3 (S45). In accordance with the transmission of the second control information by the transmission unit 4134, the compensation output unit 4135 adds a unit price of compensation for the transmission of the second control information to the latest compensation stored in the storage unit 412 and calculates new compensation (S46).

The processing of steps S47 to S51 is similar to the processing of steps S16 to S20 (FIG. 8) in the first embodiment. In accordance with the transmission of the second status information to the communication terminal 2 by the transmission unit 4134 (S50), the compensation output unit 4135 adds a unit price of compensation for conversion of status information to the latest compensation calculated in step S46 and updates the latest compensation (S52).

According to the above procedure, the user can control the desired device 3 or check a status of the device 3 by operating the communication terminal 2.

Modified Example 1

In the above-described tenth embodiment, the device identification information may be a serial number as in the modified example 1 of the first embodiment described with reference to FIGS. 9 and 10. Thereby, in the tenth embodiment, an effect similar to the above-described effect in the modified example 1 of the first embodiment is obtained.

Modified Example 2

In the above-described tenth embodiment, as in the modified example 2 of the first embodiment, a plurality of communication terminals 2 may control a common device 3. Thereby, in the tenth embodiment, an effect similar to the above-described effect in the modified example 2 of the first embodiment is obtained.

[Effects of Device Control System S of Tenth Embodiment]

As described in the tenth embodiment, in the device control system S, application software capable of controlling a plurality of devices having different type names of the same type installed in the communication terminal 2 is used. The user operates the application software and therefore the first control information in a format common to the devices of the same type is transmitted to the device controller 1. On the basis of the received first control information, the device controller 1 generates the second control information using a dedicated API for the device and transmits the second control information to the device 3 specified in the first control information. Then, the compensation output unit 4135 calculates and outputs compensation corresponding to the number of times the information generation unit 4133 has generated the second control information on the basis of the first control information.

A service fee (compensation) related to data communication is often determined in accordance with an amount of data to be transmitted. In this case, because the fee varies with a length of the control information, it is difficult to provide a fee system suitable for an additional value of the provided service. On the other hand, the device controller 1 of the tenth embodiment calculates compensation on the basis of the number of generations of the second control information. Thereby, the device controller 1 can calculate compensation suitable for the additional value of the provided service.

The compensation output unit 4135 calculates the compensation as described above and therefore the calculated compensation becomes an amount of money suitable for an additional value provided by the application software for the user. Therefore, a company for selling application software can cause the application software of an appropriate price to be disseminated by determining a usage fee or a sale price for the application software on the basis of compensation output by compensation output unit 4135.

Also, the compensation output unit 4135 outputs predetermined basic compensation until the number of times the second control information has been generated on the basis of the first control information reaches a predetermined upper limit number (a first reference value). Thereby, even when the number of times the user controls the device 3 with the application software is small, a company for providing a service using the device controller 1 can recover the system development costs.

Also, the compensation output unit 4135 outputs compensation on the basis of a compensation calculation rule determined for application software. Thereby, it is possible to calculate compensation in accordance with a profit model of an application development company such as a profit model in which the application development company charges a fixed amount of money to a user or a profit model in which the application development company charges money according to a used amount. Thus, the application development company can easily develop application software using the device control system S.

Also, the compensation output unit 4135 may calculate the compensation by multiplying a unit price determined on the basis of the number of types of second control information capable of being generated by the information generation unit 4133 on the basis of the first control information by the number of times the second control information has been generated on the basis of the first control information. Thereby, a business entity for providing a service through the device control system S can charge compensation suitable for an additional value of the service. Thus, application development companies and users easily use provided services.

Eleventh Embodiment

Also, in the above-described tenth embodiment, as in the second embodiment described with reference to FIG. 11, the device controller 1 may generate the second control information corresponding to the API of the server 5 for controlling the device 3. Thereby, in the eleventh embodiment, an effect similar to the effect described in the second embodiment is obtained.

A compensation output unit 4135 according to the eleventh embodiment may output the compensation in association with a device server 5. For example, in order to make it possible to return compensation to a company for providing the device server 5, the compensation output unit 4135 determines a predetermined percentage of the compensation calculated according to various types of compensation calculation rules described in the tenth embodiment as an amount of money to be returned for each device server. The compensation output unit 4135 may return the compensation according to the number of controllable devices 3 to a business entity for providing each device server.

Also, the compensation output unit 4135 may calculate compensation on the basis of information received from the device server receiving the second control information and output the compensation. The information received from the device server is, for example, information indicating the number of times the device server has transmitted the received second control information to the device 3. Thereby, the compensation output unit 4135 can return compensation according to the number of times the device server has controlled the device 3 to a business entity for providing each device server.

In this manner, the compensation output unit 4135 according to the eleventh embodiment outputs the compensation in association with the device server and therefore a business entity for providing the service using the device controller 1 can return a part of the profit to a business entity for providing a device server. Accordingly, because it is possible to motivate the business entity for providing the device server to disclose the API of the device server, the number of devices 3 capable of being controlled using the device controller 1 increases.

Twelfth Embodiment

Also, in the above-described tenth embodiment, as in the third embodiment described with reference to FIG. 12, the control target device 3 may be the server 6 to which a company or the like distributes information. On the basis of first control information, a device controller 1 according to a twelfth embodiment identifies a server 6 which is a transmission destination of content included in first control information and transmits second control information with a format corresponding to the server 6 to the server 6. Thereby, in the twelfth embodiment, an effect similar to the effect described in the third embodiment is obtained.

A compensation output unit 4135 according to the twelfth embodiment may determine compensation on the basis of the number of times a user has accessed the server 6 with a communication terminal 2 or an amount of data transmitted and received to and from the server 6. In this case, the compensation output unit 4135 may calculate a part of the determined compensation as an amount of money to be paid to a company for operating the server 6 or the like.

As described above, in the device control system S according to the twelfth embodiment, it is possible to return a part of an amount of charge for the application development company or the user calculated by the compensation output unit 4135 to the company for operating the server 6 or the like. Thereby, it is possible to motivate a company for operating the server 6 to disclose an API for accessing the server 6, and it is possible to increase the number of servers 6 connectable to the device controller 1. Thus, it is possible to increase an additional value of the service using the device controller 1.

Thirteenth Embodiment

[Outline of Device Control System S]

An outline of a device control system S according to a thirteenth embodiment is similar to the outline of the device control system S according to the first embodiment described with reference to FIG. 1.

An example of a screen of a communication terminal 2 is as described with reference to FIGS. 2A and 2B in the first embodiment.

As described in the first embodiment, for example, a list of devices 3 (FIG. 2B) capable of being controlled by a single piece of application software is displayed on the communication terminal 2. Also, a list of devices 3 capable of being controlled by the user may be displayed on the communication terminal 2.

Here, in a screen of a list of devices 3 to be displayed on the communication terminal 2, the user can perform new registration of a device 3, setting of each device 3 to an operable status, setting of each device to an inoperable status, deletion of the registration, or the like. The device controller 1 calculates compensation for a service provided by the device controller 1 in accordance with the number of devices 3 set in an operable status and outputs the calculated compensation. Details of the method of calculating compensation will be described below.

[Configuration of Device Controller 1]

Figure 29:
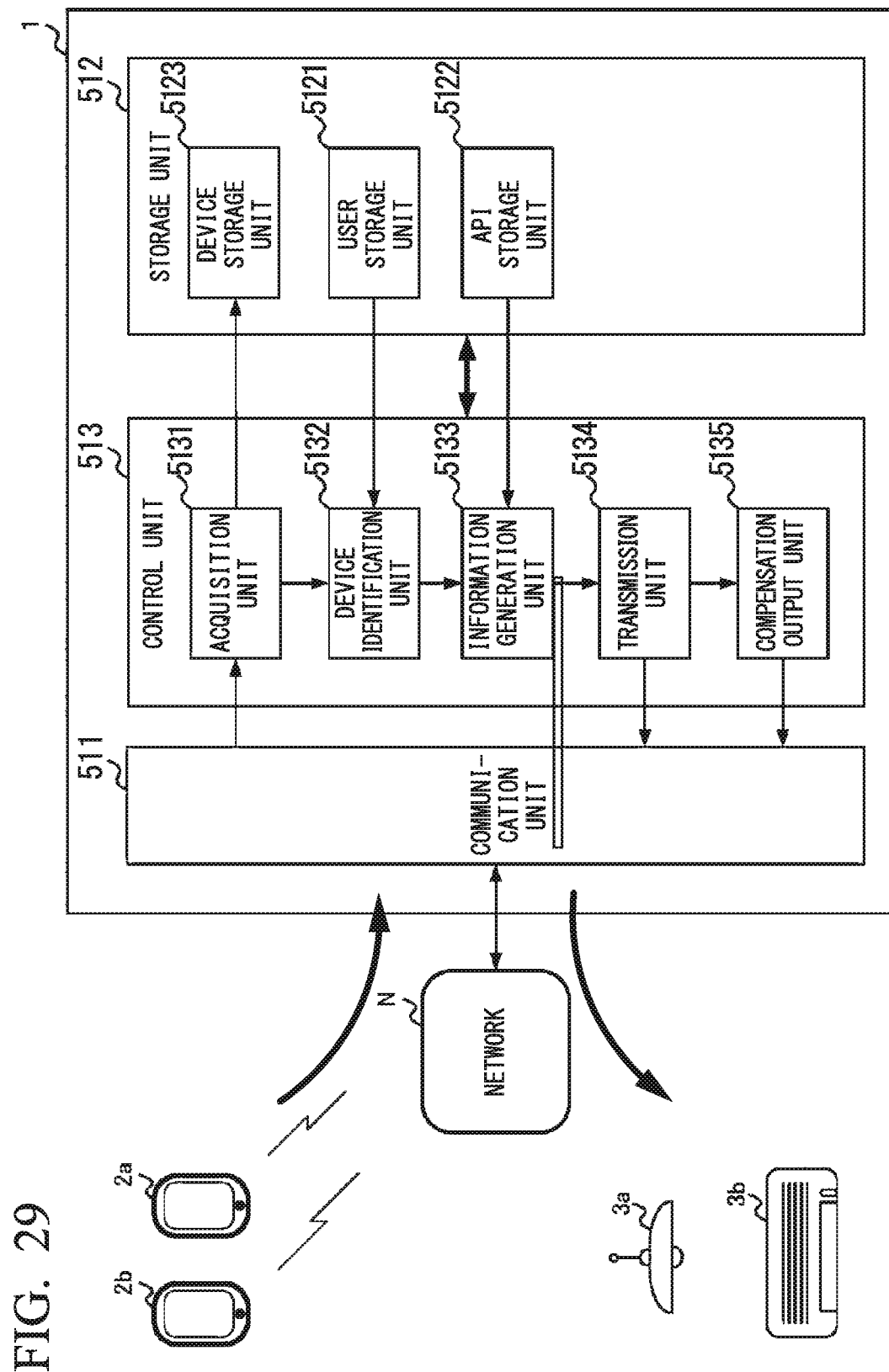
FIG. 29 is a diagram showing a configuration of a device controller according to a thirteenth embodiment.

FIG. 29 is a diagram showing a configuration of the device controller 1 in the thirteenth embodiment. The device controller 1 according to the thirteenth embodiment includes a communication unit 511, a storage unit 512, and a control unit 513.

The communication unit 511 has, for example, a LAN controller. The communication unit 511 transmits and receives data to and from the communication terminal 2 and the device 3 via the network N.

The storage unit 512 includes a storage medium such as a ROM, a RAM, or a hard disk. The storage unit 512 stores a program to be executed by the control unit 513. Also, the storage unit 512 stores data to be used when the control unit 513 operates and data generated by the control unit 513.

The storage unit 512 has a user storage unit 5121, an API storage unit 5122, and a device storage unit 5123 as areas for storing data to be used by the control unit 513. The user storage unit 5121 and the API storage unit 5122 are similar to the user storage unit 1121 and the API storage unit 1122 in the first embodiment.

FIG. 30 is a diagram showing an example of a user information DB stored in the user storage unit 5121 in the thirteenth embodiment. In the user information DB according to the thirteenth embodiment, an operation flag and compensation are associated with a user ID in addition to a type (a type of device), a device ID, a manufacturer name, and an address of the device 3 capable of being controlled by the user. The user ID, the type of device, the device ID, the manufacturer name, and the address are as described in the first embodiment.

In the user storage unit 5121, the operation flag is stored for each of a plurality of devices 3 stored in association with the user ID. The operation flag is information indicating whether or not each device 3 registered in the user storage unit 5121 can be controlled by the communication terminal 2. The operation flag has two statuses of an operable status (operation-enabled status) and an inoperable status (operation-disabled status). Among the plurality of devices 3, the device 3 for which the operation flag indicates the operable status is a charging target of the service using the device controller 1. On the other hand, the device 3 for which the operation flag indicates the inoperable status is not a charging target.

In the user DB, among the devices 3 associated with a certain user ID, the number of devices 3 for which the operation flag indicates the operation-enabled status is the number of controllable devices capable of being controlled by the communication terminal 2 corresponding to the user ID. In this manner, in the user DB shown in FIG. 30, the number of controllable devices capable of being controlled by the communication terminal 2 among the plurality of devices 3 is associated with the user ID (identification information of the communication terminal 2).

Also, in the user information DB according to the thirteenth embodiment, compensation is recorded for each device 3. For example, the compensation is initialized every predetermined period (for example, one month) and the unit price of the device 3 is added to the compensation on the day when the operation flag is set to the operable status. If the compensation varies with the number of times the device 3 is controlled, the compensation is further updated in accordance with the number of times the device 3 is controlled.

Although not shown, the device storage unit 5123 stores a device information database (hereinafter referred to as a device information DB). The device storage unit 5123 stores the unit price according to the use of the device controller 1 in association with the device ID. The unit price is determined, for example, on a daily basis. The unit price varies with a type of device 3 and is determined, for example, on the basis of a price of the device 3 itself and a type of function of the device 3.

Details of the control unit 513 will be described with reference to FIG. 29 again. The control unit 513 is, for example, a CPU. By executing a program stored in the storage unit 512, the control unit 513 functions as an acquisition unit 5131, a device identification unit 5132, an information generation unit 5133, a transmission unit 5134, and a compensation output unit 5135.

The acquisition unit 5131 accepts the registration of the device 3 from the communication terminal 2 of the user who can receive the provision of the service. When a registration request of the device 3 is acquired from the communication terminal 2, the acquisition unit 5131 causes a registration target device 3 to be stored in association with the user ID of the user of the communication terminal transmitting the registration request in the user storage unit 5121. Also, the acquisition unit 5131 acquires setting information for setting to a controllable status of the device 3 and an operation-disabled status in which control is disabled. The acquisition unit 5131 updates the operation flag of the user storage unit 5121 in accordance with the acquisition of the setting information.

Also, the acquisition unit 5131 acquires the first control information for controlling the device 3 pre-registered in the device controller 1. An example of the first control information and the second control information is as described with reference to FIG. 5 in the first embodiment. Also, a flow of data when the device 3 is controlled by the communication terminal 2 is as described with reference to FIG. 6 in the first embodiment.

The processes of the device identification unit 5132, the information generation unit 5133, and the transmission unit 5134 are similar to those of the device identification unit 1132, the information generation unit 1133, and the transmission unit 1134 in the first embodiment.

The compensation output unit 5135 outputs compensation of an amount of money corresponding to the number of controllable devices stored by the user storage unit 5121. For example, the compensation output unit 5135 outputs information obtained by totaling the compensation to a printer, a computer, or the like via the communication unit 511. The compensation is, for example, a value indicating an amount of money to be charged or returned for a business entity for providing application software installed in the communication terminal 2, a user of the communication terminal 2, or a business entity for providing the device 3.

For example, the service model described in the tenth embodiment is conceivable as a service model for charging or returning the compensation. As described in the tenth embodiment, the compensation output unit 5135 charges compensation to an application development company that can earn profit by selling application software using the device control system S. The compensation output unit 5135 charges an amount of money based on compensation to the application development company. The compensation output unit 5135 may return a part of the compensation to the company for providing the device 3.

The compensation output unit 5135 outputs the compensation in accordance with acquisition of the registration request of the new device 3 by the acquisition unit 5131. Specifically, in accordance with a process of causing the user storage unit 5121 to store the device ID of the device 3 for which the acquisition unit 5131 has acquired the registration request in association with the user ID of the user of the communication terminal 2, the compensation output unit 5135 adds a unit price per device 3 to the latest compensation. Thereby, the compensation output unit 5135 updates the compensation.

Also, the compensation output unit 5135 changes the compensation in accordance with acquisition of setting information for changing control availability of the already registered device 3 by the acquisition unit 5131 or acquisition of a registration deletion request. When compensation is output on a monthly basis, the compensation output unit 5135 calculates the compensation for one month of the device 3 by multiplying the number of days registered in an operable status for one month by the unit price of the device 3 with respect to each of the devices. Then, compensation for one month of the device 3 registered in association with the user ID is summed to calculate the compensation corresponding to the user ID.

As described above in the tenth embodiment, the compensation output unit 5135 may determine such a compensation calculation rule for each piece of application software to be executed by the communication terminal 2 transmitting the first control information to control the control target device 3. As described above in the tenth embodiment, the compensation output unit 5135 can calculate compensation in accordance with a profit model of an application development company such as a profit model in which the application development company charges a fixed amount of money to a user or a profit model in which the application development company charges money according to a used amount. Thus, the application development company can easily develop application software using the device control system S.

Also, the compensation output unit 5135 may calculate the compensation on the basis of the unit price determined for each type of control target device 3 which is controlled on the basis of the second control information. For example, the compensation output unit 5135 is conceived to calculate compensation on the basis of a different unit price in each of a first type of device 3, a second type of device 3, and a third type of device 3. The first type of device 3, the second type of device 3, and the third type of device 3 are as described in the tenth embodiment.

In the case of the first type of device 3, the transmission unit 5134 transmits one piece of the second control information and a usage value of the device 3 is high because the device 3 is operated for a long time. On the other hand, in the case of the third type of device 3, every time the user operates using the communication terminal 2, the transmission unit 5134 transmits one piece of the second control information and the operation is executed. The number of operation details to be executed by the third type of device 3 on the basis of one piece of the second control information is less than the number of operation details of the first type of device 3 to be constantly activated. Accordingly, a value of the third type of device 3 is considered to be lower than a value of the first type of device 3.

Therefore, for example, the compensation output unit 5135 calculates compensation by weighting a unit price for controlling the first type of device 3 greater than unit prices for controlling the second and third types of devices 3. Also, the compensation output unit 5135 calculates compensation by weighting a unit price for controlling the third type of device 3 less than unit prices for controlling the first and second types of devices 3.

For example, the compensation output unit 5135 outputs predetermined basic compensation as compensation until the number of controllable devices associated with the identification information of the communication terminal 2 reaches a predetermined upper limit number. In this case, when the number of controllable devices exceeds the upper limit number, the compensation output unit 5135 calculates additional compensation by multiplying the number of controllable devices exceeding the upper limit number by the unit price of each controllable device. Then, the compensation output unit 5135 outputs the compensation obtained by summing the calculated additional compensation and the basic compensation. Also, the compensation output unit 5135 may output only the compensation obtained by multiplying the unit price by the number of controllable devices without using basic compensation.

Also, the compensation output unit 5135 may determine compensation by summing the basic compensation determined on the basis of the number of controllable devices and the additional compensation determined on the basis of the number of times the communication terminal 2 has controlled the control target device. In this case, for example, the compensation output unit 5135 determines additional compensation on the basis of at least one of the following number of times. The number of times is the number of times the acquisition unit 5131 has acquired the first control information, the number of times the information generation unit 5133 has generated the second control information on the basis of the first control information, the number of times the transmission unit 5134 has transmitted the second control information, and the number of times the acquisition unit 5131 has acquired the response from the device 3 receiving the second control information exceeding the predetermined number of times.

In this manner, the compensation output unit 5135 determines the basic compensation on the basis of the number of controllable devices 3 possessed by the user, and determines the additional compensation on the basis of the number of times the controllable device has been controlled. Thereby, a provider of the service using the device controller 1 can charge the compensation even if the device 3 is registered but is not controlled. Also, the provider of the service using the device controller 1 can request the additional compensation when the frequency of controlling the registered device 3 is high. Accordingly, when the load on the device controller 1 increases due to an increase in the control frequency of the device 3, facility investment for adding the device controller 1 is facilitated.

As in the tenth embodiment, for example, the compensation output unit 5135 may output the compensation in association with application software to be executed by the communication terminal 2 to control the control target device 3. Thereby, a business entity for providing a service using the device controller 1 can request the application development company pay the compensation calculated in association with the application software.

Also, as in the tenth embodiment, the compensation may be charged to the user using the communication terminal 2. Therefore, the compensation output unit 5135 may output the compensation in association with the user of the communication terminal 2. In this case, the compensation output unit 5135 may transmit information indicating the calculated compensation to the server for managing a usage fee of a communication line by the communication terminal 2 and a communication fee and a fee for the compensation are summed in the server and an amount of money to be paid may be determined.

[Procedure when Control Target Device is Registered]

In the thirteenth embodiment, the procedure when the user registers the control target device 3 with the communication terminal 2 is as described with reference to FIGS. 7A to 7D in the first embodiment.

[Operation Sequence when Device 3 is Controlled]

The operation sequence when the device controller 1 according to the thirteenth embodiment controls the device 3 is similar to the operation sequence shown in FIG. 28. However, the processing of steps S46 and S52 according to the thirteenth embodiment is different from that of the tenth embodiment. The processing of steps S41 to S45 and S47 to S51 of the operation sequence according to the thirteenth embodiment is similar to that according to the tenth embodiment.

In accordance with the transmission of the second control information to the device 3 by the transmission unit 5134 (S45), the compensation output unit 135 according to the thirteenth embodiment calculates additional compensation by adding the unit price of the compensation for the transmission of the second control information and causes the user storage unit 5121 to store the additional compensation (S46).

In accordance with the transmission of the second status information to the communication terminal 2 by the transmission unit 5134 (S50), the compensation output unit 5135 according to the thirteenth embodiment adds the unit price of the compensation for the conversion of status information into the latest compensation calculated in step S46 and updates the additional compensation (S52).

The device controller 1 collects and outputs the compensation at a predetermined timing (for example, every month). Specifically, the compensation output unit 5135 refers to information of compensation stored in the user storage unit 5121 and totals compensation within a predetermined period, at a predetermined timing. The compensation output unit 5135 outputs compensation in association with the type of application software controlling the device 3, the user, and the like.

Modified Example 1

In the above-described thirteenth embodiment, the device identification information may be a serial number as in the modified example 1 of the first embodiment described with reference to FIGS. 9 and 10. Thereby, in the thirteenth embodiment, an effect similar to the above-described effect in the modified example 1 of the first embodiment is obtained.

Modified Example 2

In the above-described thirteenth embodiment, as in the modified example 2 of the first embodiment, a plurality of communication terminals 2 may control the common device 3. Thereby, in the thirteenth embodiment, an effect similar to the above-described effect in the modified example 2 of the first embodiment is obtained.

[Effects of Device Control System S of Thirteenth Embodiment]

As described in the thirteenth embodiment, the device control system S uses application software which is installed in the communication terminal 2 and can control a plurality of devices of the same type with different type names. The user operates the application software and therefore the first control information having a format common to the devices of the same type is transmitted to the device controller 1. On the basis of the received first control information, the device controller 1 generates the second control information using a dedicated API for the device and transmits the second control information to the device 3 specified in the first control information. The compensation output unit 5135 outputs compensation of an amount of money according to the number of devices 3 for which device IDs are registered by the user and stored in association with a user ID in the user storage unit 5121.

A service fee (compensation) related to data communication is often determined in accordance with an amount of data to be transmitted. In this case, because the fee varies with a length of the control information, it is difficult to provide a fee system suitable for an additional value of the provided service. On the other hand, the device controller 1 according to the thirteenth embodiment calculates compensation on the basis of the number of devices registered as a control target. Thereby, the device controller 1 can calculate compensation suitable for the additional value of the provided service.

The compensation output unit 5135 determines the compensation in this manner and therefore a business entity for providing a service using the device control device 1 can obtain appropriate compensation even when the amount of data communication between the communication terminal 2 and the device controller 1 due to the transmission of the first control information is small.

Also, the compensation output unit 5135 outputs compensation in accordance with reception of a request for registering the device 3 by the acquisition unit 5131 from the communication terminal 2. At this time, the compensation output unit 5135 can determine the compensation in accordance with whether the device 3 is registered as a controllable status or whether the device 3 is registered as a stopped use status. Thereby, the user changes setting (registration details) when necessity for control occurs after registering a possessed device 3, so that it is possible to prevent money from being charged to a device 3 which is unlikely to be controlled. Thus, the user can easily utilize a service using the device controller 1.

Also, the compensation output unit 5135 can determine compensation in accordance with a type of registered controllable device. Thereby, the compensation output unit 5135 can determine compensation according to a magnitude of an additional value that the user can obtain by the service using the device controller 1. Thus, the user can easily use a service using the device controller 1.

Also, the compensation output unit 5135 sets a fixed amount of money as compensation until the number of registered controllable devices reaches a predetermined upper limit number (a second reference value). Thereby, until the number of controllable devices reaches an upper limit number, compensation does not increase in accordance with registration of a new device 3. Thus, the user can easily register the device 3.

Fourteenth Embodiment

Also, in the above-described thirteenth embodiment, as in the second embodiment described with reference to FIG. 11, the device controller 1 may generate the second control information corresponding to the API of the server 5 for controlling the device 3. Thereby, in a fourteenth embodiment, an effect similar to the effect described in the second embodiment is obtained.

A compensation output unit 5135 according to the fourteenth embodiment may output compensation in association with a device server 5. For example, in order to make it possible to return the compensation to a company for providing the device server 5, the compensation output unit 5135 determines a predetermined percentage of the compensation calculated according to various types of compensation calculation rules described in the thirteenth embodiment as an amount of money to be returned for each device server. The compensation output unit 5135 may return the compensation according to the number of controllable devices 3 to each device server.

In this manner, the compensation output unit 5135 according to the fourteenth embodiment outputs the compensation in association with the device server and therefore a business entity for providing the service using the device controller 1 can return a part of the profit to a business entity for providing a device server. Accordingly, because it is possible to motivate the business entity for providing the device server to disclose the API of the device server, the number of devices 3 capable of being controlled using the device controller 1 increases.

Fifteenth Embodiment

Also in the above-described thirteenth embodiment, as in the third embodiment described with reference to FIG. 12, the control target device 3 may be the server 6 to which a company or the like distributes information. On the basis of first control information, a device controller 1 according to a fifteenth embodiment identifies a server 6 which is a transmission destination of content included in first control information and transmits second control information in a format corresponding to the server 6 to the server 6. Thereby, in the fifteenth embodiment, an effect similar to the effect described in the third embodiment is obtained.

Also, the compensation output unit 5135 according to the fifteenth embodiment may determine an amount of charge on the basis of the number of times a user has accessed the server 6 using a communication terminal 2 or an amount of data transmitted and received to and from the server 6. In this case, the compensation output unit 5135 may calculate a part of the determined amount of charge as an amount of money payable to a company for operating the server 6 or the like.

In this manner, in the device control system S according to the fifteenth embodiment, it is possible to return a part of an amount of charge for the application development company or the user calculated by the compensation output unit 5135 to the company for operating (managing) the server 6 or the like. Thereby, a fee for the user using the server 6 can be charged by an operator of a communication carrier or the like for operating the device controller 1 instead of a company for operating the server 6 or the like in an integrated manner. Accordingly, it is possible to save the time and effort of the user, the company for operating the server 6, and the like.

The present invention has been described according to several embodiments. A new embodiment formed according to any combination thereof is also included in the embodiment of the present invention. Effects of the new embodiment formed according to the combination include all effects of the original embodiment.

Also, the technical scope of the present invention is not limited to the scope described in the above-described embodiment. It is obvious to a person skilled in the art that various modifications or improvements can be added to the above embodiments. In particular, specific embodiments of dispersion and integration of devices are not limited to those in the drawings and all or some of the devices can be configured to be functionally or physically dispersed and integrated in any units in accordance with various loads and the like or in accordance with a functional load.

INDUSTRIAL APPLICABILITY

A device controller of the present invention can control various types of devices with a single piece of application software.

REFERENCE SIGNS LIST

1 Device controller
2 Communication terminal
3 Device
4 Router
5 Server
6 Server
111, 211, 311, 411, 511 Communication unit
112, 212, 312, 412, 512 Storage unit
113, 213, 313, 413, 513 Control unit
1121, 2121, 3121, 4121, 5121 User storage unit
1122, 2123, 3122, 4122, 5122 API storage unit
1131, 2131, 3132, 4131, 5131 Acquisition unit
1132, 2132, 3133, 4132, 5132 Device identification unit
1133, 2133, 3134, 4133, 5133 Information generation unit
1134, 2134, 4134, 5134 Transmission unit
1135, 2135 Charging unit
2123 Presentation information storage unit
3123 Operation details storage unit
2136 Presentation unit
2137 Setting unit
3131 First transmission unit
3135 Second transmission unit
4135, 5135 Compensation output unit
S Device control system

What is claimed is:

1. A device controller connected to a communication terminal and a plurality of devices via a network, the device controller comprising:
    an acquisition unit configured to receive, from the communication terminal, first control information transmitted by executing an application software installed for a plurality of devices corresponding to one type among a plurality of types of electrical devices in the communication terminal, for controlling a device of the one type corresponding to the application software, the first control information including specific information for identifying a control target device selected from the plurality of devices corresponding to the one type and application identification information for identifying the one type of the control target device and identifying whether the application software is used for controlling the one type of the control target device;
    a device identification unit configured to identify the control target device on the basis of the specific information included in the first control information;
    a generation unit configured to generate, based on the application identification information included in the first control information, second control information for causing the identified control target device to execute control details indicated by the first control information, the second control information being different from the first control information; and
    a transmission unit configured to transmit the second control information.

2. The device controller according to claim 1,
    wherein the first control information includes the control details for the control target device in a format common among the plurality of devices corresponding to the one type, and
    wherein the second control information includes the control details in a format corresponding to the control target device.

3. The device controller according to claim 2, wherein the generation unit is configured to identify a format of the first control information on the basis of information indicating the one type of the first control information included in the first control information and generate the second control information.

4. The device controller according to claim 1, further comprising:
    a storage unit configured to store a programming interface for controlling the control target device,
    wherein the generation unit is configured to generate the second control information in which control details indicated by the first control information are written in accordance with the programming interface, and
    wherein the transmission unit is configured to transmit the generated second control information to the control target device.

5. The device controller according to claim 1, further comprising:
    a storage unit configured to store user identification information identifying a user of each of a plurality of communication terminals and device identification information for identifying a device to be controlled by each user in association with each other,
    wherein the first control information further includes the user identification information, and
    wherein the device identification unit is configured to identify a device indicated by the device identification information stored in the storage unit in association with the user identification information included in the received first control information as the control target device.

6. The device controller according to claim 5,
wherein the storage unit is configured to store first user identification information and second user identification information in association with each other, and
wherein the device identification unit is configured to identify the device indicated by the device identification information stored in the storage unit in association with the second user identification information as the control target device if the second user identification information is stored in the storage unit in association with the first user identification information included in the received first control information.

7. The device controller according to claim 6, further comprising:
a charging unit configured to perform charging in accordance with reception of the first control information including the first user identification information with respect to the second user identification information.

8. The device controller according to claim 1,
wherein the generation unit is configured to generate the second control information for causing a device server for controlling the control target device to control the control target device as the control details, and
wherein the transmission unit is configured to transmit the second control information to the device server.

9. A device control method of causing a device selected from a plurality of devices to be controlled by a communication terminal, the device control method comprising:
receiving, from the communication terminal, first control information transmitted by executing an application software installed for a plurality of devices corresponding to one type among a plurality of types of electrical devices in the communication terminal, for controlling a device of the one type corresponding to the application software, the first control information including specific information for identifying a control target device selected from the plurality of devices corresponding to the one type and application identification information for identifying the one type of the control target device and identifying whether the application software is used for controlling the one type of the control target device;
identifying the control target device on the basis of the specific information included in the first control information;
generating, based on the application identification information included in the first control information, second control information for causing the identified control target device to execute control details indicated by the first control information, the second control information being different from the first control information; and
transmitting the second control information.

10. The device control method according to claim 9,
wherein the first control information includes the control details for the control target device in a format common among the plurality of devices corresponding to the one type, and
wherein the second control information includes the control details in a format corresponding to the control target device.

11. The device control method according to claim 9, further comprising:
storing a programming interface for controlling the control target device,
wherein, in the generating, the second control information in which control details indicated by the first control information are written in accordance with the programming interface is generated, and
wherein, in the transmitting, the generated second control information is transmitted to the control target device.

12. The device control method according to claim 9, further comprising:
storing user identification information identifying a user of each of a plurality of communication terminals and device identification information for identifying a device to be controlled by each user in association with each other,
wherein the first control information further includes the user identification information, and
wherein, in the identifying, a device indicated by the device identification information stored in association with the user identification information included in the received first control information is identified as the control target device.

13. The device control method according to claim 12,
wherein, in the storing, first user identification information and second user identification information are stored in association with each other, and
wherein, in the identifying, the device indicated by the device identification information stored in association with the second user identification information as the control target device is identified if the second user identification information is stored in association with the first user identification information included in the received first control information.

14. The device control method according to claim 13, further comprising:
performing charging in accordance with reception of the first control information including the first user identification information with respect to the second user identification information.

15. A device control system including a communication terminal and a device controller connected to the communication terminal and a plurality of devices via a network,
wherein the communication terminal transmits, to the device controller, first control information for controlling a device of one type corresponding to an application software by executing the application software installed for a plurality of devices corresponding the one type among a plurality of types of electrical devices, the first control information including specific information for identifying a control target device selected from the plurality of devices corresponding to the one type and application identification information for identifying the one type of the control target device and identifying whether the application software is used for controlling the one type of the control target device, and
wherein the device controller includes:
an acquisition unit configured to receive the first control information from the communication terminal;
a device identification unit configured to identify the control target device on the basis of the specific information included in the first control information;
a generation unit configured to generate, based on the application identification information included in the first control information, second control information for causing the identified control target device to execute control details indicated by the first control information, the second control information being different from the first control information; and a transmission unit configured to transmit the second control information.

16. The device control system according to claim 15,
wherein the first control information includes the control details for the control target device in a format common among the plurality of devices corresponding to the one type, and wherein the second control information includes the control details in a format corresponding to the control target device.

17. The device control system according to claim 15, further comprising:

a storage unit configured to store a programming interface for controlling the control target device, wherein the generation unit is configured to generate the second control information in which control details indicated by the first control information are written in accordance with the programming interface, and wherein the transmission unit is configured to transmit the generated second control information to the control target device.

18. The device control system according to claim 15, further comprising:

a storage unit configured to store user identification information identifying a user of each of a plurality of communication terminals and device identification information for identifying a device to be controlled by each user in association with each other, wherein the first control information further includes the user identification information, and wherein the device identification unit is configured to identify a device indicated by the device identification information stored in the storage unit in association with the user identification information included in the received first control information as the control target device.

19. The device control system according to claim 18,
wherein the storage unit is configured to store first user identification information and second user identification information in association with each other, and wherein the device identification unit is configured to identify the device indicated by the device identification information stored in the storage unit in association with the second user identification information as the control target device if the second user identification information is stored in the storage unit in association with the first user identification information included in the received first control information.

20. The device control system according to claim 19, further comprising:

a charging unit configured to perform charging in accordance with reception of the first control information including the first user identification information with respect to the second user identification information.

* * * * *